United States Patent [19]
Kaneda et al.

[11] Patent Number: 5,537,210
[45] Date of Patent: Jul. 16, 1996

[54] ROTATION DETECTING APPARATUS AND SCALE HAVING A MULTI HELIX DIFFRACTION GRATING FOR THE SAME

[75] Inventors: Yasushi Kaneda, Tokyo; Koh Ishizuka, Ohmiya; Satoshi Ishii, Tokyo; Kenji Hisamoto, Yokohama, all of Japan

[73] Assignee: Canon Kabushiki Kaisha, Tokyo, Japan

[21] Appl. No.: 258,443

[22] Filed: Jun. 9, 1994

[30] Foreign Application Priority Data

Jun. 10, 1993 [JP] Japan .................. 5-138572
Feb. 3, 1994 [JP] Japan .................. 6-031939
Feb. 3, 1994 [JP] Japan .................. 6-031940

[51] Int. Cl.$^6$ .................................. G01B 11/02
[52] U.S. Cl. .............. 356/356; 250/237 G; 250/231.14
[58] Field of Search .................... 356/356; 250/237 G, 250/231.14–231.18; 359/565–567, 569, 570, 574–575

[56] References Cited

U.S. PATENT DOCUMENTS

| | | | |
|---|---|---|---|
| 3,688,570 | 9/1972 | Burke, Jr. ........................ | 250/237 G |
| 3,935,447 | 1/1976 | Black et al. ..................... | 250/231.13 |
| 4,528,448 | 7/1985 | Doggett .......................... | 250/231.14 |
| 4,541,716 | 9/1985 | Crooks et al. ................... | 356/354 |
| 4,987,299 | 1/1991 | Kobayashi et al. .............. | 250/237 G |
| 5,118,932 | 6/1992 | Browning et al. ................ | 250/237 G |
| 5,121,371 | 6/1992 | Farnsworth et al. ............. | 356/356 |
| 5,159,192 | 10/1992 | Nishimura et al. ............. | 250/231.16 |
| 5,204,524 | 4/1993 | Ichikawa et al. ............... | 250/237 G |
| 5,283,434 | 2/1994 | Ishizuka et al. ................ | 250/237 G |

FOREIGN PATENT DOCUMENTS

| | | |
|---|---|---|
| 0330810 | 9/1989 | European Pat. Off. . |
| 0545405 | 6/1993 | European Pat. Off. . |
| 1773428 | 3/1971 | Germany . |
| 61-256223 | 11/1986 | Japan . |
| 62-054122 | 3/1987 | Japan . |
| 62-204121 | 9/1987 | Japan . |
| 63-036111 | 2/1988 | Japan . |
| 2285214 | 11/1990 | Japan . |
| 5157583 | 6/1993 | Japan . |
| 909916 | 11/1962 | United Kingdom . |

*Primary Examiner*—Frank Gonzalez
*Assistant Examiner*—Jason D. Eisenberg
*Attorney, Agent, or Firm*—Fitzpatrick, Cella, Harper & Scinto

[57] ABSTRACT

A rotation detecting apparatus includes a grating portion provided on one of two objects for which relative rotation is to be detected, a light-emitting portion provided on the other of the two objects, and a light-receiving portion provided on the other object. The grating portion has at least one multi-helix diffraction grating. The light-receiving portion receives a beam emitted from the light-emitting portion and then traveling by way of the multi-helix diffraction grating. Information of relative rotation of the two objects is detected through light reception of the light-receiving portion.

18 Claims, 37 Drawing Sheets

FIG. 51
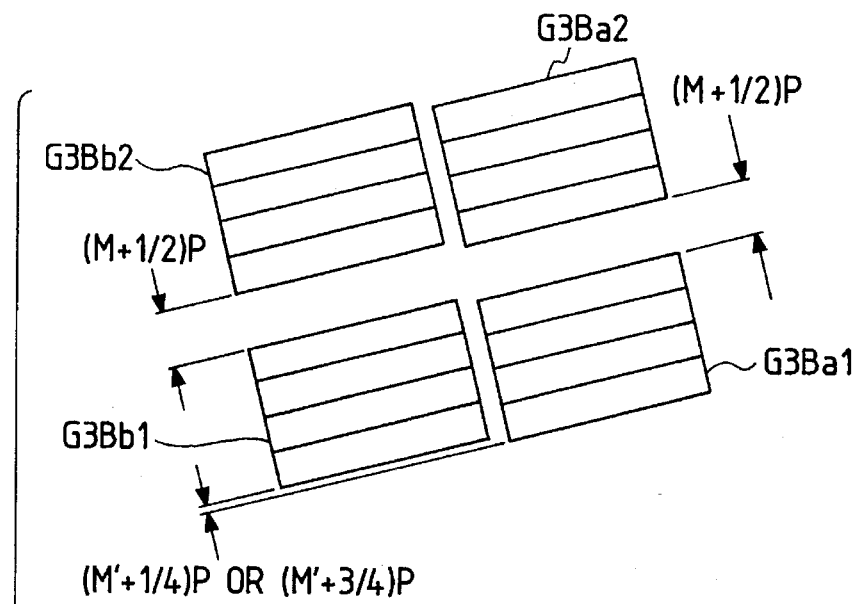
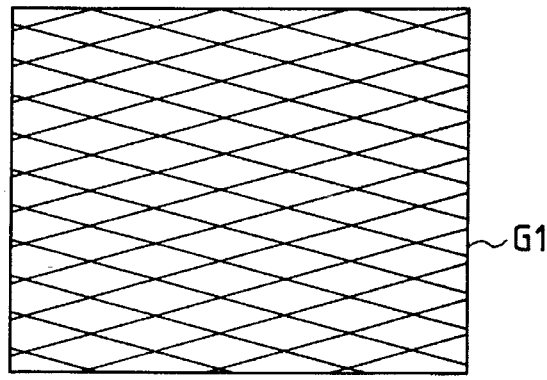
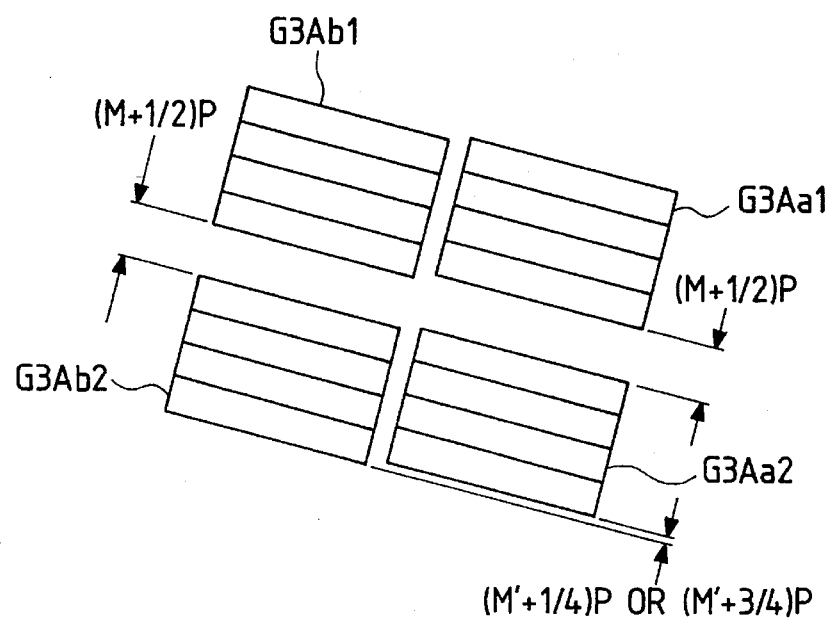

ROTATION DETECTING APPARATUS AND SCALE HAVING A MULTI HELIX DIFFRACTION GRATING FOR THE SAME

BACKGROUND OF THE INVENTION

1. Field of the Invention

The present invention relates to a rotation detecting apparatus for measuring a rotation speed, a rotational displacement and so on of a rotating object and a scale for rotation detection.

2. Related Background Art

There are conventional apparatus utilized for obtaining a physical amount such as a rotation angle or an angular velocity of an object at high accuracy while irradiating light onto the object, for example optical rotary encoders. These apparatus utilizing light are featured by their high accuracy and high resolution, but are desired to have a smaller size (i.e., a size on the millimeter order), a higher accuracy, a higher resolution (of 0.1 μm order), and higher stability in order to be applied in wider fields. A millimeter size apparatus could be used as directly bonded to a measured object, and therefore can be used for smaller apparatus.

FIG. 1A is a perspective view to show an example of a conventional optical rotary encoder as described for example in Japanese Laid-open Patent Application No. 5-157583. In FIG. 1A, reference numeral 101 denotes a light source such as a semiconductor laser, 102 a lens, 103 a beam splitter, 104 a rotary disk plate on which a diffraction grating 105 is formed radially on a rotational trace of a position where a beam passing through the beam splitter 103 is incident at right angles and at constant intervals, 106 a condenser lens for condensing beams reflected by the diffraction grating 105 and then also reflected by the beam splitter 103, 107 a beam splitter for reflecting the beams from the condenser lens 106 to 10 make the beams incident at right angles onto the diffraction grating 105 on the rotary disk plate 104, 108 a mirror for reflecting beams reflected by the diffraction grating 105 and then passing through the beam splitter 107, and 109 a beam splitter for guiding the beams reflected by the mirror 108 to a light-receiving element 110.

The conventional optical rotary encoders have been utilizing a disk plate 6a on which radial gratings are formed as shown in FIG. 1B as light phase modulating means used as a scale. Since such a rotary encoder of the above structure is so arranged that the diffraction grating as the light phase modulating means is radially formed on the disk plate, the grating pitch differs in the radial direction. This pitch change could be a cause of measurement error. Then an arrangement is necessary for precisely setting a grating reading position of a reading head in the radial direction or for correcting a change in the position when caused. It was thus difficult to achieve both a size reduction and an increase of resolution at the same time.

Also, such apparatus could be constructed only in the arrangement for detecting a circumferential displacement of the grating, and the location of the head unit was limited to one for detecting the circumferential displacement, which made the size reduction difficult as well.

SUMMARY OF THE INVENTION

In view of the above-described conventional example, a first object of the present invention is to provide a rotation detecting apparatus which can suppress errors due to pitch variations in a simple arrangement and enhance the freedom degree for location of the head unit whereby a size reduction and a high resolution both can be attained at the same time, and to provide a scale therefor.

Other objects of the present invention will be apparent in the below description of embodiments.

BRIEF DESCRIPTION OF THE DRAWINGS

FIG. 51 is a layout of diffraction gratings in a head unit in the eleventh embodiment.

DESCRIPTION OF THE PREFERRED EMBODIMENTS

Figure 1A:
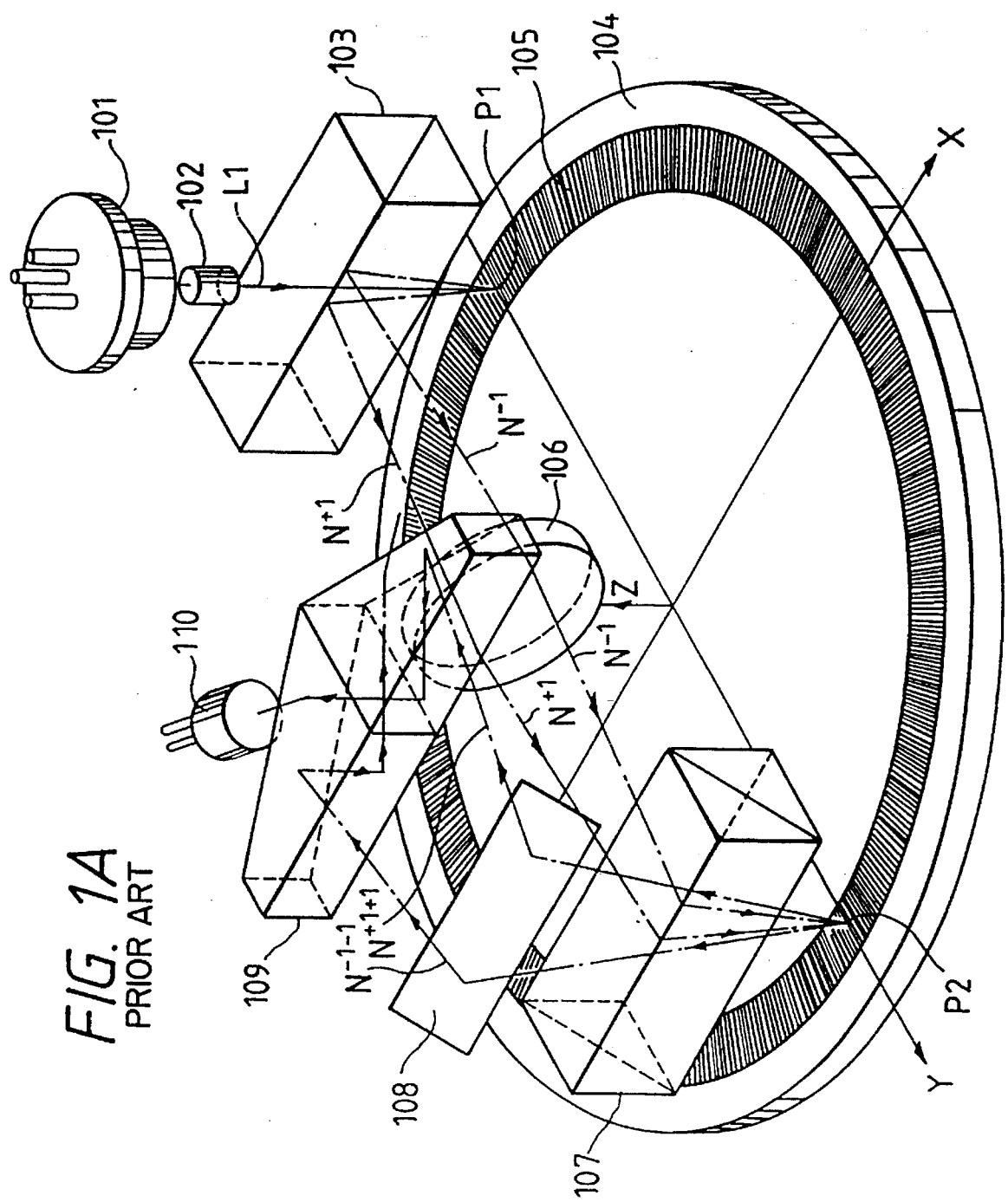
FIG. 1A is a perspective view to show an example of a conventional optical displacement measuring apparatus.
Figure 1B:
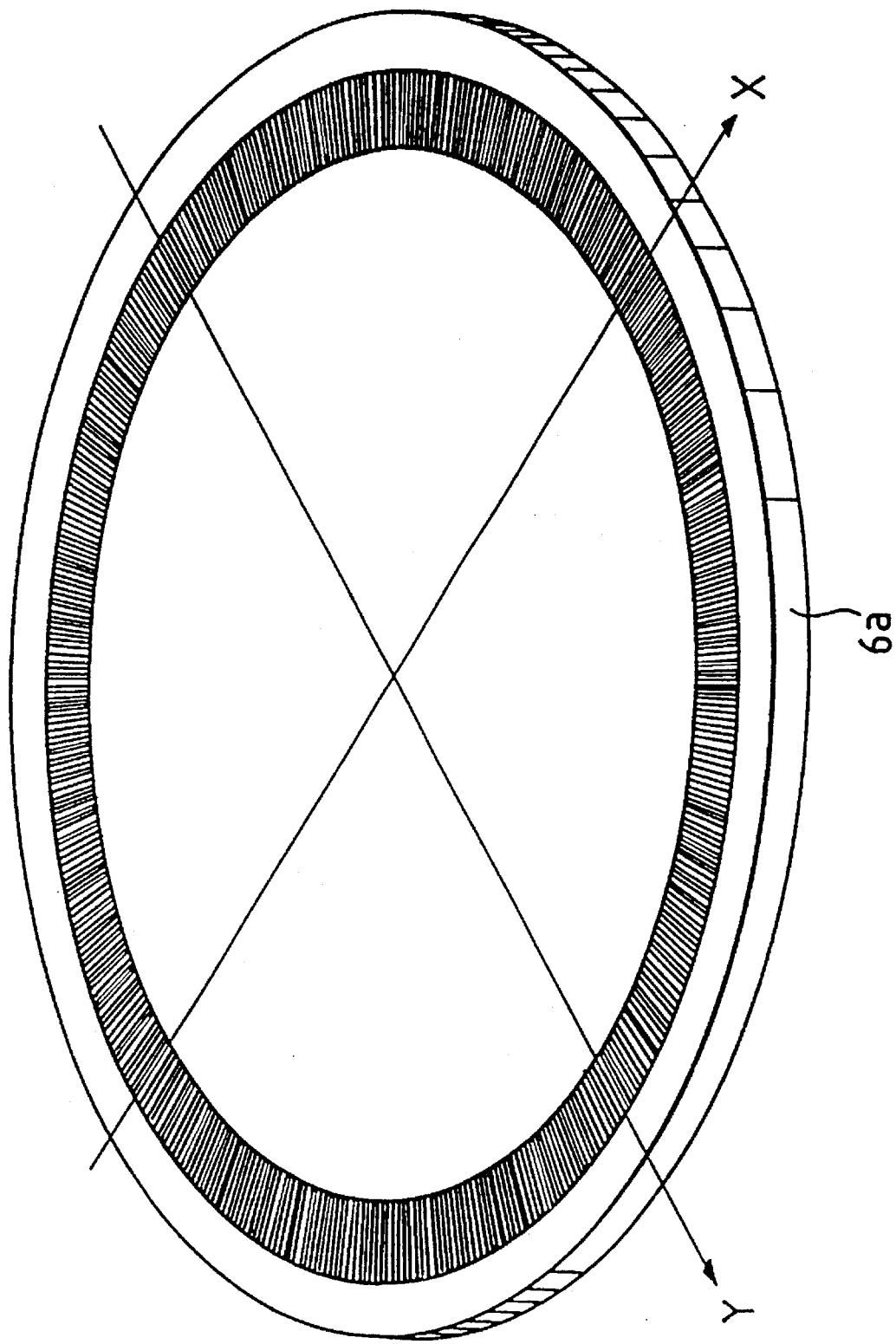
FIG. 1B is a drawing to show a conventional example of a scale.
Figure 2A:
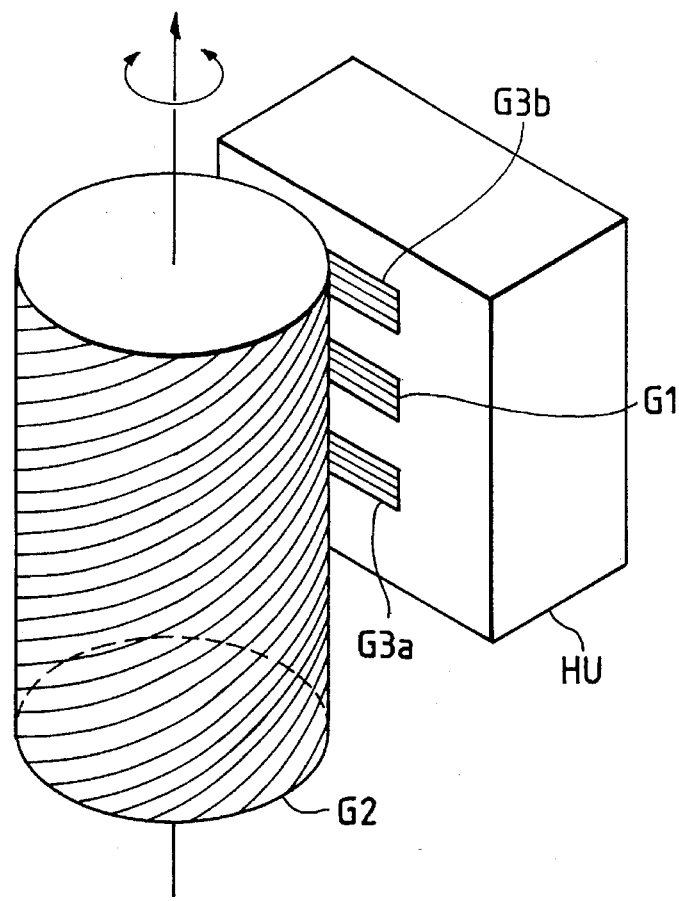
FIG. 2A is a perspective view to show an optical encoder in the first embodiment of the present invention.
Figure 2B:
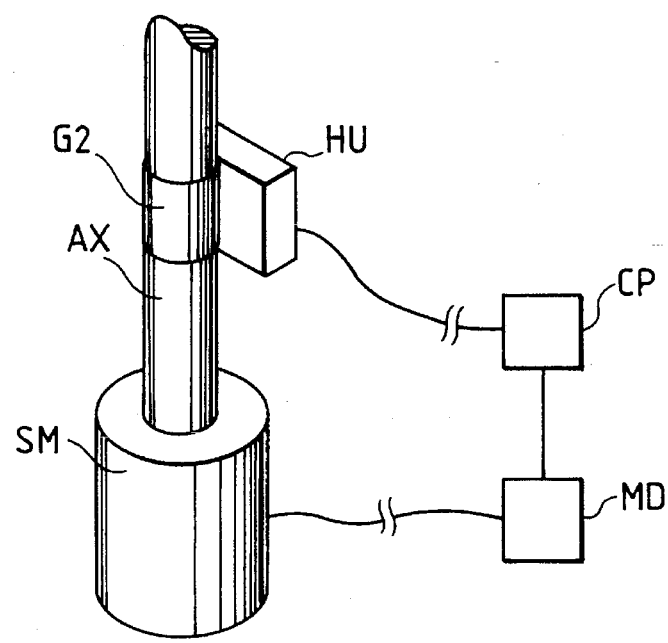
FIG. 2B is a schematic diagram to show a drive system using the first embodiment.
Figure 3:
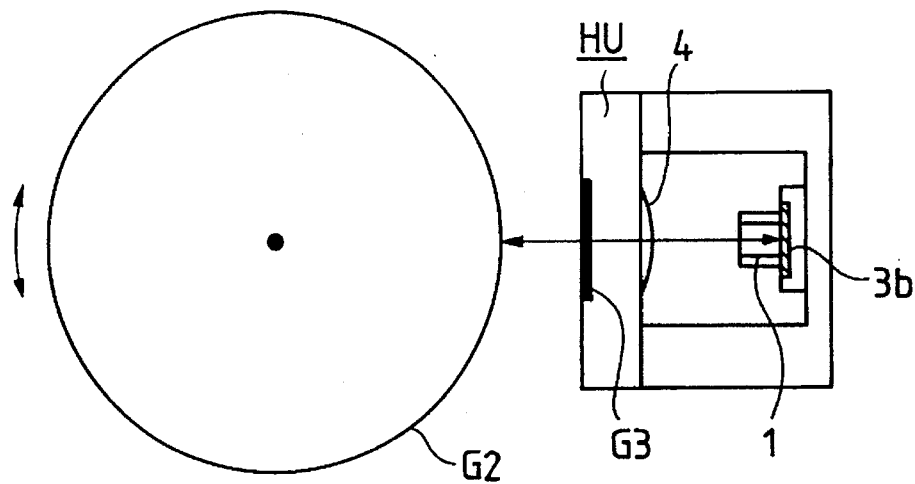
FIG. 3 is a top plan view with optical paths in the first embodiment.
Figure 4:
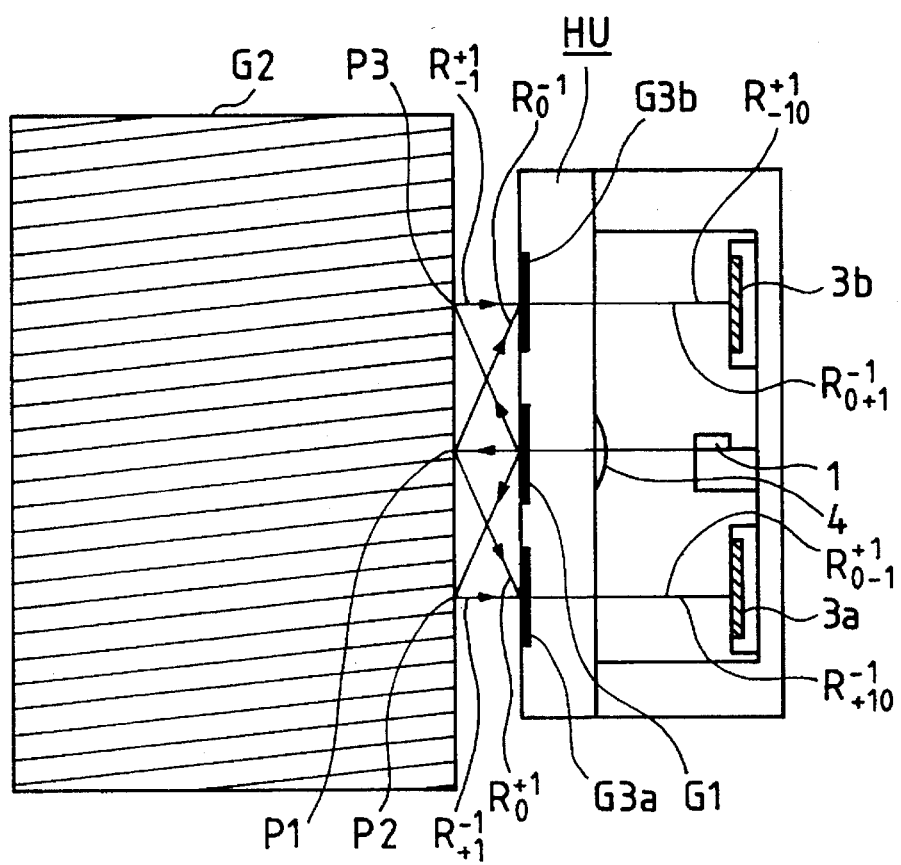
FIG. 4 is a side view with optical paths in the first embodiment.

FIG. 2A is a perspective view to show the structure of an optical encoder in the first embodiment of the present invention, FIG. 2B is a schematic diagram to show a driving system using it, FIG. 3 is a top plan view to show optical paths in the encoder, and FIG. 4 is a side view of the encoder. In the drawings, reference numeral 1 designates a light-emitting element, 3a, 3b light-receiving elements, G1 a diffraction grating for splitting a beam, G2 a diffraction grating as a scale for phase-modulating split beams, which includes a plurality of helices aligned in parallel in order or formed in a multiple-helix pattern on a cylindrical surface (hereinafter referred to as a cylindrical multi-helix grating), G3a, G3b diffraction gratings for synthesizing beams, 4 a collimator lens, and HU a head unit in which the light-receiving elements 3a, 3b and the diffraction gratings G1, G3a, G3b are incorporated in a united manner. Further, AX represents a drive shaft on which the diffraction grating G2 is provided, SM a servo motor for driving the shaft AX, MD a motor driver for controlling a drive of the servo motor SM, and CP a CPU for sending a control signal to the motor driver MD, based on an output signal including rotational displacement information from the head unit HU.

A divergent bundle of rays emitted from the light-emitting element 1 is collimated by the collimator lens 4 into a beam of substantially parallel rays, and the collimated beam is transmission-diffracted on the diffraction grating G1 to be divided into three beams of zeroth order diffraction light $R_0$, +first order diffraction light $R_{+1}$ and −first order diffraction light $R_{-1}$ outgoing therefrom.

The beam $R_0$ going straight ahead through the diffraction grating G1 is reflection-diffracted at a point P1 on the cylindrical multi-helix grating G2 to be separated into +first order diffraction light $R_0^{+1}$ and −first order diffraction light $R_0^{-1}$ as being phase-modulated. The phase of +first order diffraction light $R_0^{+1}$ is shifted by $+n\Theta$ while the phase of −first order diffraction light $R_0^{-1}$ by $-n\Theta$. Here, n is the number of multiple gratings in the cylindrical multi-helix grating and $\Theta$ a rotational angle (radian) of the cylindrical multi-helix grating.

The +first order diffraction light $R_0^{+1}$ is transmission-diffracted by the diffraction grating G3a to be split into zeroth order diffraction light $R_0^{+1}{}_0$, −first order diffraction light $R_0^{+1}{}_{-1}$ and other beams among which the −first order diffraction light $R_0^{+1}{}_{-1}$ goes out normal to the diffraction grating surface and a phase of wavefront thereof is $+n\Theta$.

The −first order diffraction light $R_0^{-1}$ is transmission-diffracted by the diffraction grating G3b to be split into zeroth order diffraction light $R_0^{-1}{}_0$, +first order diffraction light $R_0^{-1}{}_{+1}$ and other beams, among which the +first order diffraction light $R_0^{-1}{}_{+1}$ goes out normal to the diffraction grating surface. If the diffraction grating G3b is arranged to be shifted relative to G3a by $mP+P/4$ in the direction of grating arrangement, the phase of wavefront of $R_0^{-1}{}_{+1}$ is $-n\Theta+\pi/4$. Here, P is the pitch of gratings in the diffraction grating G3 and m an integer.

The beam $R_{+1}$ as +first-order-diffracted by the diffraction grating G1 is reflection-diffracted at a point P2 on the cylindrical multi-helix grating G2 to be split into −first order diffraction light $R_{+1}^{-1}$, zeroth order diffraction light $R_{+1}^{0}$ and other beams as phase-modulated. Among them, the phase of −first order diffraction light $R_{+1}^{-1}$ is shifted by $-n\Theta$ and it enters the diffraction grating G3a. Zeroth order diffraction light $R_{+1}^{0}{}_0$ goes out straight ahead through the diffraction grating G3a and the phase of wavefront thereof is $-n\Theta$.

The beam $R_{-1}$ as −first-order-diffracted by the diffraction grating G1 is reflection-diffracted at a point P3 on the cylindrical multi-helix grating G2 to be split into +first order diffraction light $R_{-1}^{+1}$, zeroth order diffraction light $R_{-1}^{0}$ and other beams as phase-modulated. Among them, the phase of +first order diffraction light $R_{-1}^{+1}$ is shifted by $+n\Theta$ and it enters the diffraction grating G3b. Zeroth order diffraction light $R_{-1}{}^{+1}{}_{0}$ goes out straight ahead through the diffraction grating G3b and the phase of wavefront thereof is $+n\Theta$.

The beams $R_{+1}{}^{-1}{}_{0}$ and $R_{0}{}^{+1}{}_{-1}$, optical paths of which are superimposed on each other in the diffraction grating G3a, become interference light to enter a photoelectric element 3a. The interference phase at this moment is as follows:

$$\{+n\Theta\}-\{-n\Theta\}=2n\Theta,$$

so that light and dark signals of 2n period are produced every rotation of the cylindrical multi-helix grating G2.

The beams $R_{-1}{}^{+1}{}_{0}$ and $R_{0}{}^{-1}{}_{+1}$, optical paths of which are superimposed on each other in the diffraction grating G3b, become interference light to enter a photoelectric element 3b. The interference phase at this moment is as follows:

$$\{+n\Theta\}-\{-n\Theta+\pi/4\}=2n\Theta-\pi/4,$$

so that light and dark signals of 2n period are produced every rotation of the cylindrical multi-helix grating G2. The timing of light and dark signals on the photoelectric element 4b is shifted a quarter period from that on the photoelectric element 4a.

Figure 5A:
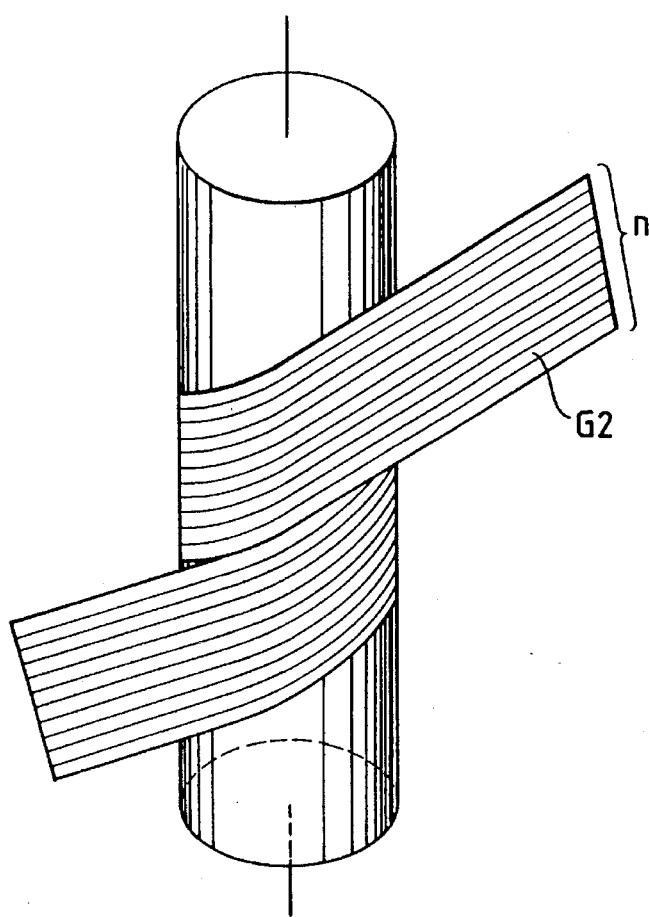
FIGS. 5A and 5B are explanatory drawings to show a multi-helix grating.
Figure 5B:
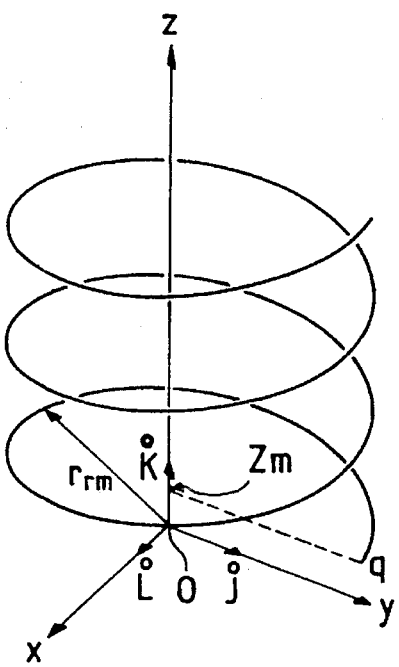

The cylindrical multi-helix grating G2 is constructed such that a grating sheet with n gratings arranged as shown in FIG. 5A is wound around a cylindrical rotating portion without a gap. The detailed shape of helices is described in the following. In FIG. 5B, let the center be at a point O, a starting point be at a point q, i, j, k be unit vectors in the x, y and z directions, respectively, a be a constant, and $\Theta$ be an angle from the starting point q in the x-y plane. Then a position vector rv of a helical curve on a cylindrical surface with radius r is expressed as follows:

$$rv = r \cdot \text{Cos}(\Theta) \cdot i + r \cdot \text{Sin}(\Theta) \cdot j + a \cdot \Theta \cdot k.$$

A locus of the above equation recorded on the cylindrical surface is shifted $a\Theta$ in the z direction every rotation of the cylinder. If there are n gratings interposed between the shift, a position vector of an m-th helical curve is expressed as follows:

$$rvm = r \cdot \text{Cos}(\Theta) \cdot i + r \cdot \text{Sin}(\Theta) \cdot j + (nP/(2\pi) + zm) \cdot \Theta \cdot k$$

where P is a pitch between gratings and zm a z-directional position of a starting end of the grating. Therefore, n gratings cross a point every rotation of the cylindrical helix grating in which the above helices are drawn.

As described previously, the present apparatus can produce the two types of light and dark signals of period 2n as shifted $\pi/4$ phase per rotation of the cylindrical helix grating relative to each other. Therefore, if a CPU as a signal processing circuit is used to produce pulse signals upon detection of rises and falls in each signal, 8n light and dark signals are obtained every rotation of the cylindrical helix grating. In this case, counting the pulse signals, rotation can be detected at a resolution of 360/8n (deg). Setting a large value for n, the rotation can be detected at a high resolution accordingly. Also, using the two periodic signals with a phase shift of $\pi/4$, a rotational direction can be detected by a well-known method in the CPU such as a signal processing circuit. Based on this signal, the servo motor SM is controlled by the CPU and motor driver MD.

Since the above embodiment includes the interference optical system as constructed in the very simple arrangement and the head unit constructed of the light-emitting source, the light-receiving elements and the lens, the number of components is small, assembly is easy and a size reduction is highly possible. Also, different from the conventional rotary encoders with gratings on a disk plate, the multi-helix grating is formed on the cylindrical surface, which can be made thinner or hollowed. This achieves a very compact rotary encoder easy in mounting.

Further, since the rotating unit is not a disk but cylindrical and the multi-helix diffraction grating is provided on its surface, the grating pitch is constant anywhere on the cylindrical grating, which makes the encoder free of influence of mounting accuracy such as offset of the rotating unit.

In addition, the direction of detection of grating displacement can be taken in the direction of generatrix of the circular cylinder as in the present embodiment, which enhances the degree of freedom of arrangement of the head unit.

Further, the present embodiment has the arrangement of optical system of three gratings. This arrangement has such a characteristic that when one of the three gratings is shifted one pitch in the grating arrangement direction, a light and dark signal of two cycles appears on the light-receiving element. In case of the present invention, the grating to be displaced is formed in a helical pattern on the cylindrical surface, forming the multi-helix grating. Then a rotation of the rotating unit relative to the head unit causes n gratings to appear to cross the front surface of the head unit. Accordingly, a rotary encoder with 2n pulses per rotation can be constructed, so that the resolution can be enhanced by setting a large value for n. Since the present embodiment is so arranged that the diffraction grating G3a and diffraction grating G3b in the head unit are shifted to each other by $mP+P/4$ in the direction of grating arrangement, outputs can be obtained with a shift $\pi/4$ of signal timing, whereby further higher division can be possible by the previously described signal processing.

Figure 6:
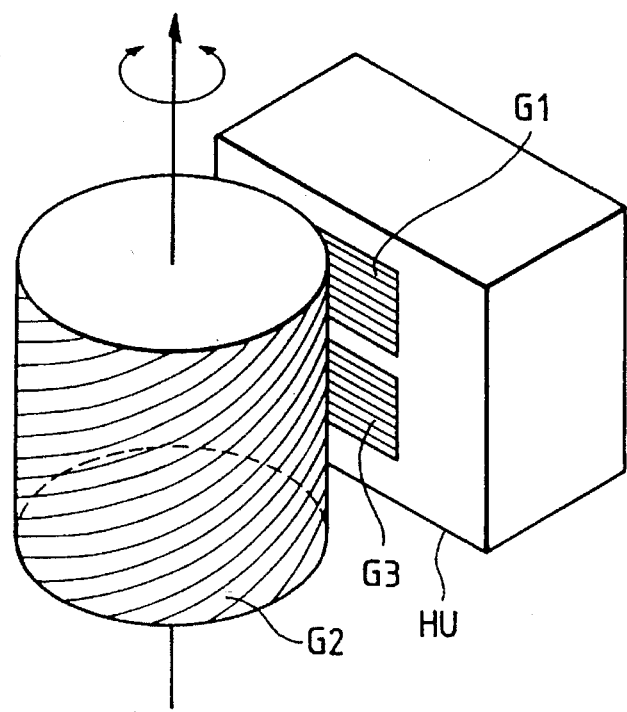
FIG. 6 is a perspective view to show an optical encoder in the second embodiment of the present invention.
Figure 7A:
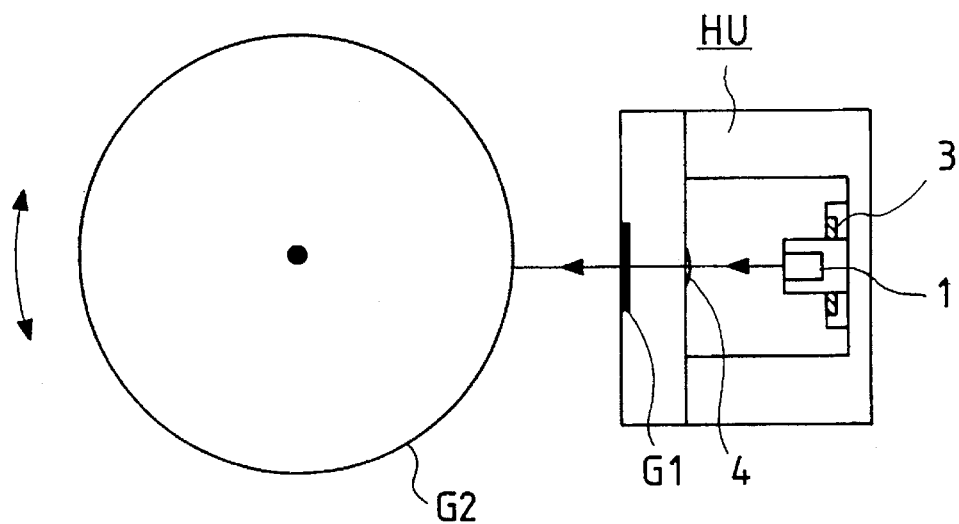
FIG. 7A is a top plan view with optical paths in the second embodiment.
Figure 7B:
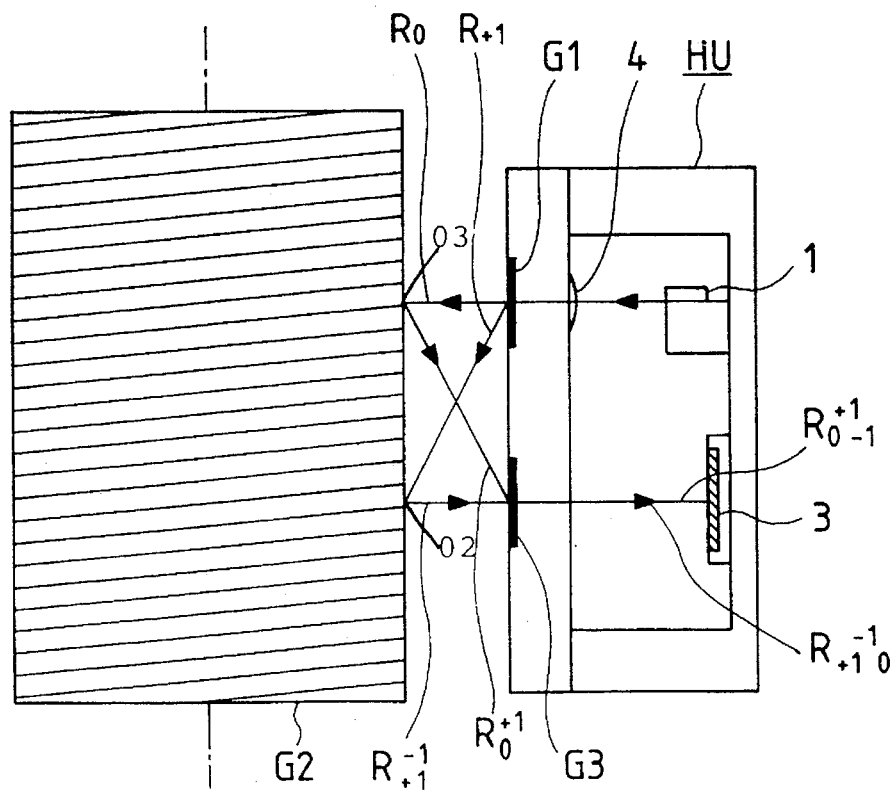
FIG. 7B is a side view with optical paths in the second embodiment.

FIG. 6 is a perspective view to show the structure of an optical encoder in the second embodiment of the present invention, FIG. 7A is a top plan view to show optical paths thereof, and FIG. 7B is a side view thereof. In the following description same members as those in the previous embodiment will be denoted by same reference numerals. In the drawings numeral 3 designates a light-receiving element and G3 a diffraction grating for synthesizing beams. The present embodiment is arranged to have just one diffraction grating for synthesizing beams and one light-receiving element. Since the driving system in the following embodiments is the same as that in the previous embodiment, description is omitted therefor.

A divergent bundle of rays emitted from a light-emitting element 1 is collimated by a collimator lens 4 to become a beam of approximately parallel rays and the collimated beam is split into +first order diffraction light $R_{+1}$ and zeroth order diffraction light $R_0$ on a diffraction grating G1.

The +first order diffraction light $R_{+1}$ impinges on a point O2 on a cylindrical multi-helix grating G2 and is reflection-diffracted thereby to be split into -first order diffraction light $R_{+1}^{-1}$ and other beams. Here, letting n be the number of multiple gratings in the cylindrical multi-helix grating and $\Theta$ be a rotational angle (radian) of the cylindrical multi-helix grating, a phase shift of the -first order diffraction light $R_{+1}^{-1}$ is $-n\Theta$. Also, the zeroth order diffraction light $R_0$ impinges on a point O3 on the cylindrical multi-helix grating G2 and is reflection-diffracted to be split into +first order diffraction light $R_0^{+1}$ and other beams. Here, a phase shift of the +first order diffraction light $R_0^{+1}$ is $n\Theta$. The –first order diffraction light $R_{+1}^{-1}$ is incident into the diffraction grating G3 and is transmission-diffracted thereby to be split into zeroth order diffraction light $R_{+1}^{-1}{}_0$ and other beams. The +first order diffraction light $R_0^{+1}$ is incident into the diffraction grating G3 and is transmission-diffracted to be split into –first order diffraction light $R_0^{+1}{}_{-1}$ and other beams. Among the transmission-diffracted beams, the beams $R_{+1}^{-1}{}_0$ and $R_0^{+1}{}_{-1}$, optical paths of which are superimposed on each other, enter the light-receiving element 3 in the form of interference light. An interference phase at this moment is as follows:

$$n\Theta - (-n\Theta) = 2n\Theta.$$

A light and dark signal of 2n period appears every rotation ($\Theta=2\pi$) of the cylindrical multi-helix grating. This signal is processed by an unrepresented signal processing circuit, whereby rotation of the cylindrical multi-helix grating can be measured at a resolution of 360/2n (deg).

Since the second embodiment is constructed of an optical system including half of the optical paths as compared with the first embodiment, the arrangement is very simple and the size can be smaller. Also, because the interference region is within a pair of beams, a stable interference state can be achieved, whereby a signal output can be attained with stable amplitude and phase difference of output signals.

Figure 8A:
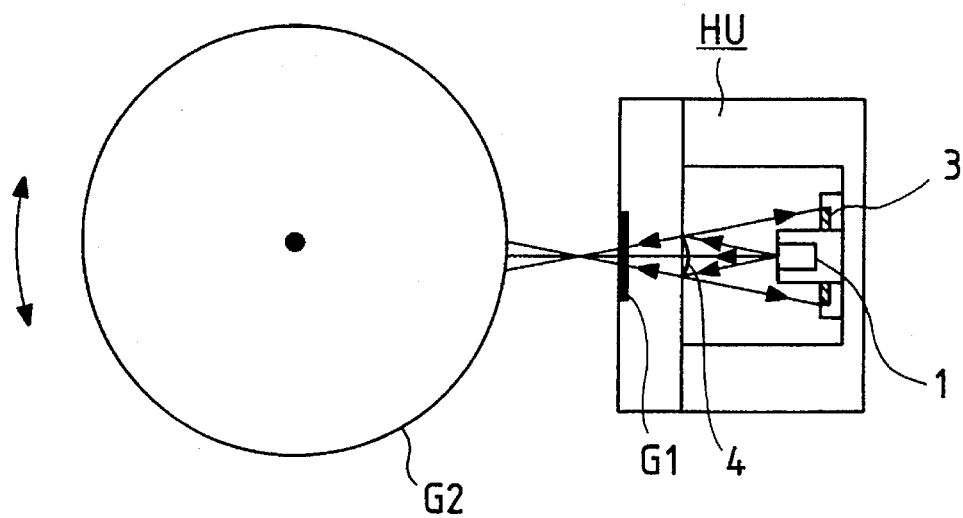
FIGS. 8A and 8B are explanatory drawings to show a modification of the second embodiment.
Figure 8B:
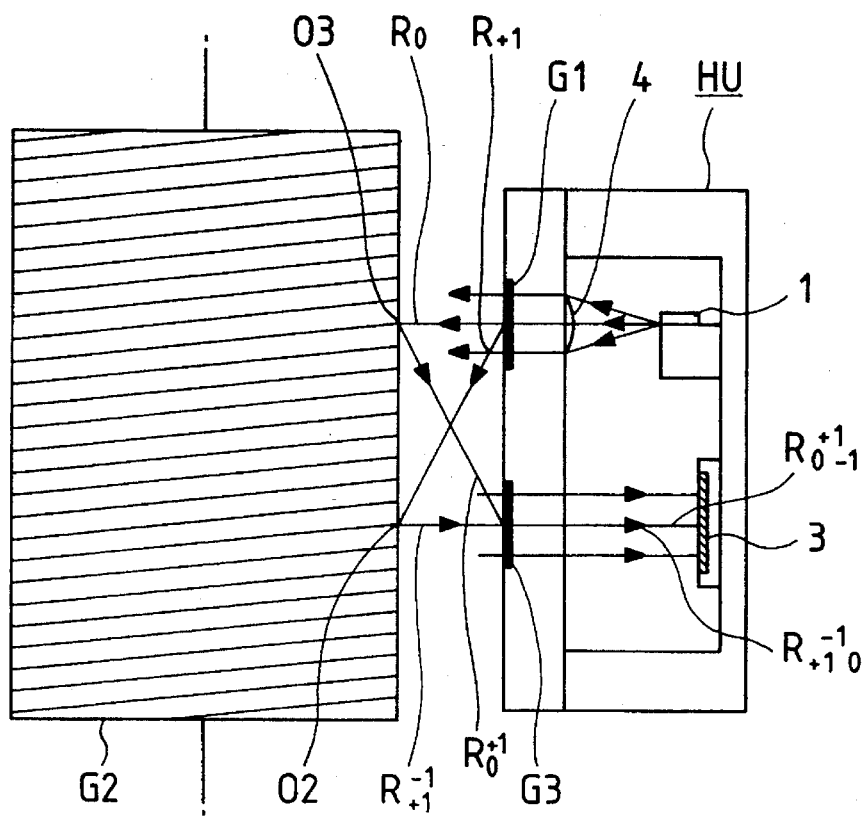

FIG. 8A and FIG. 8B show a modification of the above second embodiment, in which an optical system is so arranged that a beam emitted from a light-emitting element is converged at an intermediated point in an optical path from a diffraction grating G1 for splitting the beam in the in-plane direction on FIG. 8A but letting the beam travel in parallel in the in-plane direction on FIG. 8B, to a diffraction grating G3 for synthesizing beams. By this arrangement, the interference light reaching a sensor becomes not so dependent on mounting conditions of the head unit, whereby a head unit easy in mounting and stable in output signal can be obtained.

Figure 9:
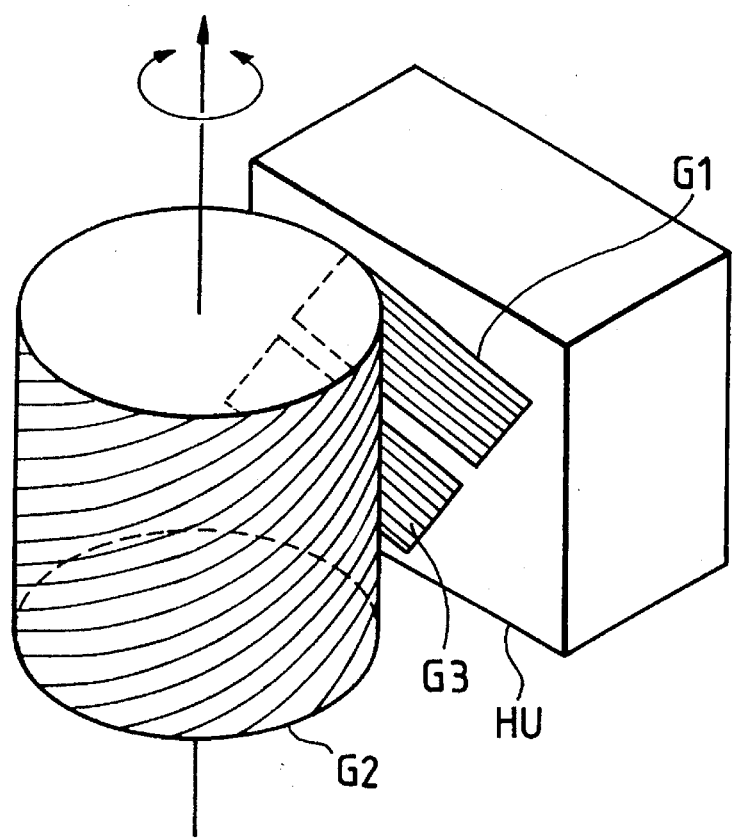
FIG. 9 is a perspective view to show an optical encoder in the third embodiment of the present invention.
Figure 10:
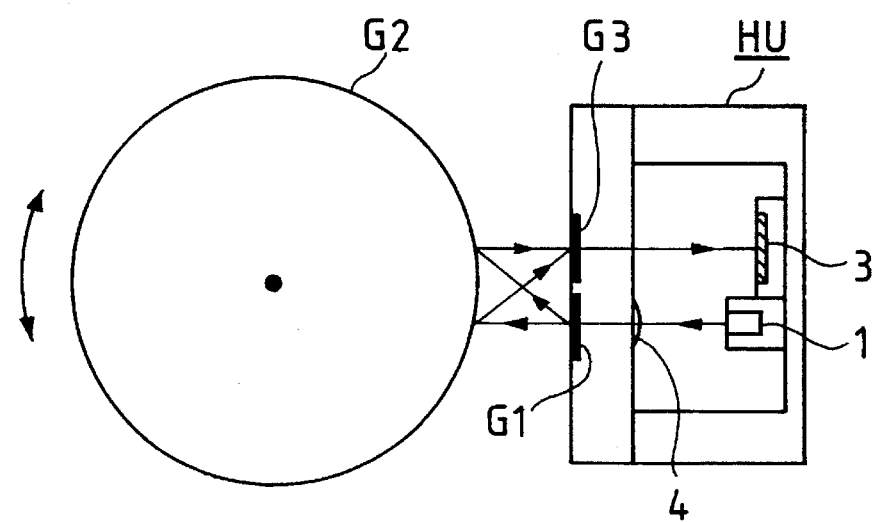
FIG. 10 is a top plan view with optical paths in the third embodiment.
Figure 11:
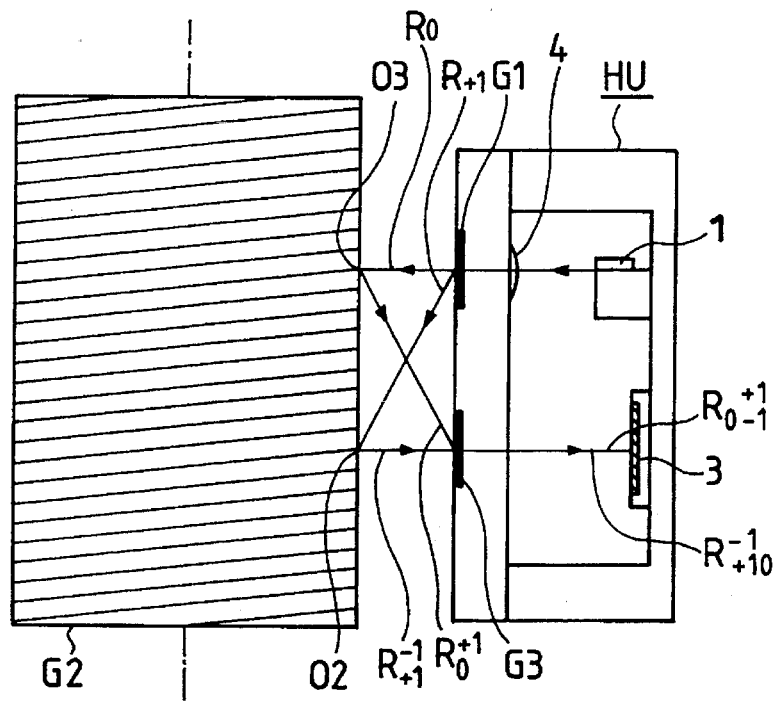
FIG. 11 is a side view with optical paths in the third embodiment.

FIG. 9 is a perspective view to show the structure of an optical encoder in the third embodiment of the present invention, FIG. 10 is a top plan view to show optical paths thereof and FIG. 11 is a side view thereof. In the present embodiment, diffraction gratings G1, G3 are so arranged in orientation of gratings that when a head unit HU is opposed to a cylindrical multi-helix grating G2, the direction of grating lines in the cylindrical multi-helix grating G2 is coincident (parallel) with the direction of grating lines in the diffraction gratings G1, G3 in the head unit HU. The other arrangement is the same as in the second embodiment.

Since in the present embodiment the direction of grating lines in the cylindrical multi-helix grating G2 is coincident with the direction of grating lines in the diffraction gratings G1, G3 in the head unit, two beams to be synthesized into interference signal light can be perfectly overlaid, achieving a rotary encoder easy in mounting, which can detect signals of stable output amplitude and phase.

Before describing the fourth embodiment, the principle of the fourth embodiment will be described with drawings.

Figure 12:
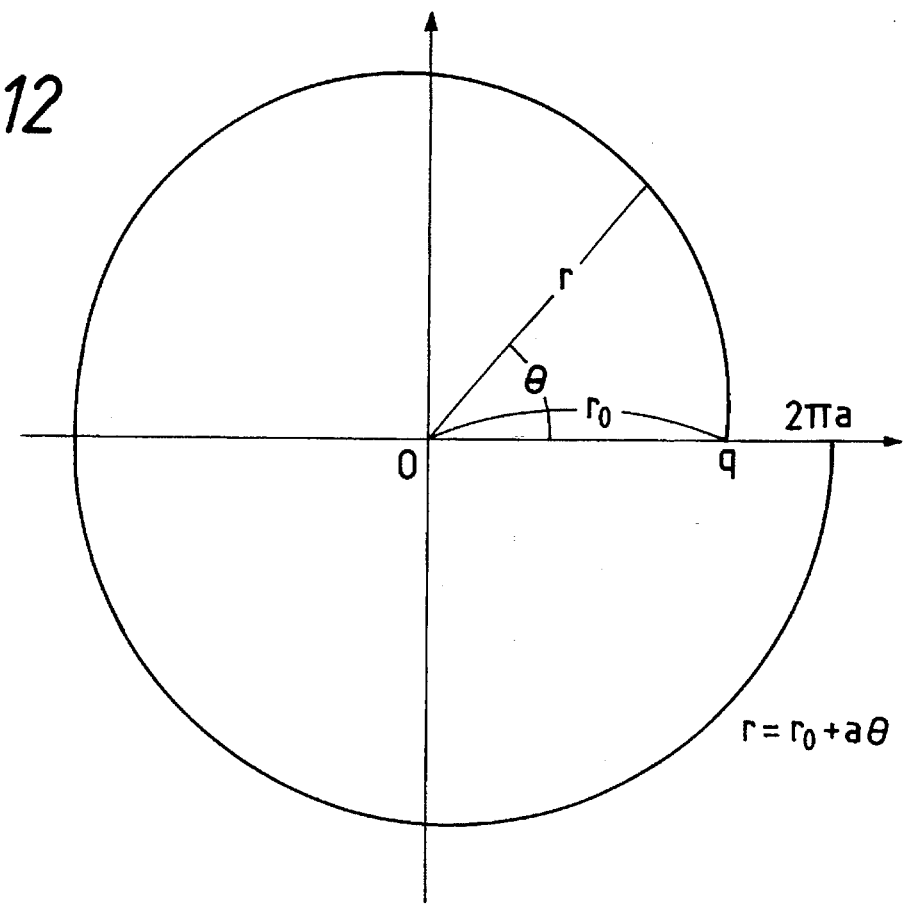
FIG. 12 is a drawing to show an example in which a single helix is drawn on a disk.

Referring to FIG. 12, let us consider a helical curve with radius r at center angle $\Theta$ as expressed by $r=r0+a\Theta$ when the center is at point O and a starting point is at point q. In the relation, r0 is an initial value at $\Theta=0$ and a is a constant. This curve is $r=r0+2\pi a$ when $\Theta=2\pi$. Thus, when a rotary disk on which this curve is recorded is given a clockwise rotation, a position on the curve is shifted $2\pi a$ outwardly in the radial direction.

Figure 13:
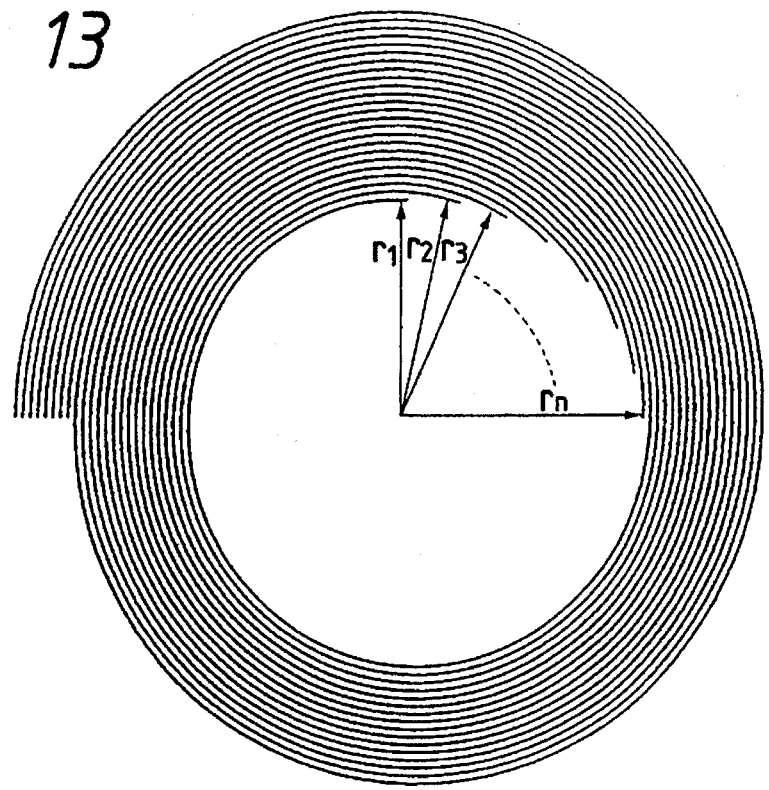
FIG. 13 is a drawing to show an example in which multiple helices are drawn on a disk.

If n helices with initial values different in p in the radial direction are drawn as to satisfy $a=np/2\pi$ as shown in FIG. 13, equations for the helices are as follows:

$$r1 = r01 + a\theta$$
$$r2 = r02 + a\theta$$
$$= r01 + p + a\theta$$
$$r3 = r03 + a\theta$$
$$= r01 + 2p + a\theta$$
$$\ldots$$
$$rm = r01 + (m-1)p + a\theta$$
$$\ldots$$
$$rn = r01 + (n-1)p + a\theta$$

(where r01 is an initial value for a helix r1 at $\Theta=0$). When this disk on which the helices are drawn is given a clockwise rotation, n parallel curves move outwardly in the radial direction. If a detection head is arranged with a diffraction grating having the direction of grating arrangement parallel to the helical grating, a rotational angle $\Theta$ can be detected by detecting movement of the helical grating relative to a selected position opposed thereto using interference.

Figure 14:
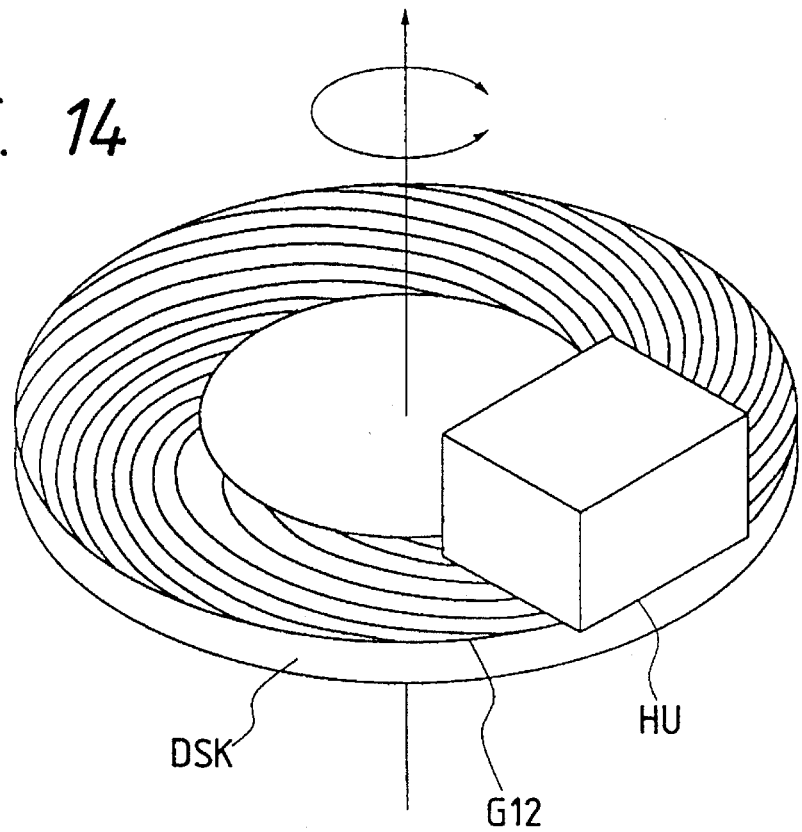
FIG. 14 is a perspective view to show an optical encoder in the fourth embodiment of the present invention.
Figure 15:
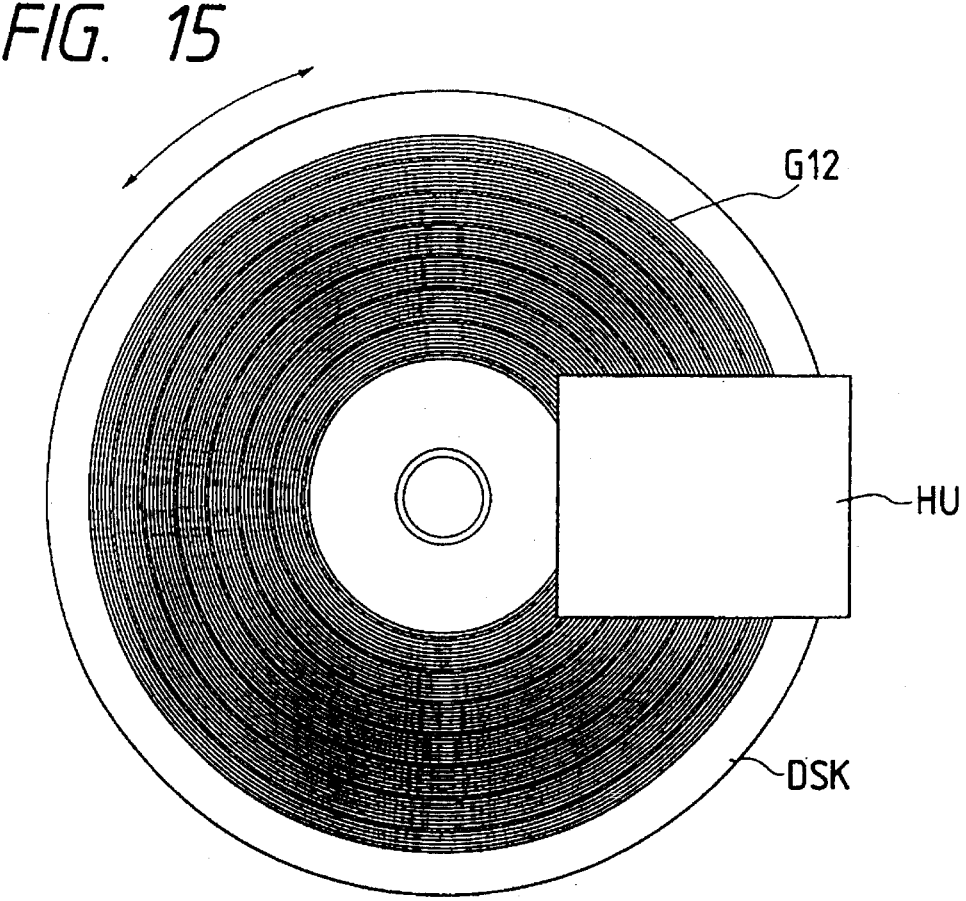
FIG. 15 is a top plan view with optical paths in the fourth embodiment.
Figure 16:
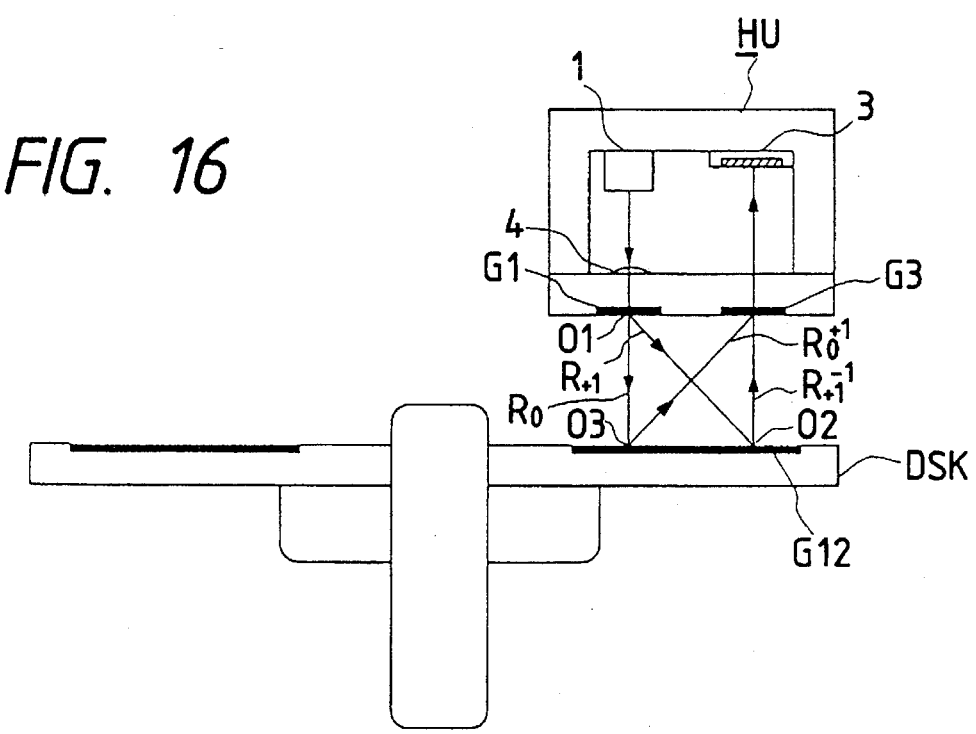
FIG. 16 is a side view with optical paths in the fourth embodiment.

FIG. 14 is a perspective view to show the structure of an optical encoder in the fourth embodiment of the present invention, FIG. 15 is a top plan view to show optical paths thereof, and FIG. 16 is a side view thereof. In the drawings, G12 is a grating of multiple helices (hereinafter referred to as a disk multi-helix grating) in such a pattern that n helices different in a constant initial value in the radial direction as shown in FIG. 13 are drawn to satisfy $a=np/2\pi$ on the surface of disk DSK.

A divergent bundle of rays emitted from a light-emitting element 1 is adjusted into a properly condensed beam by a lens 4 and the condensed beam is split on a diffraction grating G1 into +first order diffraction light $R_{+1}$ and zeroth order diffraction light $R_0$.

The +first order diffraction light $R_{+1}$ impinges on a point O2 on the disk multi-helix grating G12 and is reflection-diffracted to be split into –first order diffraction light $R_{+1}^{-1}$ and other beams. Here, let n be the number of multiple gratings in the disk multi-helix grating and $\Theta$ be a rotational angle (radian) of the disk multi-helix grating. Then a movement amount of grating lines at point O2 is $n\Theta/2\pi$ pitch and a phase shift of the –first order diffraction light $R_{+1}^{-1}$ there is $-n\Theta$. Also, the zeroth order diffraction light $R_0$ impinges on a point O3 on the disk multi-helix grating G12 and is reflection-diffracted there to be split into +first order diffraction light $R_0^{+1}$ and other beams. A phase shift of the +first order diffraction light $R_0^{+1}$ there is $n\Theta$. The –first order diffraction light $R_{+1}^{-1}$ is incident into a diffraction grating G3 and transmission-diffracted to be split into zeroth order diffraction light $R_{+1}^{-1}{}_0$ and other beams. A movement amount of grating lines at point O3 is $n\Theta/2\pi$ pitch. The +first order diffraction light $R_0^{+1}$ is incident into the diffraction grating G3 and is transmission-diffracted thereby to be split into –first order diffraction light $R_0^{+1}{}_{-1}$ and other beams. Among the transmission-diffracted beams, the beams $R_{+1}^{-1}{}_0$ and $R_0^{+1}{}_{-1}$, optical paths of which are superimposed on each other, enter a light-receiving element 3 in the form of interference light. An interference phase at this moment is as follows:

$$n\Theta - (-n\Theta) = 2n\Theta.$$

Thus, a light and dark signal of 2n period appears every rotation (Θ=2π) of the disk multi-helix grating.

Since the above fourth embodiment is arranged with the interference optical system very simple in structure and the head unit constructed of the light-emitting source, the diffraction gratings, the lens and the light-receiving element, the number of components is small, assembling is easy and a size reduction is possible, enabling to obtain a millimeter-size apparatus.

Also, the disk multi-helix grating has no spacing change of pitch between on the inner side and on the outer side, different from the radial grating having the spacing change, so that the pitch can be kept constant at two separate points in the radial direction on the disk where the detection head is to read. Then the apparatus can employ a detection head comprising an optical system of a type in which a rotation information signal is obtained by interference between diffraction beams appearing from two different points in the radial direction as in the present embodiment. Further, the direction of grating displacement detection can be taken in the radial direction of disk as in the present embodiment, giving a high degree of freedom to the location of head unit.

The pitch of diffraction gratings G1, G3 built in the used optical head can be equal to that of the helical grating.

Also, the resolution can be enhanced by increasing the number n of multi-helix gratings recorded on the disk.

The present embodiment employs the arrangement of the interference optical system composed of the diffraction gratings G1, G12, G3. This arrangement is characteristic in that a light and dark signal of two periods appears on the light-receiving element whenever one out of the three gratings is shifted one pitch in the direction of grating arrangement, as described previously. This displacing grating is formed in a helical pattern on a disk and is a multi-helix grating. Then, with a rotation of the rotating portion relative to the head unit, n gratings appear to cross the front surface of the head unit. Accordingly, such a rotary encoder can be constructed that it outputs a sinusoidal signal of 2n period per rotation, whereby high resolution can be possible as being a double of the number of gratings in the multi-helix grating.

In the above equations of helices, the value of a and the value of p can be arbitrarily changed depending upon a resolution required by the encoder, which gives a higher degree of freedom to designing and which permits designing for multiple purposes. Specifically, even if p is rough but if a is large, a sufficient number of moving helical gratings per rotation can be attained thereby to enhance the resolution. That is, a combination of p with a can achieve a rotary encoder with arbitrary resolution.

Although the above first to fourth embodiments concerned the rotary encoders utilizing diffraction interference of light, the present invention can be applied to rotary encoders of the slit method not using the diffraction interference, i.e., a method utilizing an increase or decrease in quantity of transmission light by superposition or shift of a plurality of grating series. Further, the above embodiments showed the rotary encoders of the light diffraction interference method using the three diffraction gratings G1, G2, G3, but the present invention can be applied to rotary encoders of a diffraction interference method other than the type of three diffraction gratings, for example a method in which another optical element (such as a prism or a mirror) replaces the diffraction grating G1, G3.

As described above, the use of helical grating as the grating enables rotation detection without pitch change as observed with the radial gratings, without any specific limitation on the reading position in the radial direction of the detection head unit even in the simple arrangement, with higher degree of freedom of location of the head unit, and with compatibility of size reduction and resolution increase.

Figure 17:
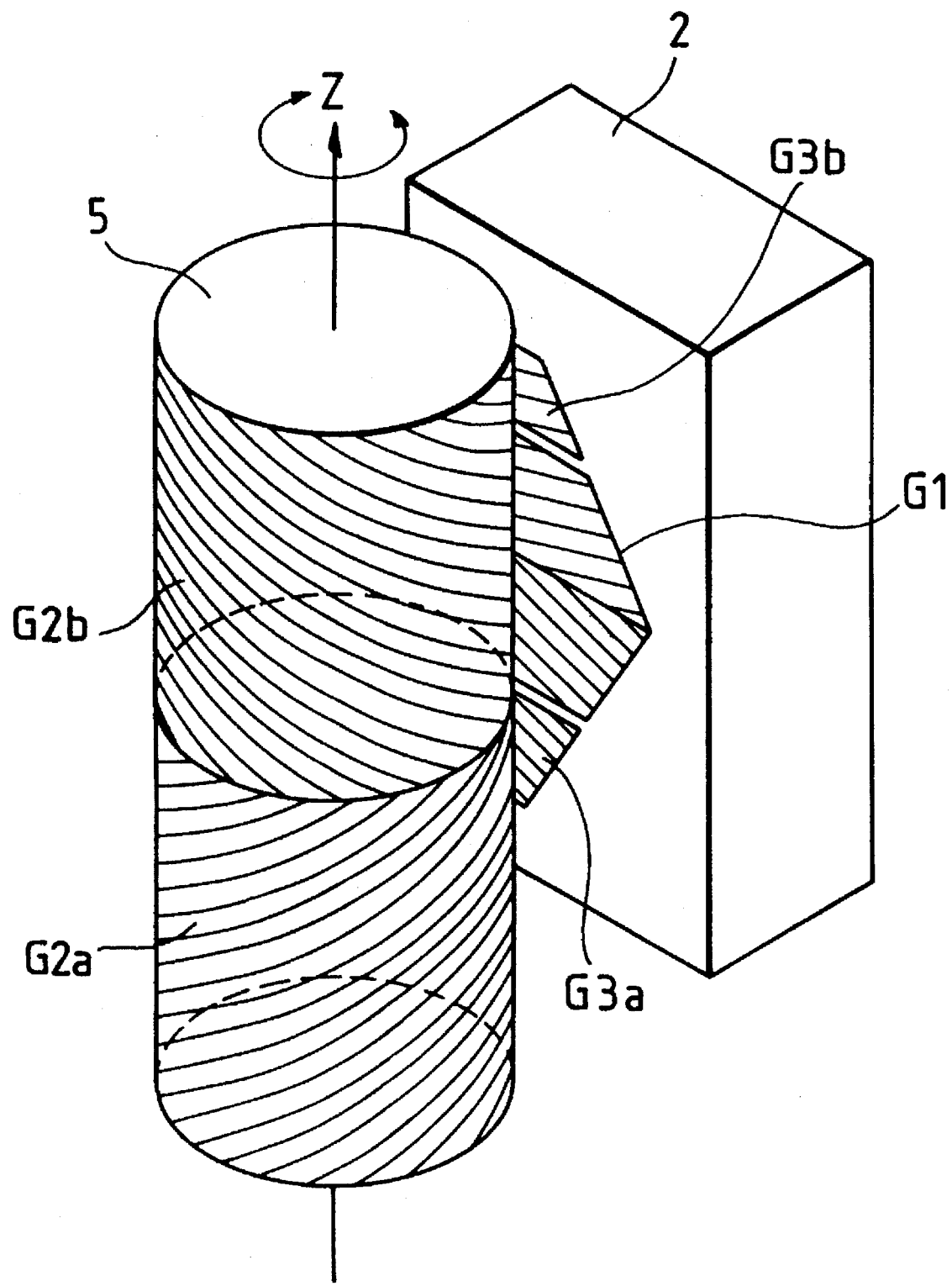
FIG. 17 is a perspective view to show the major part of an optical displacement measuring apparatus showing the fifth embodiment of the present invention.
Figure 18:
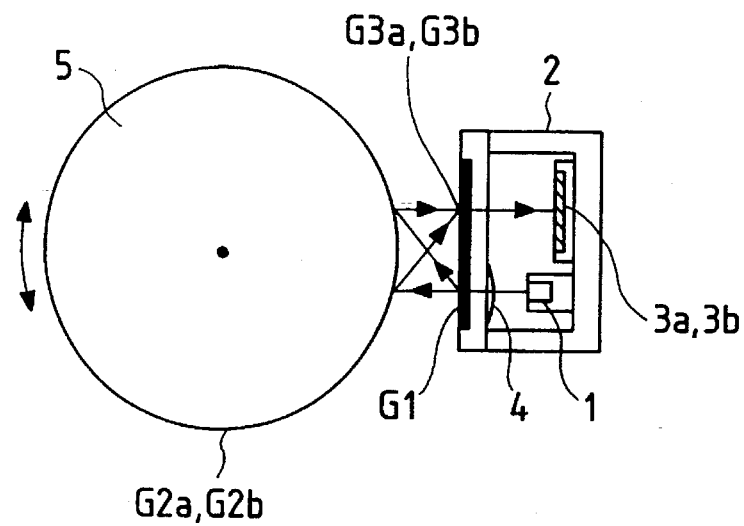
FIG. 18 is a top plan view with optical paths in the fifth embodiment.
Figure 19:
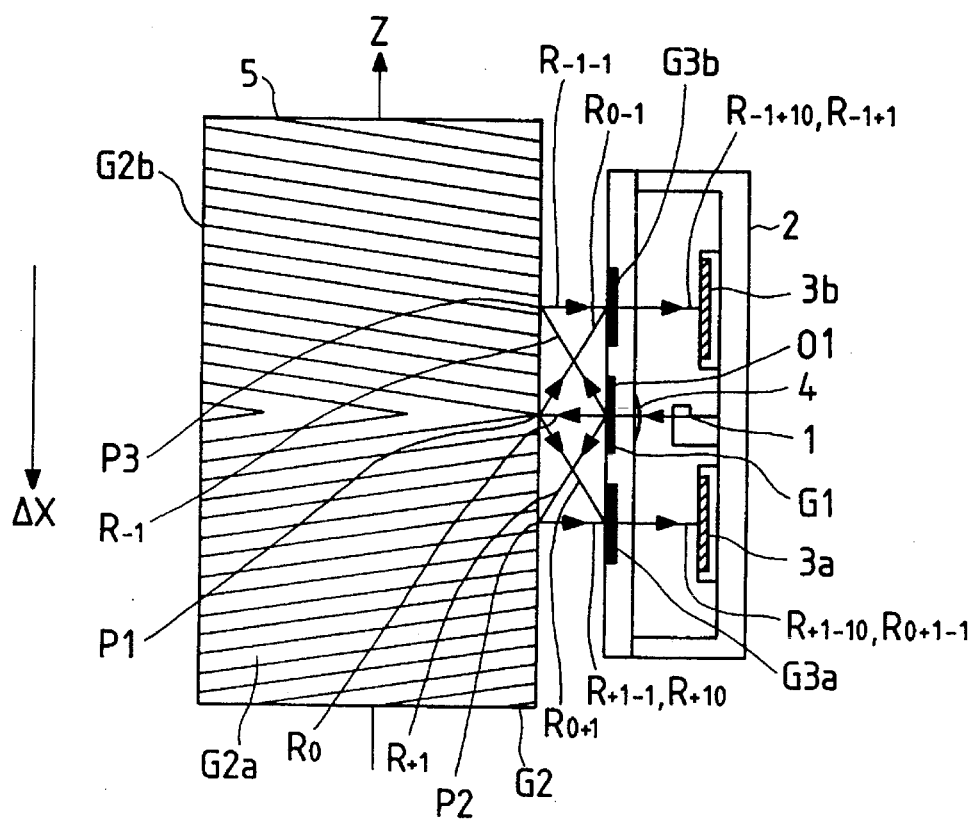
FIG. 19 is a side view of FIG. 18.
Figure 20:
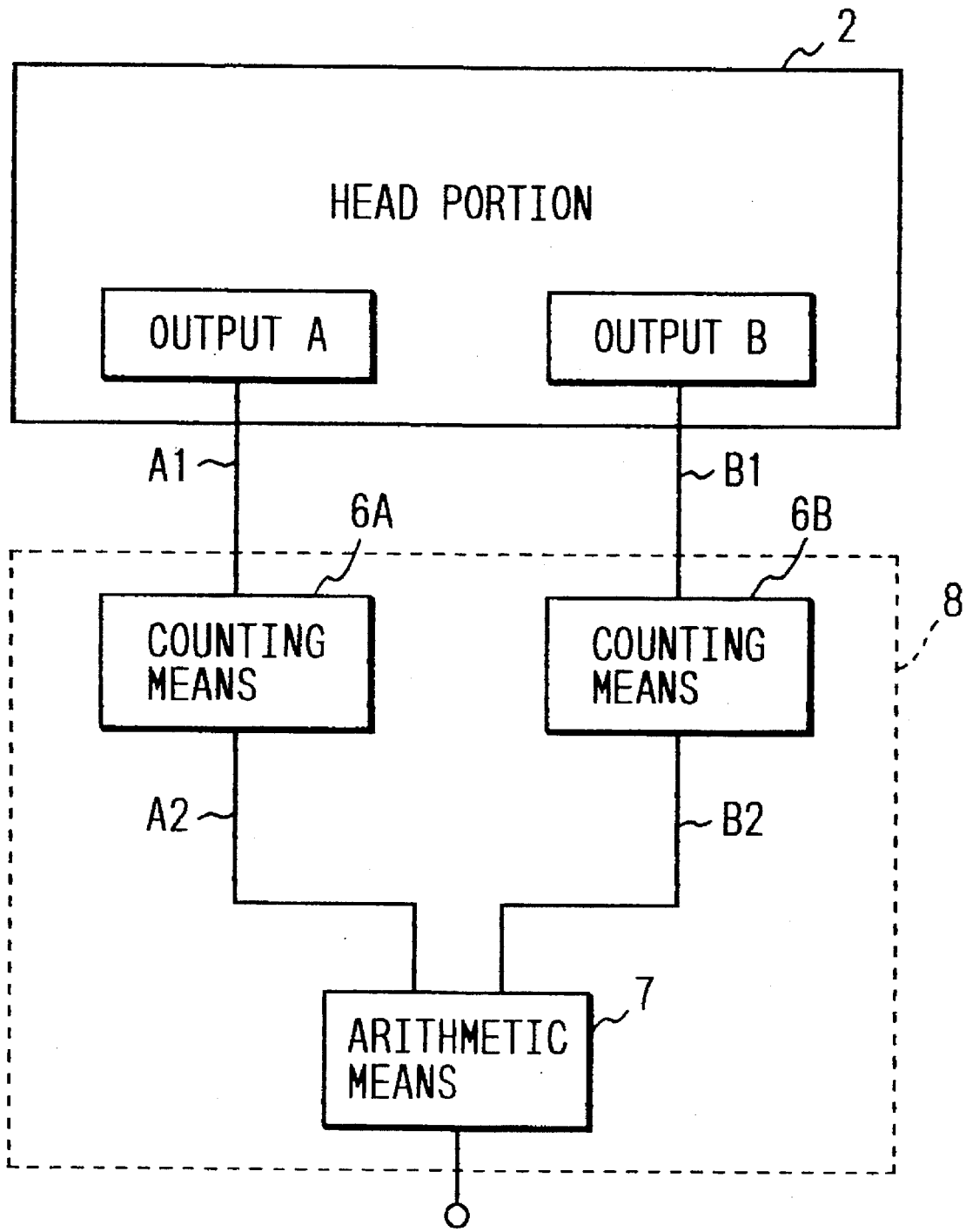
FIG. 20 is a circuit diagram to show a signal processing circuit in the fifth embodiment.

FIG. 17 is a perspective view of the main part to show the fifth embodiment of optical displacement measuring apparatus, FIG. 18 a plan view to show optical paths thereof, FIG. 19 a side view thereof and FIG. 20 a circuit diagram to show a processing circuit for output signals.

In FIG. 17 to FIG. 20, numeral 2 designates a head unit, which houses a light-emitting element 1, light-receiving elements 3a, 3b, and a collimator lens 4 for receiving light from the light-emitting element 1 in a predetermined positional relation. On a surface of the head unit 2 there are formed a first diffraction grating G1 for splitting a collimated bundle of rays from the collimator lens 4 and third diffraction gratings G3a, G3b for synthesizing reflected beams. G2a, G2b are second diffraction gratings (hereinafter referred to as cylindrical multi-helix grating) formed separately and independently of each other on a surface of a rotating cylinder 5 as a rotating body and having different arrangement directions from each other. The diffraction grating G1 is also separated into two regions in the Z direction, as shown in FIG. 17, in which diffraction gratings are formed in parallel and at equal intervals to the respectively opposing diffraction gratings G2a, G2b.

Figure 21:
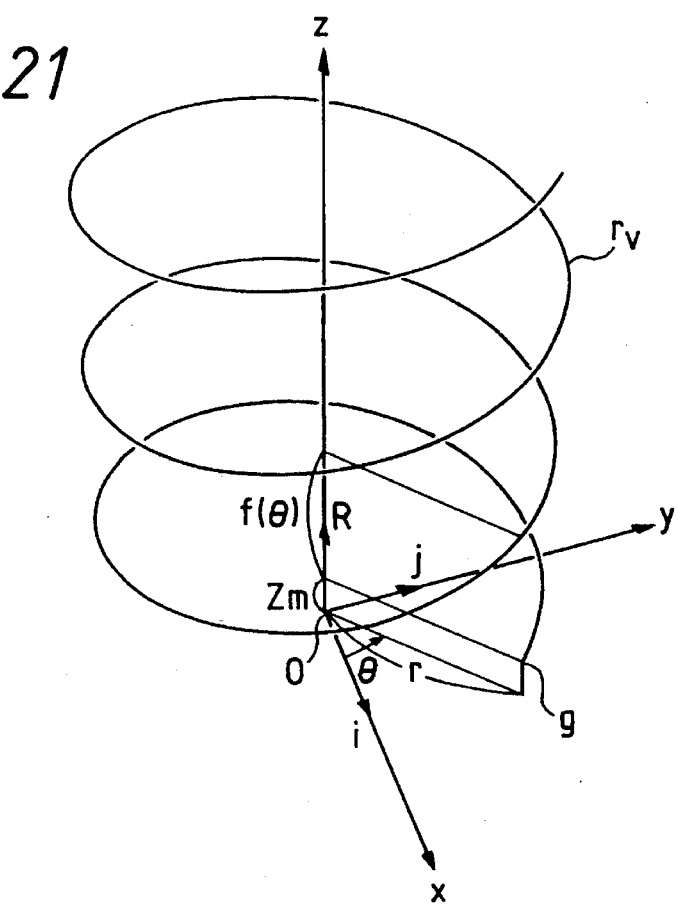
FIG. 21 is a drawing to show a helical shape of a cylindrical multi-helix grating.

A profile of a helix in the above cylindrical multi-helix grating G2 is next described in detail referring to FIG. 21. Letting the center be at point O and a starting point be at point q, a position vector $r_V$ of a helical curve formed on the surface of cylinder 5 with radius r can be expressed as follows:

$$r_V = r \cos(\Theta)i + r \sin(\Theta)j + f(\Theta)k$$

where i, j, k are unit vectors in the x, y, and z directions, respectively, Θ an angle from the starting point q in the x-y plane, and f(Θ) a linear function of angle Θ.

A locus of the above equation is shifted by the linear function f(Θ) in the z direction every rotation of the rotating cylinder 5. Supposing there are n grating lines in the cylindrical multi-helix grating G2 in the space, and letting P be the pitch of gratings and $z_m$ be a position of start of a position vector $r_{Vm}$ of an m-th helical curve in the z direction, the position vector $r_{Vm}$ is as follows:

$$r_{Vm} = r \cos(\Theta)i + r \sin(\Theta)j + (nP'\Theta/(2\pi) + zm)k \text{ where } P' = P/(1-(nP/(2\pi r))^2)^{1/2}.$$

It appears that n gratings move in the grating arrangement direction every rotation of the above cylindrical multi-helix grating G2. As a result, the position of ±first order diffraction light reflection-diffracted by the cylindrical multi-helix grating G2 is shifted by ±2πn. Namely, a phase shift with rotation of angle Θ is ±nΘ.

If the cylindrical multi-helix grating G2 is shifted by Δz in the z direction (the rotational direction) for some reason, Δz/P' gratings must have moved in the grating arrangement direction. A phase of ±first order diffraction light reflection-diffracted by the cylindrical multi-helix grating G2 is as follows:

$$\pm 2\pi \Delta z/P'.$$

Namely, when the cylindrical multi-helix grating G2 is rotated by an angle Θ to cause a shift of Δz in the z direction, a phase of ±first order diffraction light reflection-diffracted by the cylindrical multi-helix grating G2 is as follows:

$$\pm\{n\Theta+2\pi\Delta z/P'\}.$$

The principle of the fifth embodiment is next described. A divergent bundle of rays emitted from the light-emitting element 1 is collimated by the collimator lens 4 to become a beam of nearly parallel rays and is transmission-diffracted at point O1 on the diffraction grating G1 to be split into three beams of zeroth order diffraction light $R_0$, +first order diffraction light $R_{+1}$ (diffraction light in the lower region of diffraction grating G1) and −first order diffraction light $R_{-1}$ (diffraction light in the upper region of diffraction grating G1) outgoing therefrom. Since −first order diffraction light in the lower region of diffraction grating G1 and +first order diffraction light in the upper region in FIGS. 17, 19 travel in respective directions irrespective of measurement, they are ignored.

The zeroth order diffraction light $R_0$ traveling straight ahead through the diffraction grating G1 is reflection-diffracted at point P1 on the cylindrical multi-helix grating G2 to be split into +first order diffraction light $R_{0+1}$ and −first order diffraction light $R_{0-1}$ as phase-modulated. The phase of +first order diffraction light $R_{0+1}$ is shifted by $+n\Theta+2\pi\Delta z/P'$ while the phase of −first order diffraction light $R_{0-1}$ is shifted by $-n\Theta+2\pi\Delta z/P'$.

Here, n is the number of multiple gratings in the cylindrical multi-helix grating G2, $\Theta$ a rotational angle (radian) of the cylindrical multi-helix grating G2, $\Delta z$ an amount of deviation in the direction of rotation axis of the cylindrical multi-helix grating G2 (hereinafter referred to as a thrust deviation), P the pitch of gratings, and R a radius of the cylindrical multi-helix grating G2.

The above +first order diffraction light $R_{0+1}$ is transmission-diffracted by the diffraction grating G3a to be split into zeroth order diffraction light $R_{0+10}$, −first order diffraction light $R_{0+1-1}$ and other beams, among which only the −first order diffraction light $R_{0+1-1}$ is taken out normal to the surface of diffraction grating and the phase of wavefront thereof is $+n\Theta+2\pi\Delta z/P'$.

The above −first order diffraction light $R_{0-1}$ is transmission-diffracted by the diffraction grating G3b to be split into zeroth order diffraction light $R_{0-10}$, +first order diffraction light $R_{0-1+1}$ and other beams, among which the +first order diffraction light $R_{0-1+1}$ is taken out normal to the surface of diffraction grating and the phase of wavefront thereof is $-n\Theta+2\pi\Delta z/P'$.

The beam $R_{+1}$ +first-order-diffracted by the above diffraction grating G1 is reflection-diffracted at point P2 on the cylindrical multi-helix grating G2a to be split into −first order diffraction light $R_{+1-1}$, zeroth order diffraction light $R_{10}$ and other beams as phase-modulated.

Among them, the phase of −first order diffraction light $R_{+1-1}$ is shifted by $-n\Theta$ and the beam enters the diffraction grating G3a. Then the phase of wavefront of zeroth order diffraction light $R_{+1-10}$ advancing straight is $-n\Theta-2\pi\Delta z/P'$.

The beam $R_{-1}$ −first-order-diffracted by the above diffraction grating G1 is reflection-diffracted at point P3 on the cylindrical multi-helix grating G2b to be split into +first order diffraction light $R_{-1+1}$, zeroth order diffraction light $R_{-10}$ and other beams as phase-modulated.

Among them, the phase of +first order diffraction light $R_{-1+1}$ is shifted by $+n\Theta$ and it enters the diffraction grating G3b. Then the phase of wavefront of zeroth order diffraction light $R_{-1+10}$ advancing straight is $+n\Theta-2\pi\Delta z/P'$.

The beams $R_{+1-10}$ and $R_{0+1-1}$, optical paths of which are superimposed on each other by the diffraction grating G3a, enter the light-receiving element 3a in the form of interference light. The interference phase at this moment is as follows:

$$\{+n\Theta+2\pi\Delta z/P'\}-\{-n\Theta-2\pi\Delta z/P'\}=2n\Theta+4\pi\Delta z/P'.$$

A light and dark signal A1 of $2n+2\Delta z/P'$ period appears every rotation of the cylindrical multi-helix grating G2 causing a shift of $\Delta z$ in the direction of rotation axis.

The beams $R_{-1+10}$ and $R_{0-1+1}$, optical paths of which are superimposed on each other in the diffraction grating G3b, enter the light-receiving element 3b in the form of interference light. The interference phase at this moment is as follows:

$$\{n\Theta-2\pi\Delta z/P'\}-\{-n\Theta+2n\pi\Delta/P'\}=2n\Theta-4\pi\Delta z/P'.$$

A light and dark signal B1 of $2n-2\Delta z/P'$ period appears every rotation of the cylindrical multi-helix grating B2 with a shift of $\Delta z$ in the direction of rotation axis.

The above light and dark signals A1, B1 are input into counting units 6A, 6B where the signals are converted into digital outputs. Then, the first counting unit 6A outputs a light and dark signal A2 of $2n+2\Delta z/P'$ pulses for every rotation of the cylindrical multi-helix grating G2 with a shift of $\Delta z$ as an error in the z direction (thrust direction), and the above second counting unit 6B outputs a light and dark signal G2 of $2n-2\Delta z/P'$ pulses.

The above two light and dark signals A2, B2 are supplied to an arithmetic unit 7 constituting a signal processing unit 8 together with the above counting units 6A, 6B. A sum of the two signals is as follows:

$$A2+B2=4n.$$

Thus, a signal of 4n pulses is obtained with a rotation of the cylindrical multi-helix grating G2 independent of the thrust deviation.

Figure 22:
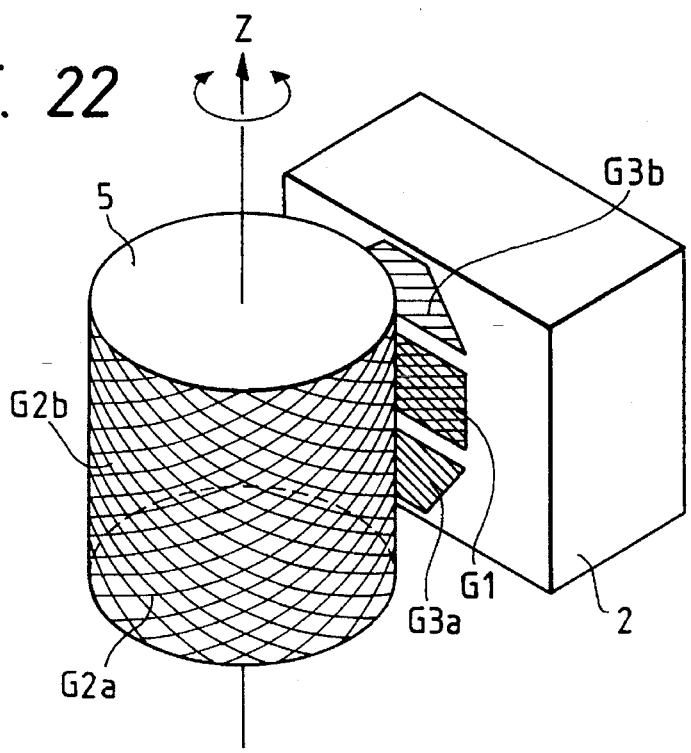
FIG. 22 is a perspective view to show the major part of an optical displacement measuring apparatus showing the sixth embodiment of the present invention.
Figure 23:
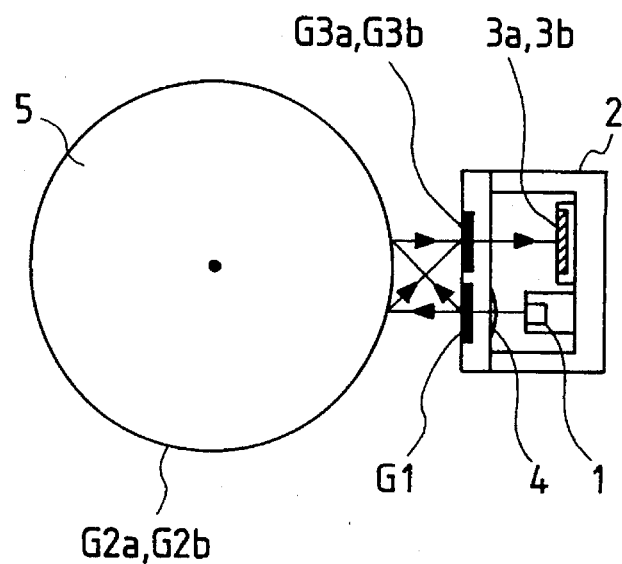
FIG. 23 is a top plan view with optical paths in the six embodiment.
Figure 24:
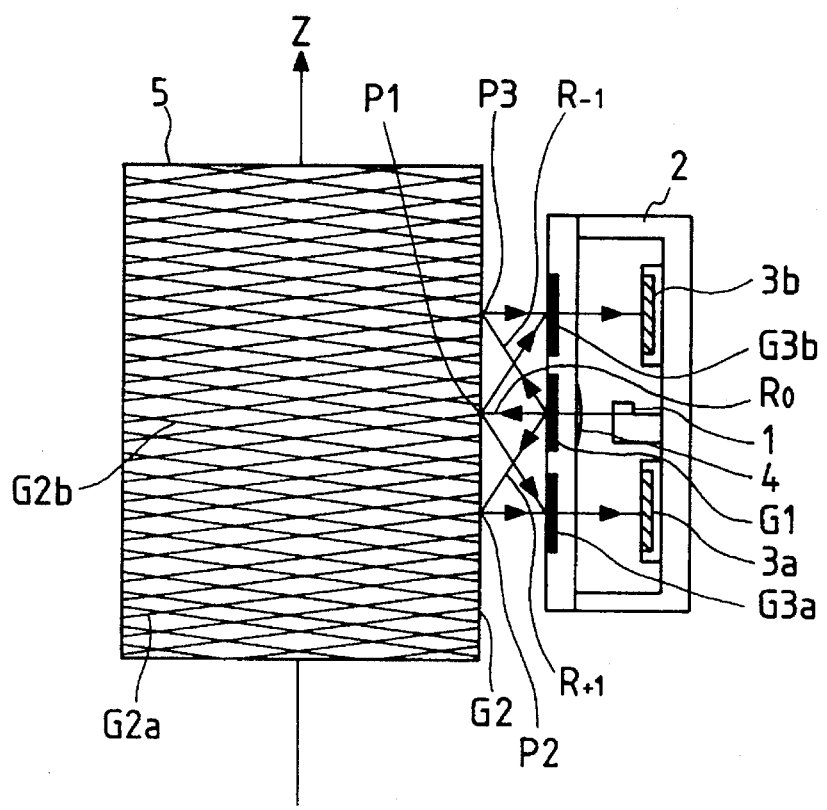
FIG. 24 is a side view of FIG. 23.
Figure 25:
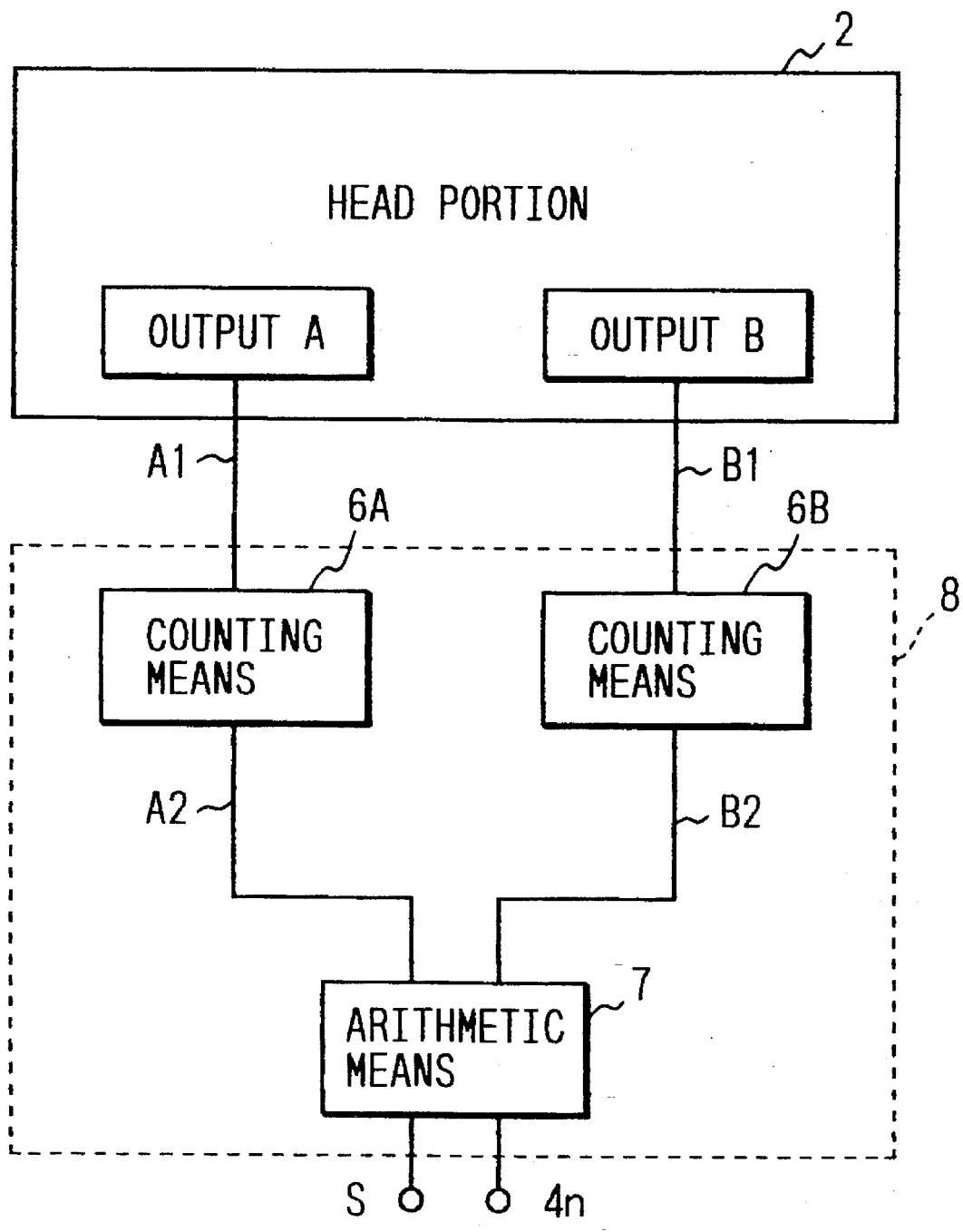
FIG. 25 is a circuit diagram to show a signal processing circuit in the six embodiment.

FIG. 22 is a perspective view of the main part to show an embodiment of optical measuring apparatus according to the sixth embodiment, FIG. 23 a plan view to show optical paths thereof, FIG. 24 a side view thereof, and FIG. 25 a circuit diagram to show a signal 10 processing circuit. As apparent from the drawings, the sixth embodiment is substantially the same in structure and operation as the fifth embodiment except that diffraction gratings G2a, G2b of multiple helices different in arrangement direction from each other are formed on the surface of rotating cylinder 5 as crossing each other and that the diffraction grating G1 is also arranged in a similar pattern matching therewith, and therefore redundant description will be omitted.

In the sixth embodiment the arithmetic unit 7 calculates a deviation S of the signals A2, B2 in addition to the signal of 4n pulses. Taking the deviation $S=(A2-B2)/2$ between the two light and dark signals A2 and B2, $$S=2\Delta z/P'.$$

Thus, $2\Delta z/P'$ pulses are obtained only for the thrust deviation $\Delta z$. Namely, a rotational displacement and a linear displacement of rotating cylinder 5 are simultaneously measured.

Although the above embodiments concerned the displacement measuring apparatus utilizing the diffraction interference of light, the present invention can be applied to displacement measuring apparatus of the parallel slit method not using the diffraction interference. The above each embodiment showed a displacement measuring apparatus of the light diffraction interference method using three diffraction gratings G1, (G2a, G2b), (G3a, G3b), but the present invention can be applied to displacement measuring apparatus of a diffraction interference method not using three diffraction gratings.

Since the fifth or sixth embodiment as described above is so arranged that the head unit is constructed of the light-emitting element, a plurality of light-receiving elements and the diffraction gratings and that a plurality of diffraction gratings of multiple helices different in arrangement direction from each other are provided on the rotating portion opposing the head unit, the interference optical system is very simple in structure, is constructed of a small number of components, is easy in assembling, and can be very compact in scale. Also, the grating pitch is constant anywhere on the cylindrical multi-helix grating and is free of influence of mounting accuracy such as an offset of the rotating portion, achieving an optical displacement measuring apparatus which can simultaneously measure angle and distance displacements with excellent accuracy.

Further, since the head unit is provided with a diffraction grating for splitting a beam and diffraction gratings for synthesizing beams and the rotating body is provided with diffraction gratings for phase-modulating beams, a light and dark signal of two periods is produced on the light-receiving element when one of the three diffraction gratings is shifted a pitch in the direction of grating arrangement. Additionally, since the diffraction grating formed on the surface of the rotating body is the multi-helix grating, n gratings appear to cross the front surface of the head unit when the rotating body makes a rotation relative to the head unit. Further, since the cylindrical multi-helix grating includes gratings directed in two directions different from each other, the gratings move in opposite directions to each other between the two light-receiving elements. Therefore, a sum is taken for outputs of the two light-receiving elements on which the gratings appear to move in the opposite directions to each other, which reduces influence of thrust deviation of the cylindrical multi-helix grating.

Especially according to the sixth embodiment, the diffraction gratings of multiple helices different in arrangement direction from each other are arranged to cross each other on the rotating body, whereby the entire apparatus can be designed smaller in scale.

Figure 26:
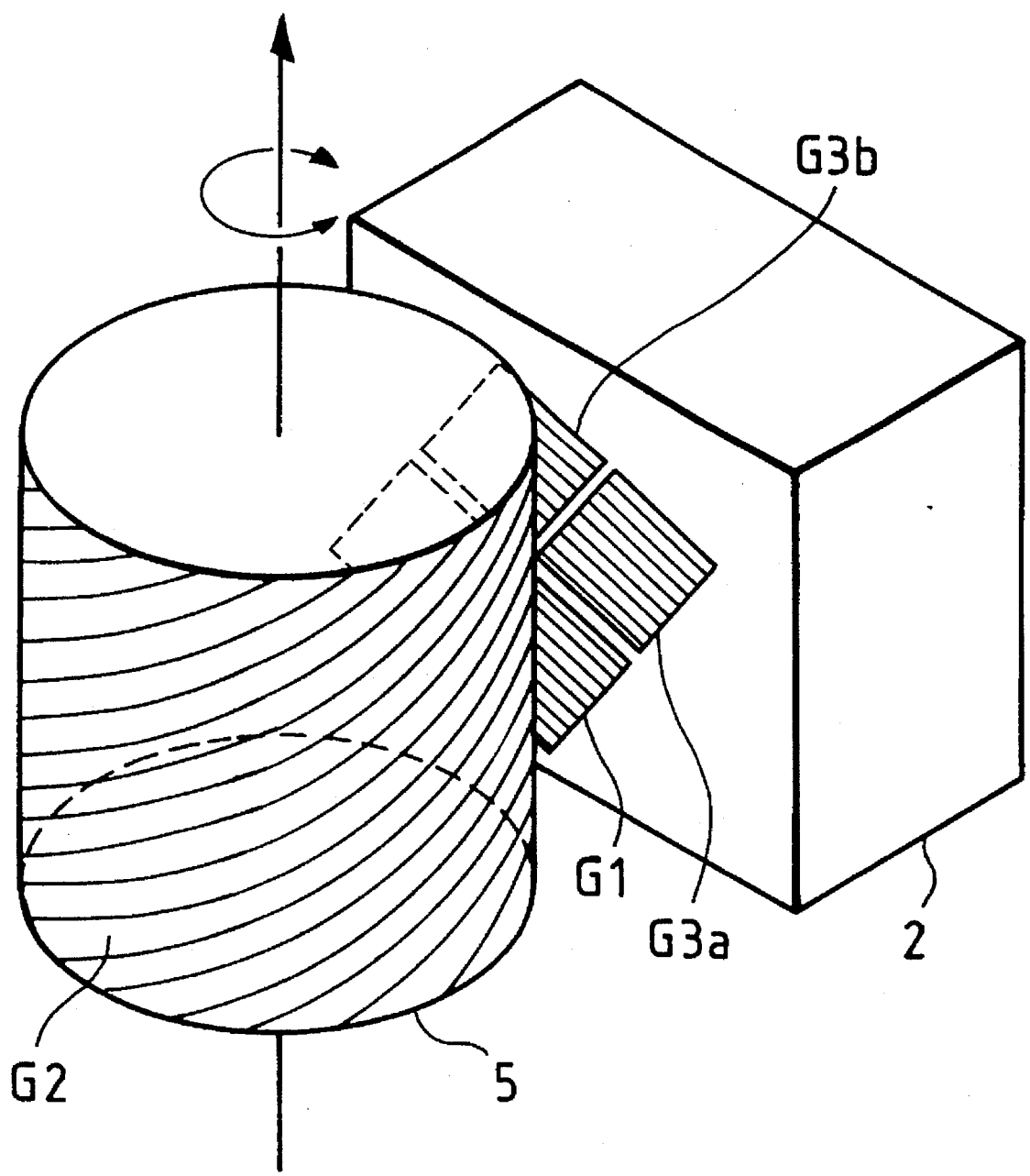
FIG. 26 is a perspective view to show the major part of an optical displacement measuring apparatus showing the seventh embodiment of the present invention.
Figure 27:
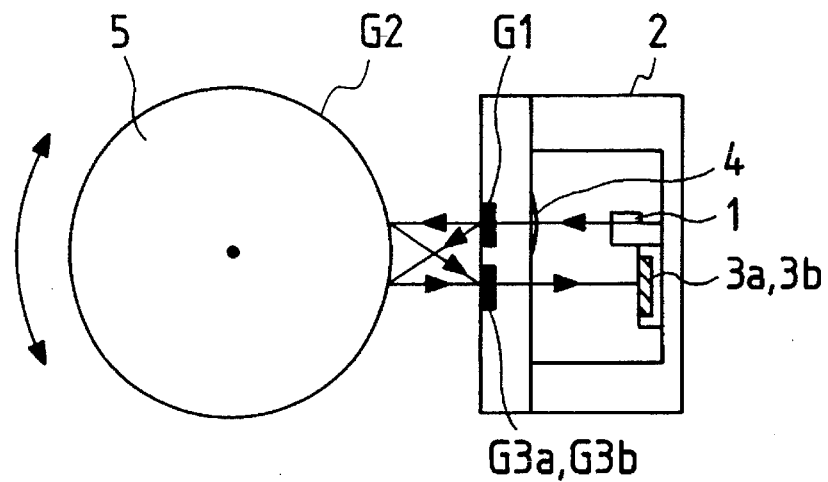
FIG. 27 is a top plan view with optical paths in the seventh embodiment.
Figure 28:
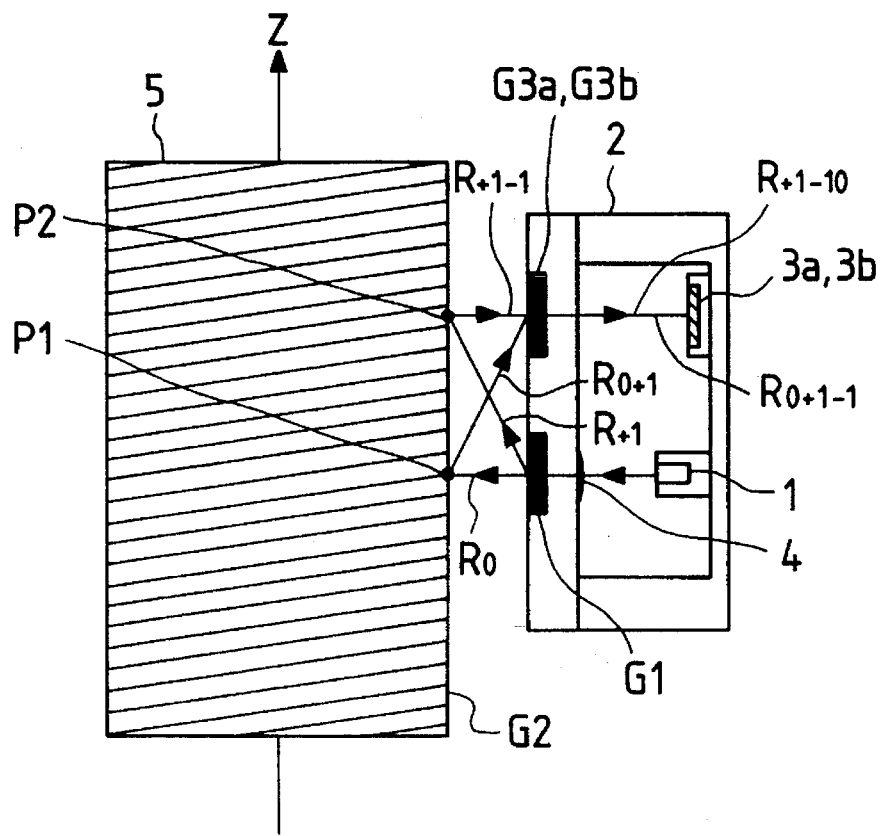
FIG. 28 is a side view of FIG. 27.
Figure 29:
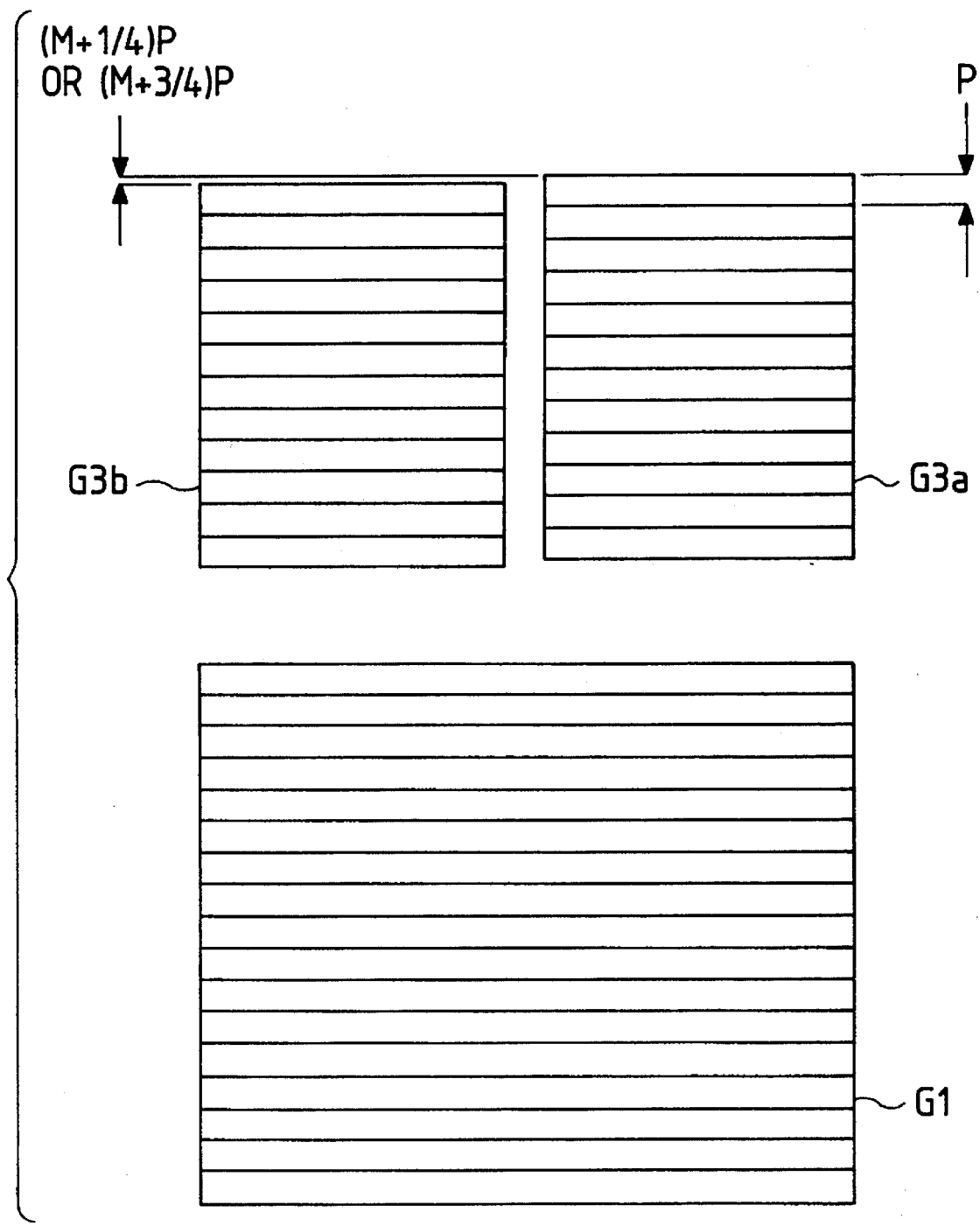
FIG. 29 is a layout of diffraction gratings in a head unit in the seventh embodiment.
Figure 30:
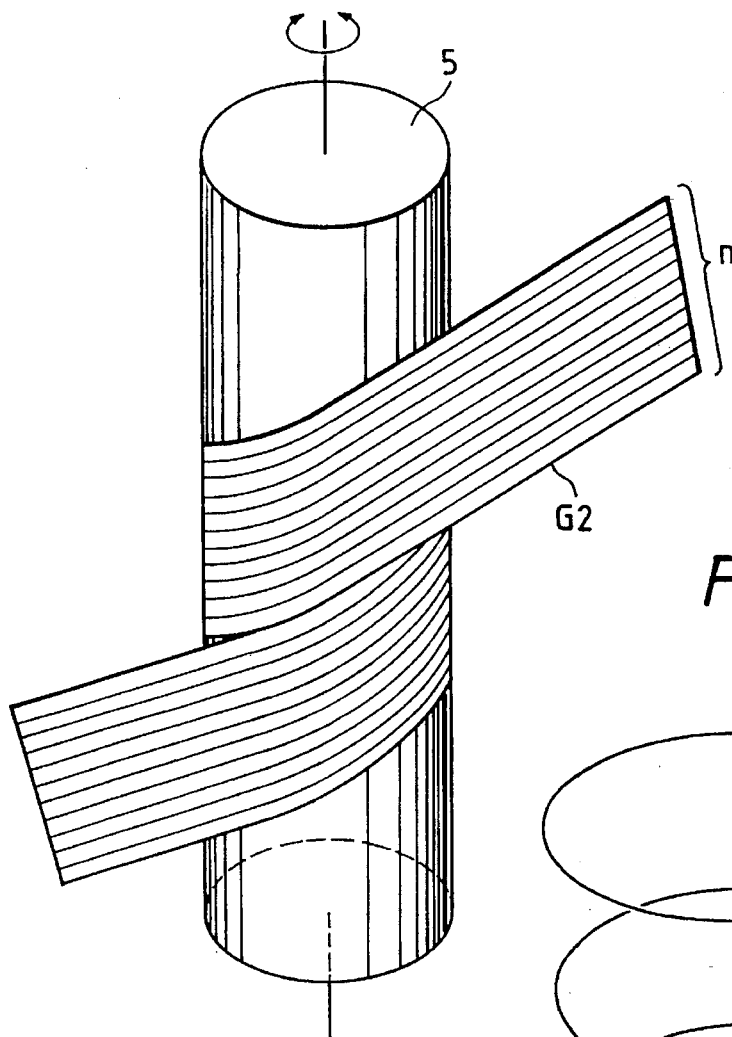
FIG. 30 is a constitutional drawing to show a cylindrical multi-helix grating set on a rotating portion in the seventh embodiment.
Figure 31:
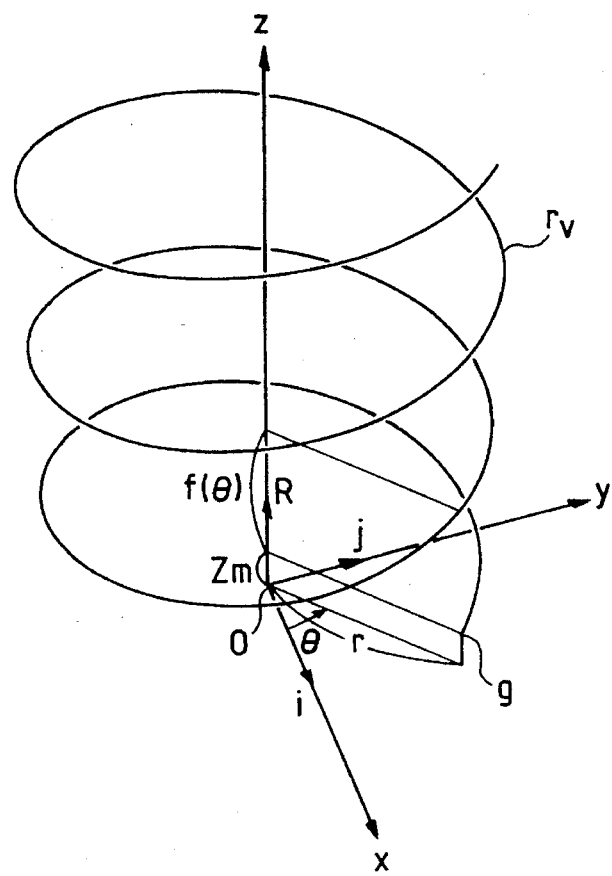
FIG. 31 is a drawing to show a helical shape of a cylindrical multi-helix grating.
Figure 32:
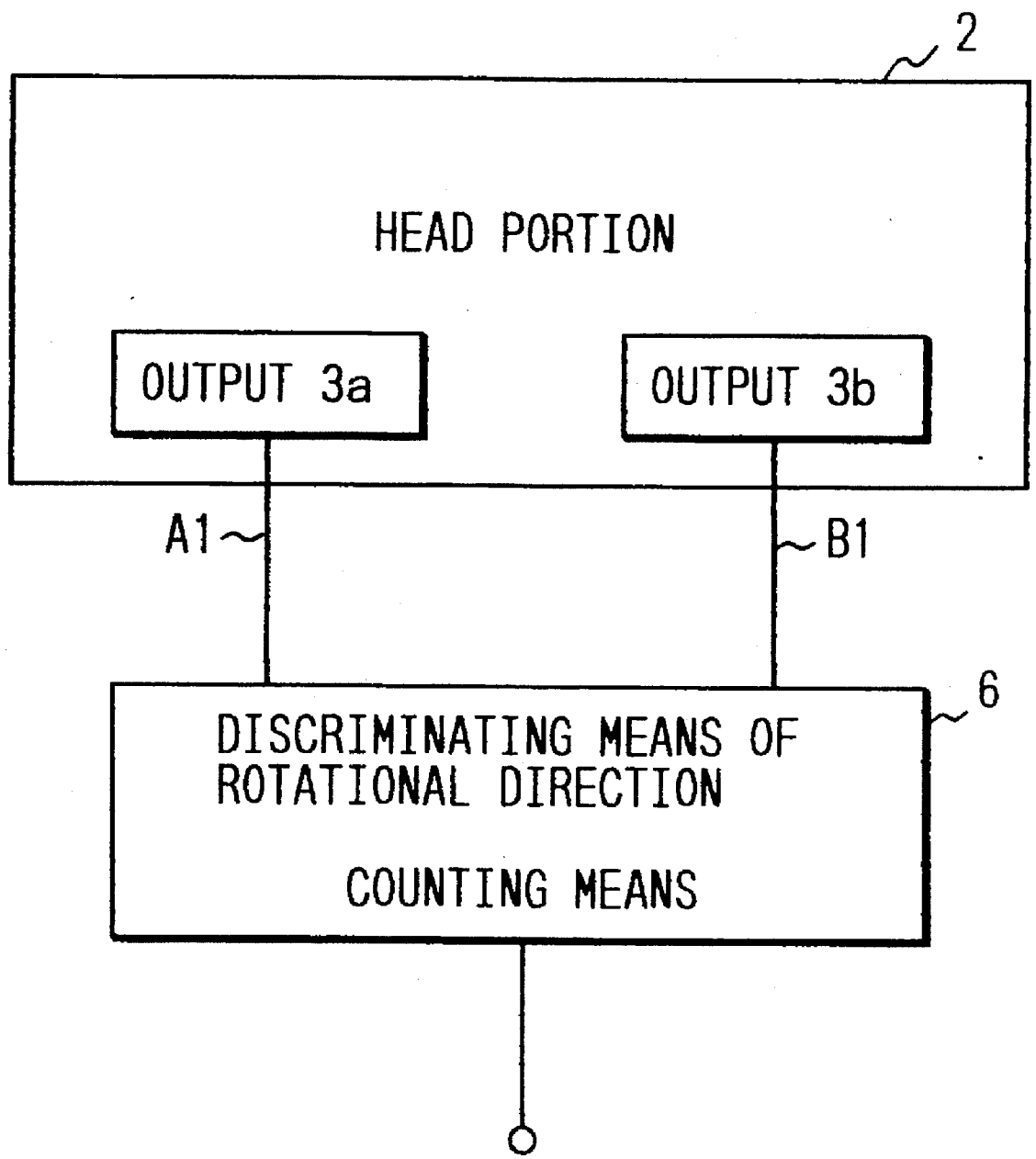
FIG. 32 is a circuit diagram to show a signal processing circuit in the seventh embodiment.

FIG. 26 is a perspective view to show the seventh embodiment of an optical displacement measuring apparatus according to the present invention, FIG. 27 is a top plan view to show optical paths thereof, FIG. 28 is a side view thereof, FIG. 29 is a drawing to show an arrangement of diffraction gratings in a head unit, FIG. 30 and FIG. 31 are drawings to show how to construct a diffraction grating on a rotating body, and FIG. 32 is a circuit diagram to show a processing circuit for output signals.

In FIG. 26 to FIG. 32, numeral 1 designates a light-emitting element, 2 a head unit, 3a, 3b light-receiving elements, G1 a first diffraction grating for splitting an emission beam, G2 a second diffraction grating (hereinafter referred to as a cylindrical multi-helix grating) formed in a multiple-helix pattern on a surface of cylinder 5 as a rotating portion, for phase-modulating split beams, G3a, G3b diffraction gratings for synthesizing beams, disposed as shifted by a quarter pitch in the arrangement direction of diffraction gratings, and 4 a collimator lens.

The shape of helices in the above cylindrical multi-helix grating G2 is described in detail in the following. Letting the center be at point O and a starting point be at point q, a position vector $r_V$ of a helical curve formed on the surface of a cylinder with radius r can be expressed as follows:

$$r_V = r \cos(\Theta)i + r \sin(\Theta)j + f(\Theta)k$$

where i, j, k are unit vectors in the x, y, and z directions, respectively, $\Theta$ an angle from the starting point q in the x-y plane, and $f(\Theta)$ a linear function of angle $\Theta$.

A locus of the above equation is shifted by $f(\Theta)$ in the z direction every rotation of the cylinder (FIG. 31). Supposing there are n helix gratings in the space, and letting P be the pitch of gratings and $z_m$ be a position of start of a position vector $r_{Vm}$ of an m-th helical curve in the z direction, the position vector $r_{Vm}$ is as follows:

$$r_{Vm} = r \cos(\Theta)i + r \sin(\Theta)j + (nP'\Theta/(2\pi) + zm)k \text{ where } P' = P/(1-(nP/(2\pi r))^2)^{1/2} \quad \text{(a)}.$$

It appears that n gratings move in the grating arrangement direction every rotation of the above cylindrical multi-helix grating G2. As a result, the position of ±first order diffraction light reflection-diffracted by the cylindrical multi-helix grating G2 is shifted by ±2πn. Namely, a phase shift with rotation of angle $\Theta$ is ±n$\Theta$.

The principle of the seventh embodiment will be described below. In FIG. 28, a divergent beam of rays emitted from the light-emitting element 1 is collimated by the collimator lens 4 to become a beam of nearly parallel rays and is transmission-diffracted by the diffraction grating G1 to be split into three beams of zeroth order diffraction light $R_0$, +first order diffraction light $R_{+1}$ and −first order diffraction light $R_{-1}$ outgoing therefrom.

The beam $R_0$ advancing straight ahead through the diffraction grating G1 is reflection-diffracted at point P1 on the cylindrical multi-helix grating G2 to be split into +first order diffraction light $R_{0+1}$ and −first order diffraction light $R_{0-1}$ as phase-modulated. The phase of the +first order diffraction light $R_{0+1}$ is shifted by +n$\Theta$ and the phase of the −first order diffraction light $R_{0-1}$ by −n$\Theta$. Here, n is the number of multiple gratings in the cylindrical multi-helix grating G2 and $\Theta$ a rotational angle (radian) of the cylindrical multi-helix grating G2.

The +first order diffraction light $R_{0+1}$ is transmission-diffracted by the bisectional diffraction gratings G3a, G3b to be split into zeroth order diffraction light $R_{0+10}$, −first order diffraction light $R_{0+1-1}$ and other beams, among which the −first order diffraction light $R_{0+1-1}$ is taken out normal to the surface of diffraction gratings. A phase of wavefront transmission-diffracted through G3a is +n$\Theta$ while a phase of wavefront transmission-diffracted through G3b is +n$\Theta$+π/2.

The beam $R_{+1}$ +first-order-diffracted by the diffraction grating G1 is reflection-diffracted at point P2 on the cylindrical multi-helix grating G2 to be split into −first order diffraction light $R_{+1-1}$, zeroth order diffraction light $R_{+10}$ and other beams as phase-modulated.

Among them, the phase of the −first order diffraction light $R_{+1-1}$ is shifted by −n$\Theta$ and it enters the diffraction gratings G3a, G3b. Zeroth order diffraction light $R_{+1-10}$ advances straight ahead through G3a and a phase of wavefront thereof is −n$\Theta$. Further, the zeroth order diffraction light $R_{+1-10}$ also passes through G3b and a phase of wavefront thereof is −n$\Theta$.

The beams $R_{+1-10}$ and $R_{0+1-1}$, optical paths of which are superimposed on each other in the diffraction grating G3a, enter the light-receiving element 3a in the form of interference light. The interference phase at this moment is as follows:

$$\{+n\Theta\}-\{-n\Theta\}=2n\Theta.$$

Thus, a light and dark signal A1 of 2n period appears with a rotation of the cylindrical multi-helix grating G2.

Unrepresented beams $R_{-1\ 0}$ and $R_{0-1+1}$, optical paths of which are superimposed on each other in the above diffraction grating G3b, enter the light-receiving element 3b in the form of interference light. The interference phase at this moment is as follows:

$$\{n\Theta+\pi/2\}-\{-n\Theta\}=2n\Theta+\pi/2.$$

Thus, a light and dark signal B1 of 2n period appears with a rotation of the cylindrical multi-helix grating G2. The two signal outputs A1, B1 are signals phase-shifted by $\pi/2$ relative to each other (two-phase signals), which are input into a rotational direction discriminating unit/counting unit 6 as a signal processing unit as shown in FIG. 32 to be counted by a well-known method for detecting a rotational amount and a rotational direction from the two-phase signals. Therefore, the rotational amount and rotational direction can be measured for the cylindrical multi-helix grating G2.

Since the seventh embodiment is constructed with the interference optical system very simple in arrangement and the head unit composed only of the light-emitting source, light-receiving elements and lens, the number of components is small, assembling is easy and the size can be greatly decreased. Also, since the multi-helix grating is formed on the surface of the cylinder, it can be made thinner or hollowed. As a result, a displacement measuring apparatus very small in size and easy in mounting can be attained.

Also, since the rotating portion is so arranged that the multi-helix grating is formed on the surface of the cylinder, the grating pitch is constant anywhere on the multi-helix grating, which is free of influence of mounting accuracy such as an offset of the rotating portion.

Because the seventh embodiment is so arranged that the optical system includes three gratings, i.e., the diffraction grating G1 for splitting a beam, the diffraction grating G2 for phase-modulating beams, and the diffraction gratings G3a, G3b for synthesizing beams, it is characterized in that a light and dark signal of two periods appears on the light-receiving element when one out of the three diffraction gratings is shifted one pitch in the direction of grating arrangement. The displacing multi-helix grating is formed on the cylindrical surface in a helical pattern in case of the present embodiment, so that n gratings appear to cross the front surface of the head unit when the rotating unit makes a rotation relative to the head unit.

Further, the diffraction gratings G3a, G3b are arranged with a shift of $(M\pm\frac{1}{4})P$ where M is an integer, in the direction of grating arrangement, so that the two-phase signals shifted $\pi/2$ phase in signal outputs can be obtained, enabling measurement of rotational direction of the cylindrical multi-helix grating G2.

Figure 33:
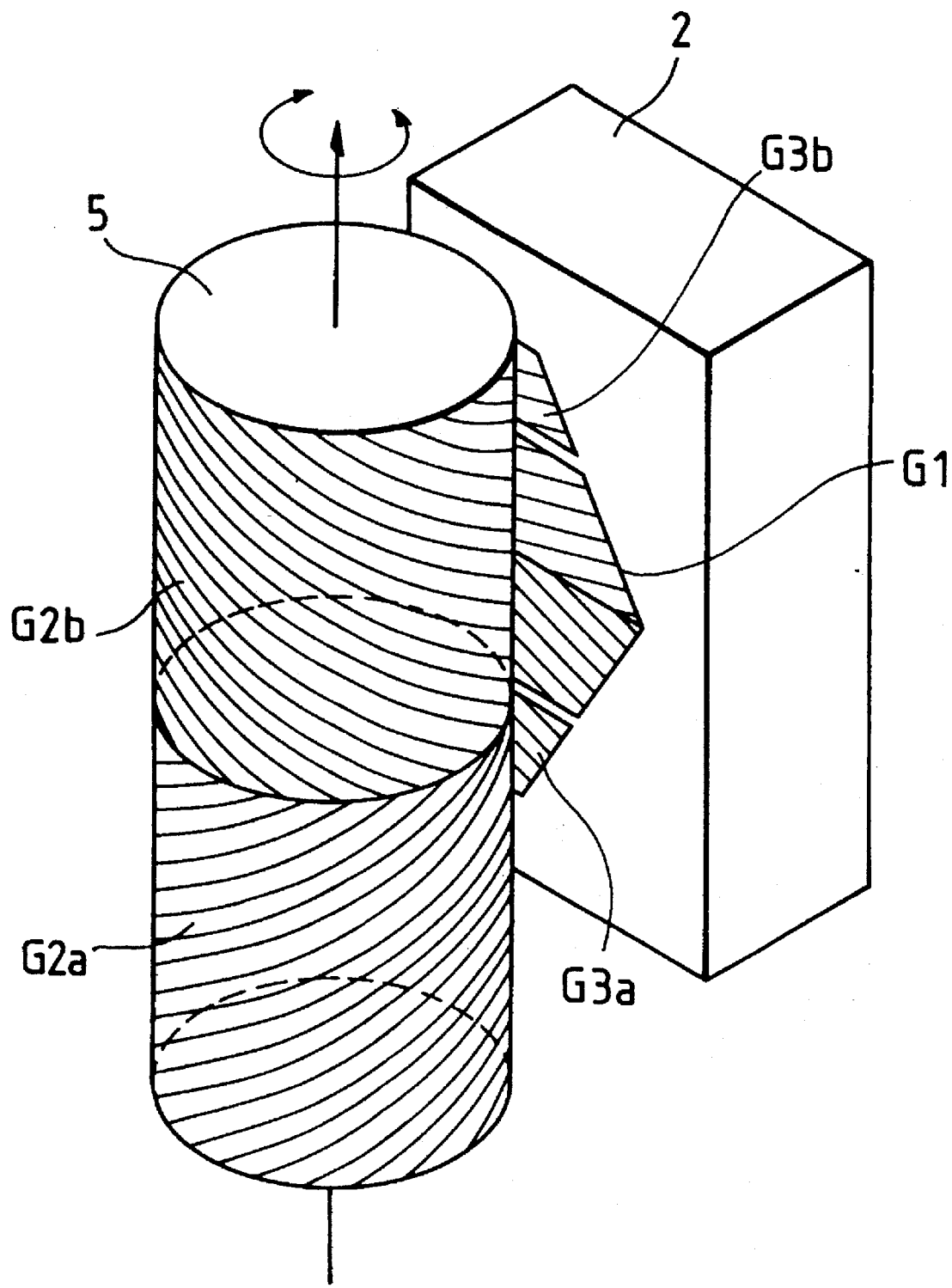
FIG. 33 is a perspective view to show the major part of an optical displacement measuring apparatus showing the eighth embodiment of the present invention.
Figure 34:
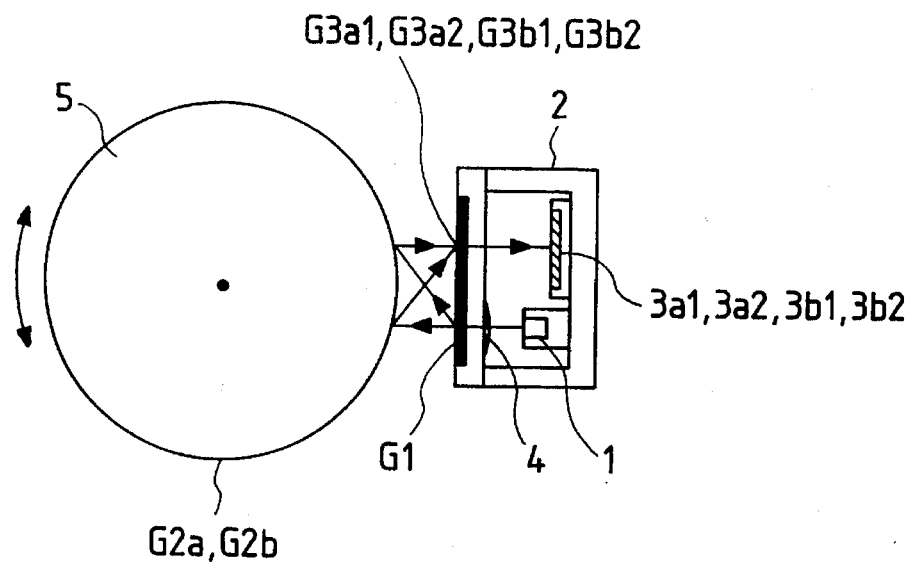
FIG. 34 is a top plan view with optical paths in the eighth embodiment.
Figure 35:
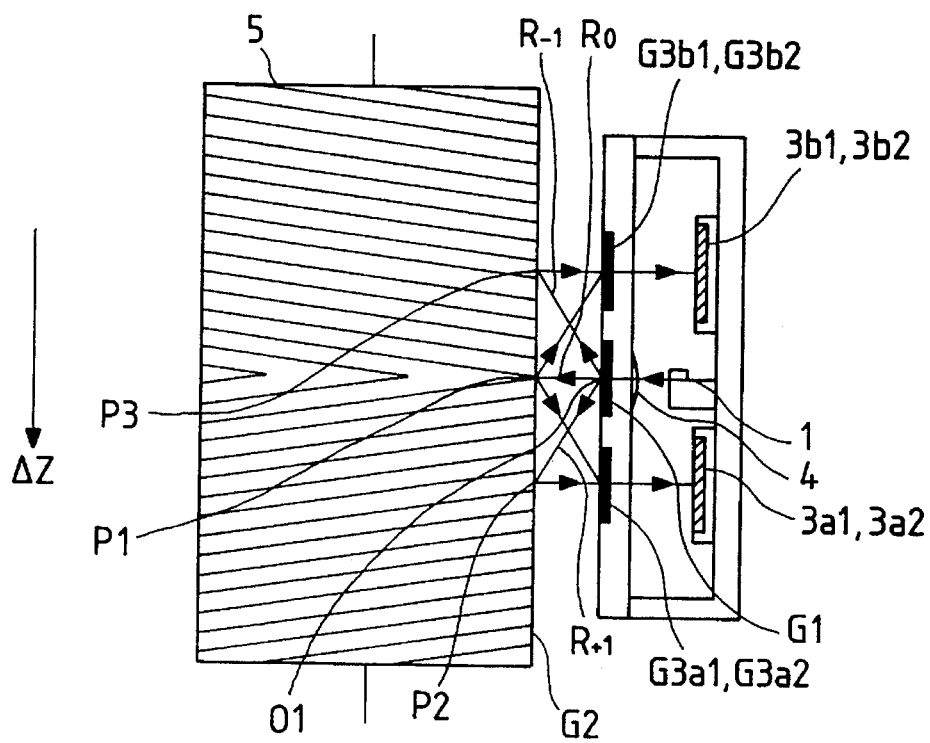
FIG. 35 is a side view of FIG. 34.
Figure 36:
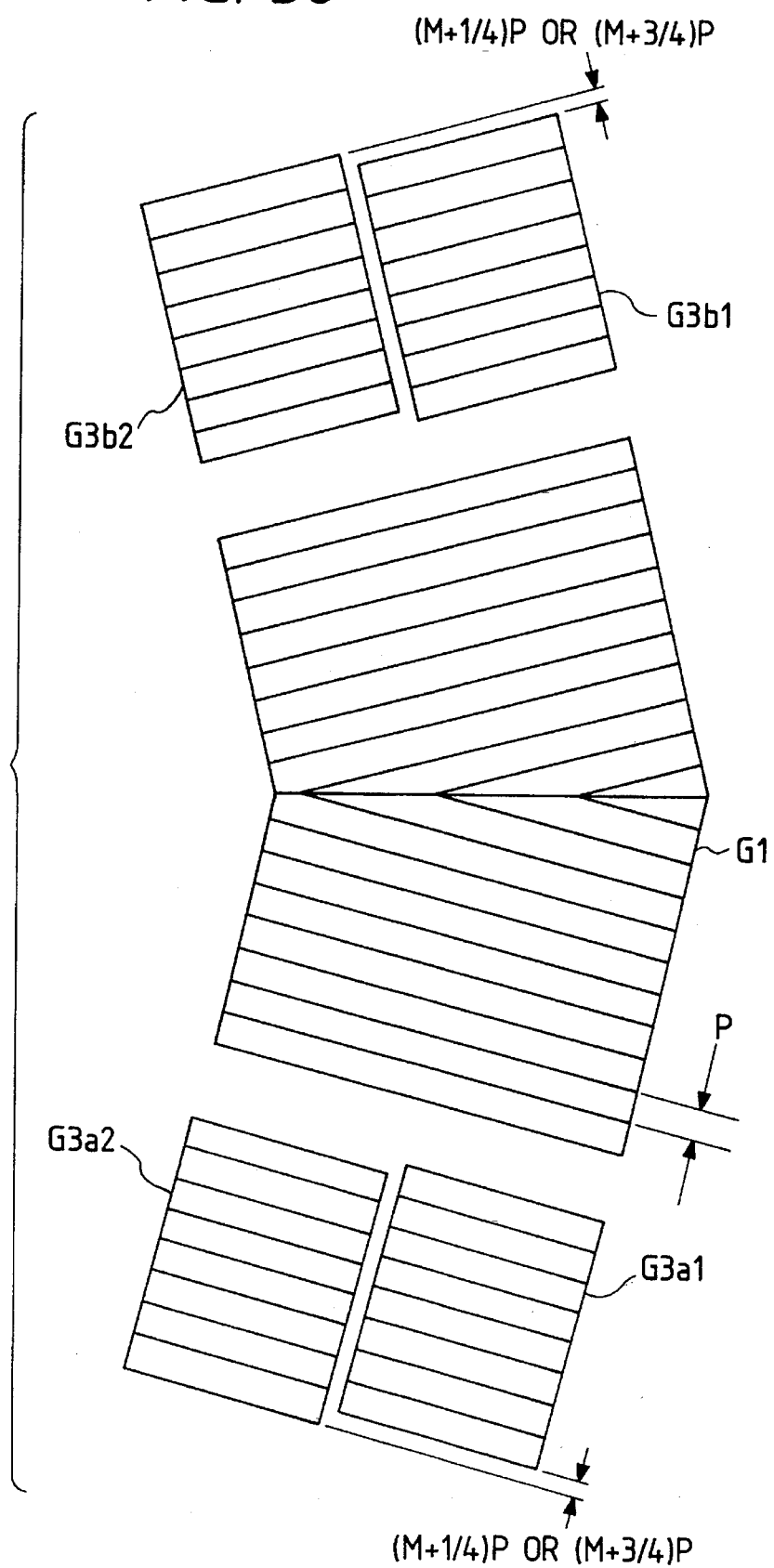
FIG. 36 is a layout of diffraction gratings in a head unit in the eighth embodiment.
Figure 37:
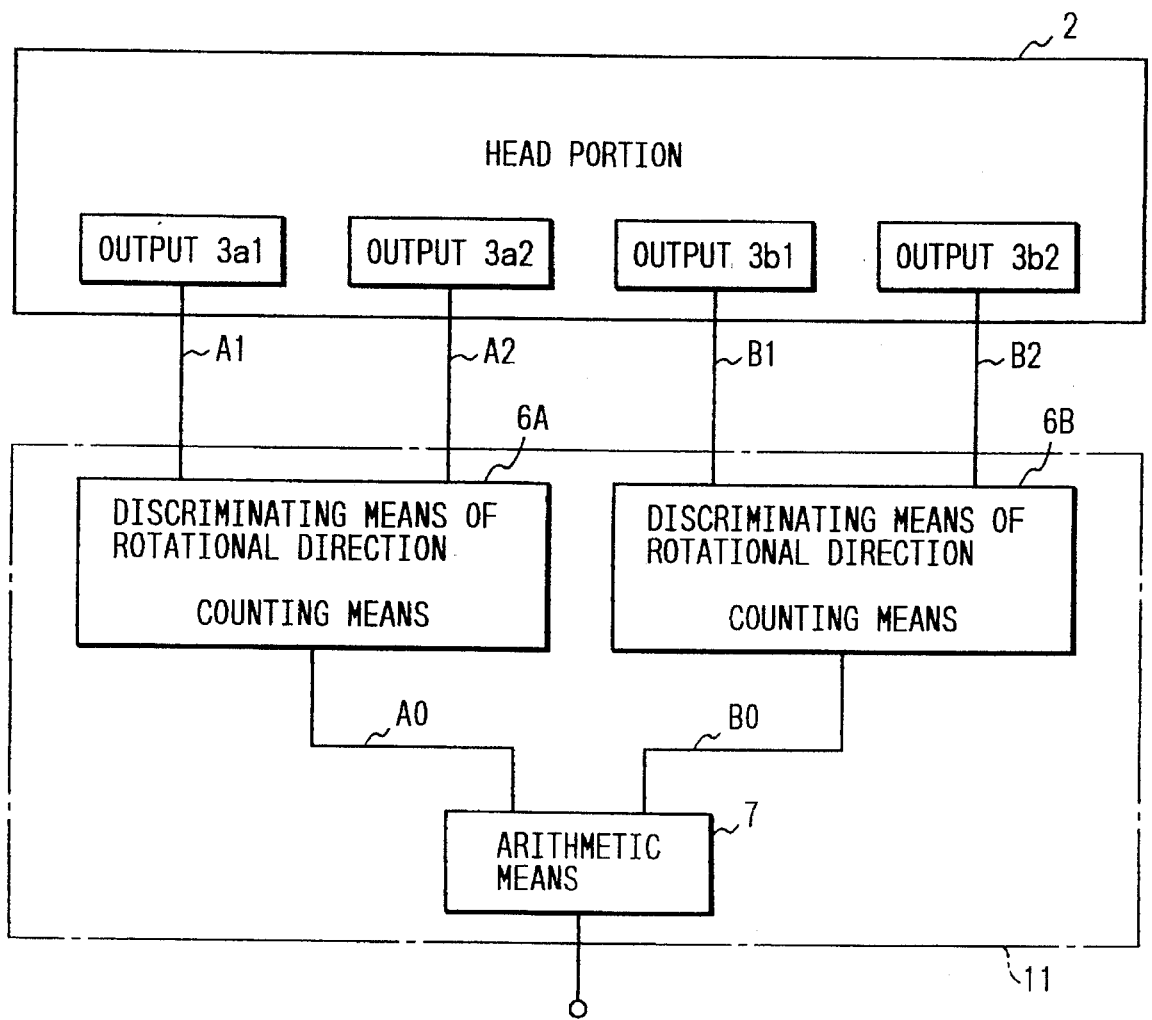
FIG. 37 is a circuit diagram to show a signal processing circuit in the eighth embodiment.

FIG. 33 is a perspective view to show the eighth embodiment of optical displacement measuring apparatus according to the present invention, FIG. 34 a top plan view to show optical paths thereof, FIG. 35 a side view thereof, FIG. 36 a drawing to show a layout of diffraction gratings in a head unit and FIG. 37 a circuit diagram to show a processing circuit for output signals. In FIG. 33 to FIG. 37 the same elements are denoted by same reference numerals as those in the seventh embodiment as shown in FIG. 26 to FIG. 32 and redundant description is omitted. In FIG. 33 to FIG. 37, reference numerals 3a1, 3b1, 3a2, 3b2 designate light-receiving elements, G3a1, G3b1, G3a2, G3b2 third diffraction gratings for synthesizing beams, and G2a, G2b second diffraction gratings formed separately and independently of each other in respective patterns of multiple helices different in arrangement direction from each other as clockwise helices and counterclockwise helices. Matching with the second diffraction gratings, a first grating G1 is separated vertically in the axial direction into diffraction grating regions formed in parallel and at equal pitch to the opposing diffraction gratings G2a, G2b.

The following description concerns the detailed shape of helices in the cylindrical multi-helix gratings G2a, G2b used in the eighth embodiment. Since G2a and G2b are equal to each other, description is given only for G2a. The basic structure of the cylindrical multi-helix grating G2a is the same as that in the seventh embodiment as described above, and if the cylindrical multi-helix grating G2a is shifted by $\Delta z$ for some reason, the phase of ±first order diffraction light is as follows.

A shift $\Delta z$ of the cylindrical multi-helix grating G2a results in movement of $\Delta z/P'$ gratings in the direction of grating arrangement. Using P' in formula (a), the phase of ±first order diffraction light reflection-diffracted by the cylindrical multi-helix grating G2a is as follows:

$$\pm 2\pi\Delta/P'.$$

Then, when the cylindrical multi-helix grating G2a is rotated $\Theta$ to cause a shift of $\Delta z$ in the z direction, the following gives the phase of ±first order diffraction light reflection-diffracted by the cylindrical multi-helix grating G2a:

$$\pm\{n\Theta+2\pi\Delta z/P'\}.$$

The principle of the eighth embodiment will be next described. A divergent bundle of rays emitted from the light-emitting element 1 is collimated by the collimator lens 4 to become a beam of nearly parallel rays and is transmission-diffracted at point O1 on the diffraction grating G1 to be split into three beams of zeroth order diffraction light $R_0$, +first order diffraction light $R_{+1}$ and −first order diffraction light $R_{-1}$ outgoing therefrom.

The beam $R_0$ advancing straight ahead through the diffraction grating G1 is reflection-diffracted at a border point P1 between the cylindrical multi-helix gratings G2a, G2b to be split into +first order diffraction light $R_{0+1}$ and −first order diffraction light $R_{0-1}$ as phase-modulated. The phase of +first order diffraction light $R_{0+1}$ is shifted by $+n\Theta+2\pi\Delta z/P'$ while the phase of −first order diffraction light $R_{0-1}$ by $-n\Theta+2\pi\Delta z/P'$. Here, n is the number of multiple gratings in the cylindrical multi-helix grating G2a, G2b, $\Theta$ a rotational angle (radian) of the cylindrical multi-helix grating G2, $\Delta z$ a deviation amount (hereinafter referred to as a thrust deviation) of cylindrical multi-helix grating G2a, G2b in the direction of rotation axis, P the pitch of gratings, and R a radius of the cylindrical multi-helix grating G2a, G2b.

The +first order diffraction light $R_{0+1}$ is transmission-diffracted by the diffraction gratings G3a1, G3a2 to be split into zeroth order diffraction light $R_{0+10}$, −first order diffraction light $R_{0+1-1}$ and other beams, among which the −first order diffraction light $R_{0+1-1}$ is outgoing normal to the diffraction grating surface. If the diffraction gratings G3a1, G3a2 are arranged with a shift of $P(M+\frac{1}{4})$ or $P(M+\frac{3}{4})$ (where M is an integer) in the direction of grating arrangement, the phase of wavefront transmission-diffracted through the diffraction grating G3a1 is $+n\Theta+2\pi\Delta z/P'$ while that transmission-diffracted through the diffraction grating G3a2 is $+n\Theta+2\pi\Delta z/P'+\pi/2$.

The −first order diffraction light $R_{0-1}$ is transmission-diffracted by the diffraction gratings G3b1, G3b2 to be split into zeroth order diffraction light $R_{0-10}$, +first order diffraction light $R_{0-1+1}$ and other beams, among which the +first order diffraction light $R_{0-1+1}$ is outgoing normal to the diffraction grating surface. If the diffraction gratings G3b1, G3b2 are arranged with a shift of P(M+¼) or P(M+¾) (where M is an integer) in the direction of grating arrangement, the phase of wavefront transmission-diffracted through the diffraction grating G3b1 is $-n\Theta+2\pi\Delta z/P'$ while that transmission-diffracted through the diffraction grating G3b2 is $-n\Theta+2\pi\Delta/P'+\pi/2$.

The beam $R_{+1}$ +first-order-diffracted by the diffraction grating G1 is reflection-diffracted at point P2 on the cylindrical multi-helix grating G2a to be split into −first order diffraction light $R_{+1-1}$, zeroth order diffraction light $R_{+10}$ and other beams as phase-modulated. Among them, the phase of −first order diffraction light $R_{+1-1}$ is shifted by $-n\Theta+2\pi\Delta z/P'$ and it enters the diffraction gratings G3a1, G3a2. The phase of wavefront of zeroth order diffraction light $R_{+1-10}$ advancing straight ahead through the diffraction gratings G3a1, G3a2 is $n\Theta+2\pi\Delta z/P'$.

The beam $R_{-1}$ −first-order-diffracted by the diffraction grating G1 is reflection-diffracted at point P3 on the cylindrical multi-helix grating G2a to be split into +first order diffraction light $R_{-1+1}$, zeroth order diffraction light $R_{-10}$ and other beams as phase-modulated. Among them, the phase of +first order diffraction light $R_{-1+1}$ is shifted by $-n\Theta+2\pi\Delta z/P'$ and it enters the diffraction gratings G3b1, G3b2. The phase of wavefront of zeroth order diffraction light advancing straight ahead through the diffraction gratings G3b1, G3b2 is $+n\Theta-2\pi\Delta z/P'$.

The beams $R_{+1-10}$ and $R_{0+1-1}$, optical paths of which are superimposed on each other through the diffraction grating G3a1, enter the light-receiving element 3a1 in the form of interference light. The interference phase at this moment is as follows:

$$\{+n\Theta+2\pi\Delta z/P'\}-\{-n\Theta-2\pi\Delta z/P'\}=2n\Theta+4\pi\Delta z/P'.$$

Also, the beams $R_{30\ 1-10}$ and $R_{0+1-1}$, optical paths of which are superimposed on each other through the diffraction grating G3a2, enter the light-receiving element 3a2 in the form of interference light. The interference phase at this moment is as follows:

$$\{+n\Theta+2\pi\Delta z/P'+\pi/2\}-\{-n\Theta-2\pi\Delta z/P'\}=2n\Theta+4\pi\Delta z/P'+\pi/2,$$

so that a beam is obtained with interference phase shifted by a phase of $\pi/2$ relative to the beam of optical paths superimposed through the diffraction grating G3a1.

Namely, when the cylindrical multi-helix gratings G2a, G2b make a rotation to cause a thrust shift of $\Delta z$ therein, light and dark signals A1, A2 of $2n+2\Delta z/P'$ period are produced by the light-receiving elements 3a1, 3a2, and the rotational direction can be discriminated with the two-phase light and dark signals shifted $\pi/2$ phase.

The beams $R_{0-1+1}$ and $R_{+1-10}$, optical paths of which are superimposed on each other in the diffraction grating G3b1, enter the light-receiving element 3b1 in the form of interference light. The interference phase at this moment is as follows:

$$\{n\Theta-2\pi\Delta z/P'\}-\{-n\Theta+2\pi\Delta z/P'\}=2n\Theta-4\pi\Delta z/P'.$$

Also, the beams $R_{-1+10}$ and $R_{0-1+1}$, optical paths of which are superimposed on each other in the diffraction grating G3b2, enter the light-receiving element 3b2 in the form of interference light. The interference phase at this moment is as follows:

$$\{n\Theta-2\pi\Delta z/P'+\pi/2\}-\{-n\Theta+2\pi\Delta z/P'\}=2n\Theta-4\pi\Delta z/P'+\pi/2,$$

so that a beam is obtained with interference phase shifted by a phase of $\pi/2$ relative to the beam of optical paths superimposed through the diffraction grating G3b1.

Accordingly, when the cylindrical multi-helix gratings G2a, G2b make a rotation to cause a thrust shift of $\Delta z$ therein, light and dark signals B1, B2 of $2n+2\Delta z/P'$ period are produced by the light-receiving elements 3b1, 3b2, and the rotational direction can be discriminated based on the two-phase light and dark signals shifted by the phase of $\pi/2$.

The above light and dark signals A1, A2 and B1, B2 are input into a rotational direction discriminating unit/counting unit 6A and into a rotational direction discriminating unit/counting unit 6B, respectively, to be converted into digital outputs. With a rotation of the cylindrical multi-helix grating G2 resulting in a thrust deviation of $\Delta z$, the above output signals A1, A2 produce an output A0 of $\pm(2n+2\Delta z/P')$ pulses, the above output signals B1, B2 produce an output B0 of $\pm(2n-2\Delta z/P')$ pulses, and whether the sign is positive or negative is discriminated by the direction of rotation. The above two outputs A0, B0 are supplied to an arithmetic unit 7 constituting a signal processing unit 11 together with the above units 6A, 6B to obtain a sum of the outputs as follows:

$$(A0)+(B0)=\pm 4n.$$

Then, independent of the thrust deviation, a rotation of the cylindrical multi-helix grating G2 produces a signal of 4n pulses and whether the sign is positive or negative can be discriminated by the direction of rotation.

Since the eighth embodiment is so arranged, as described above, that the cylindrical multi-helix gratings G2a, G2b are vertically separated from each other as clockwise multiple helices and counterclockwise multiple helices different in arrangement direction from each other, the gratings seem to move in opposite directions to each other when the cylindrical multi-helix gratings G2a, G2b rotate. Hence, the influence of thrust deviation of the cylindrical multi-helix grating G2 can be nullified by using the sum of outputs from the light-receiving elements 3a1, 3a2, 3b1, 3b2 arranged to correspond to the clockwise and counterclockwise diffraction gratings G2a, G2b, as an output signal.

Figure 38:
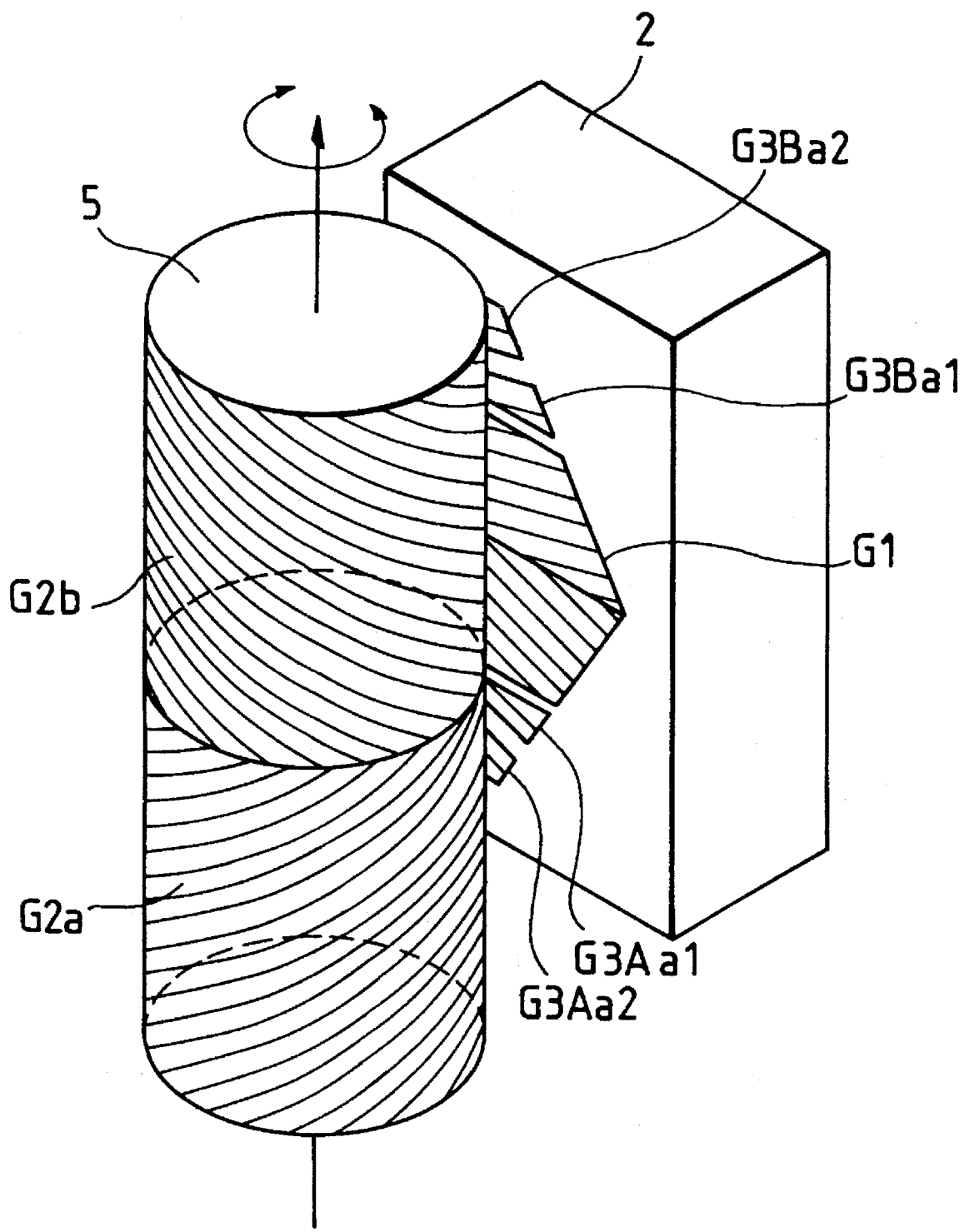
FIG. 38 is a perspective view to show the major part of an optical displacement measuring apparatus showing the ninth embodiment of the present invention.
Figure 39:
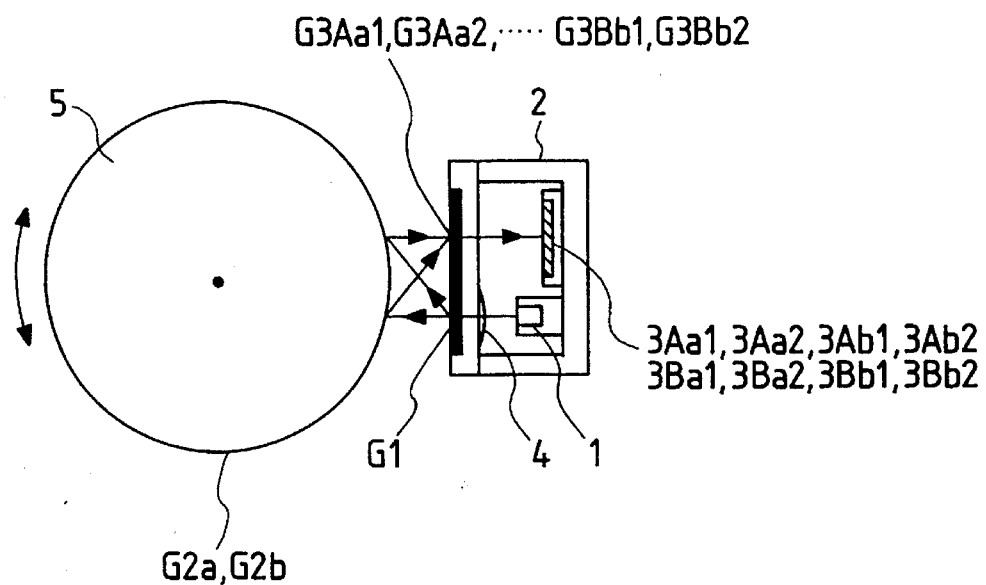
FIG. 39 is a top plan view with optical paths in the ninth embodiment.
Figure 40:
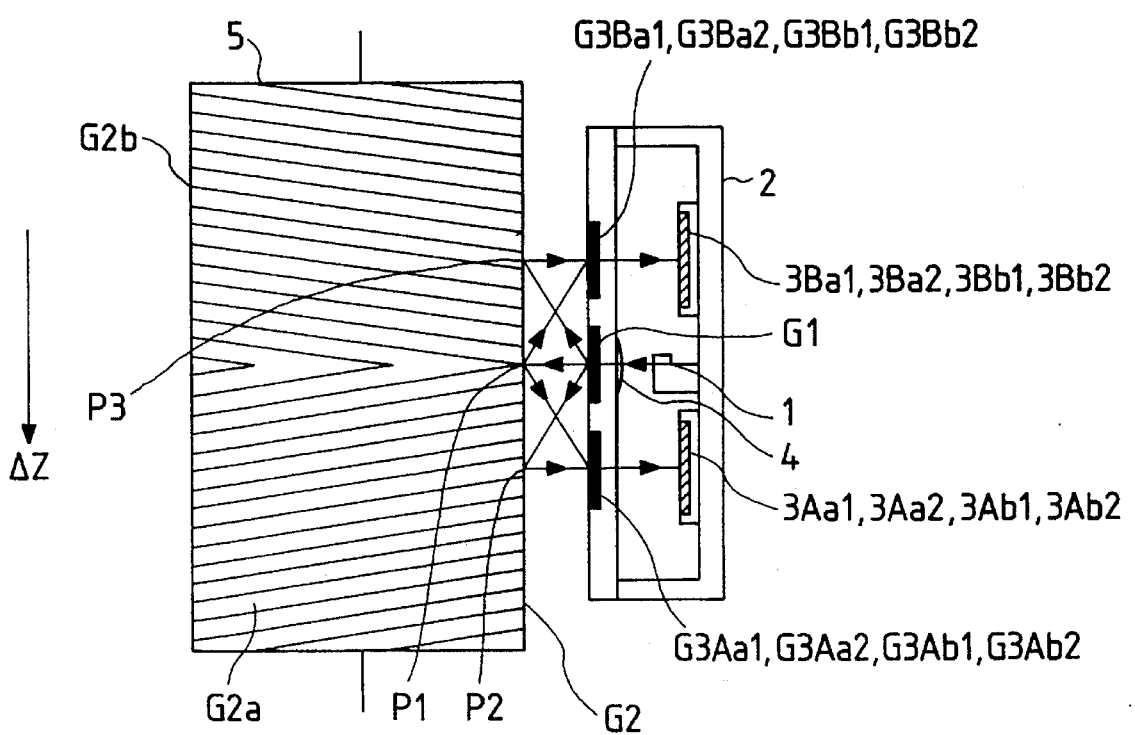
FIG. 40 is a side view of FIG. 39.
Figure 41:
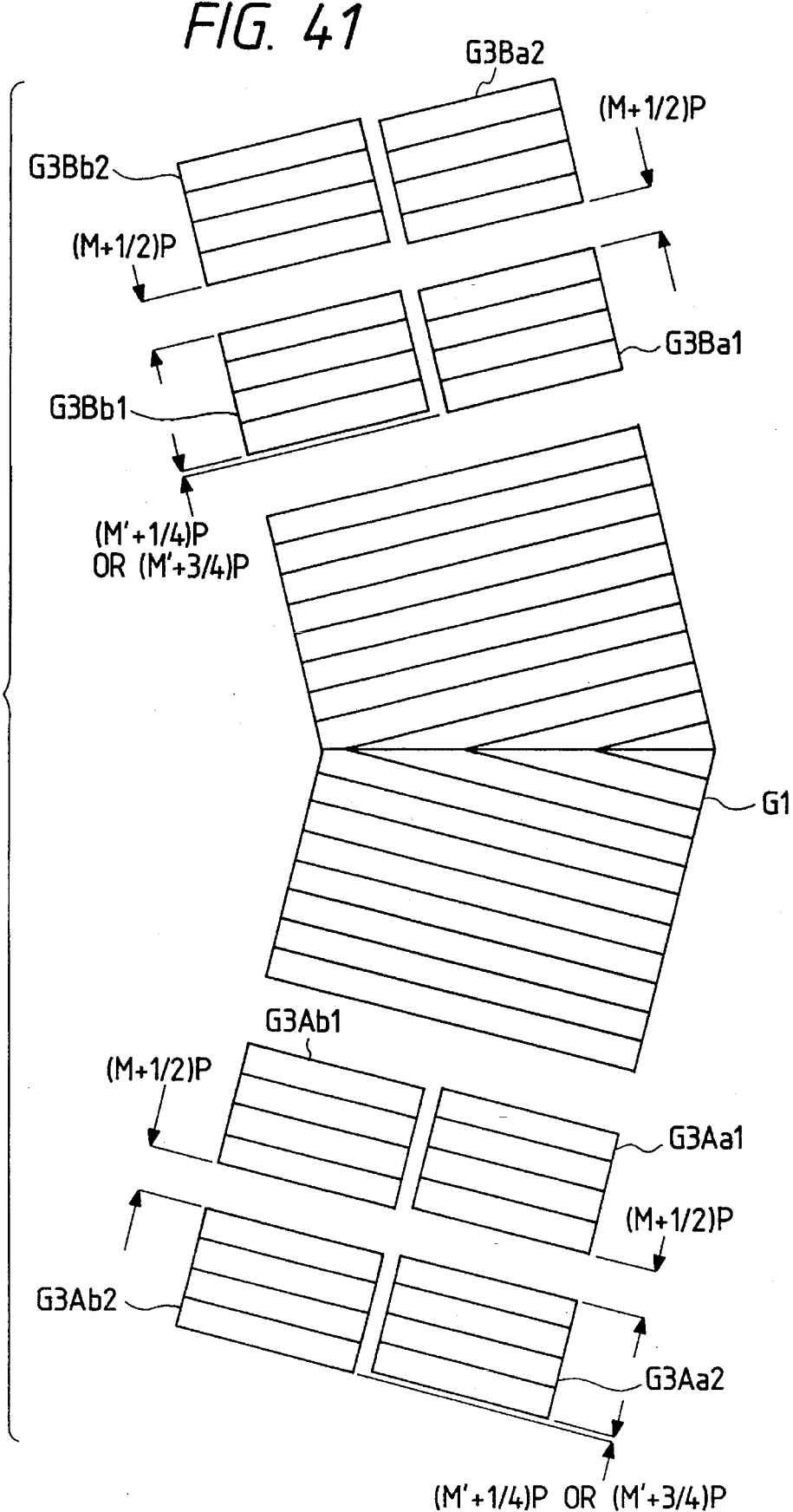
FIG. 41 is a layout of diffraction gratings in a head unit in the ninth embodiment.
Figure 42:
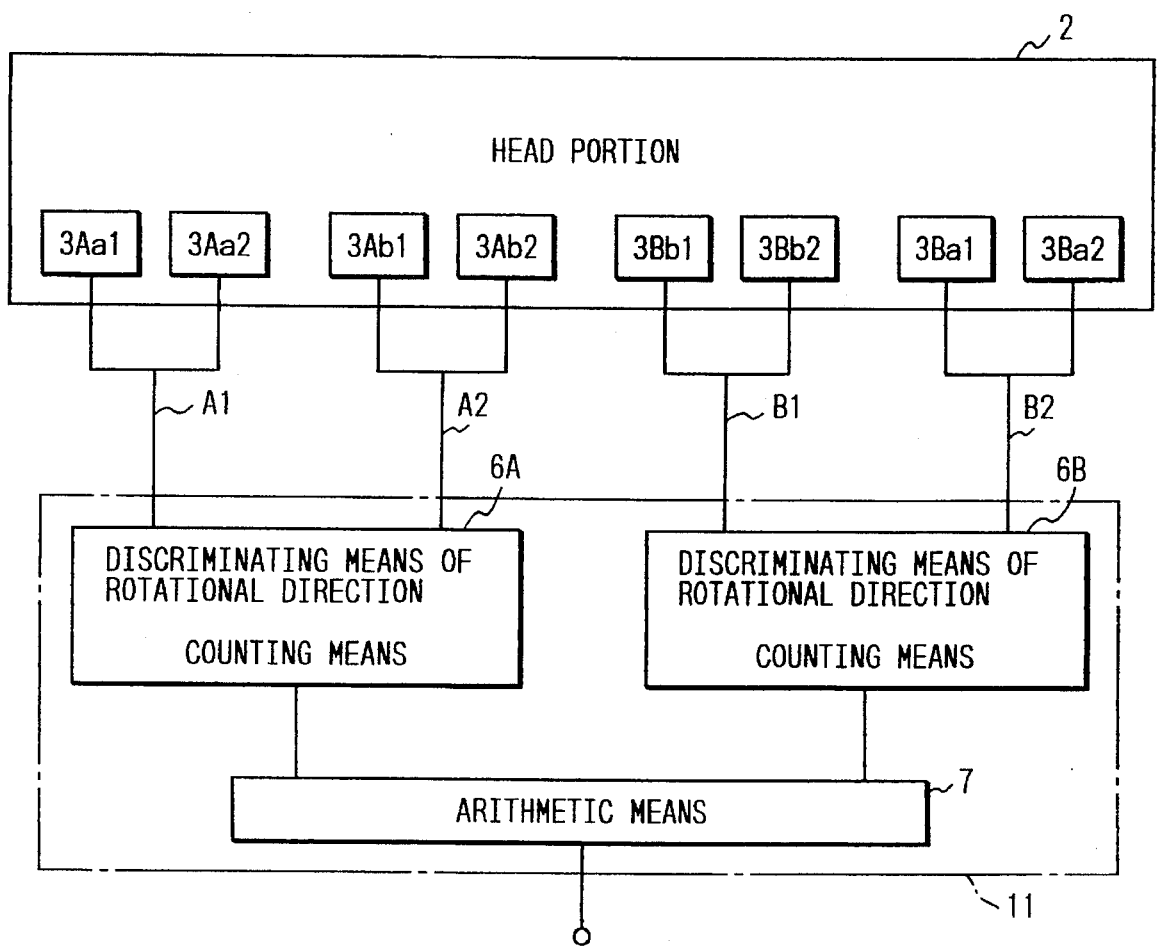
FIG. 42 is a circuit diagram to show a signal processing circuit in the ninth embodiment.

FIG. 38 is a perspective view to show the ninth embodiment of optical displacement measuring apparatus according to the present invention, FIG. 39 a top plan view to show optical paths thereof, FIG. 40 a side view thereof, FIG. 41 a drawing to show a layout of gratings in a head unit, and FIG. 42 a circuit diagram to show a signal processing circuit for output signals. In the drawings, same elements are denoted by same reference numerals as those in the embodiment shown in FIG. 33 to FIG. 37 and redundant description will be omitted. In FIG. 38 to FIG. 42, 3Aa1, 3Ab1, 3Aa2, 3Ab2, 3Ba1, 3Bb1, 3Ba2, 3Bb2 are light-receiving elements, and G3Aa1, G3Ab1, G3Aa2, G3Ab2, G3Ba1, G3Bb1, G3Ba2, G3Bb2 are third diffraction gratings for synthesizing beams.

The basic structure of optical system is the same as that of the eighth embodiment, but diffraction gratings G3A$a$1–G3A$b$2 and G3B$a$1–G3B$b$2 for synthesizing beams split by the diffraction grating G1 are arranged as separated an arbitrary distance away from each other in the direction of grating arrangement. Further, light-receiving elements 3A$a$1–3B$b$2 are arranged corresponding to the diffraction gratings thus separated. This arrangement produces two sets of four-phase outputs shifted $\pi/2$ between phases in the two sets of light-receiving elements 3A$a$1–3A$b$2 and 3B$a$1–3B$b$2.

In case of the diffraction gratings arranged on the head unit 2 as shown in FIG. 41, output signals A1, A2, B1, B2 from respective pairs of light-receiving elements 3A$a$1 and 3A$a$2, 3A$b$1 and 3A$b$2, 3B$b$1 and 3B$b$2, and 3B$a$1 and 3B$a$2 are processed in rotational direction discriminating units/counting units 6A, 6B and outputs A0, B0 from the units 6A, 6B are supplied to an arithmetic unit 7. Then with a rotation of the cylindrical multi-helix gratings G2$a$, G2$b$, a signal of 4n pulses is obtained with high resolution independent of the thrust deviation and the direction of rotation can be discriminated in the rotational direction discriminating unit.

The ninth embodiment is so arranged that the third diffraction gratings G3A$a$1 to G3B$b$1 provided in the head unit 2 are separately arranged as shown in FIG. 41, corresponding to the cylindrical multi-helix gratings G2$a$, G2$b$, and that the outputs from the light-receiving elements 3A$a$1 to 3B$b$2 are processed by the units 6A, 6B, 7 as shown in FIG. 42, whereby a stable output which can be highly divided can be obtained with less influence of offset deviation of outputs from the light-receiving elements, for example as caused by external light other than the signal light.

Figure 43:
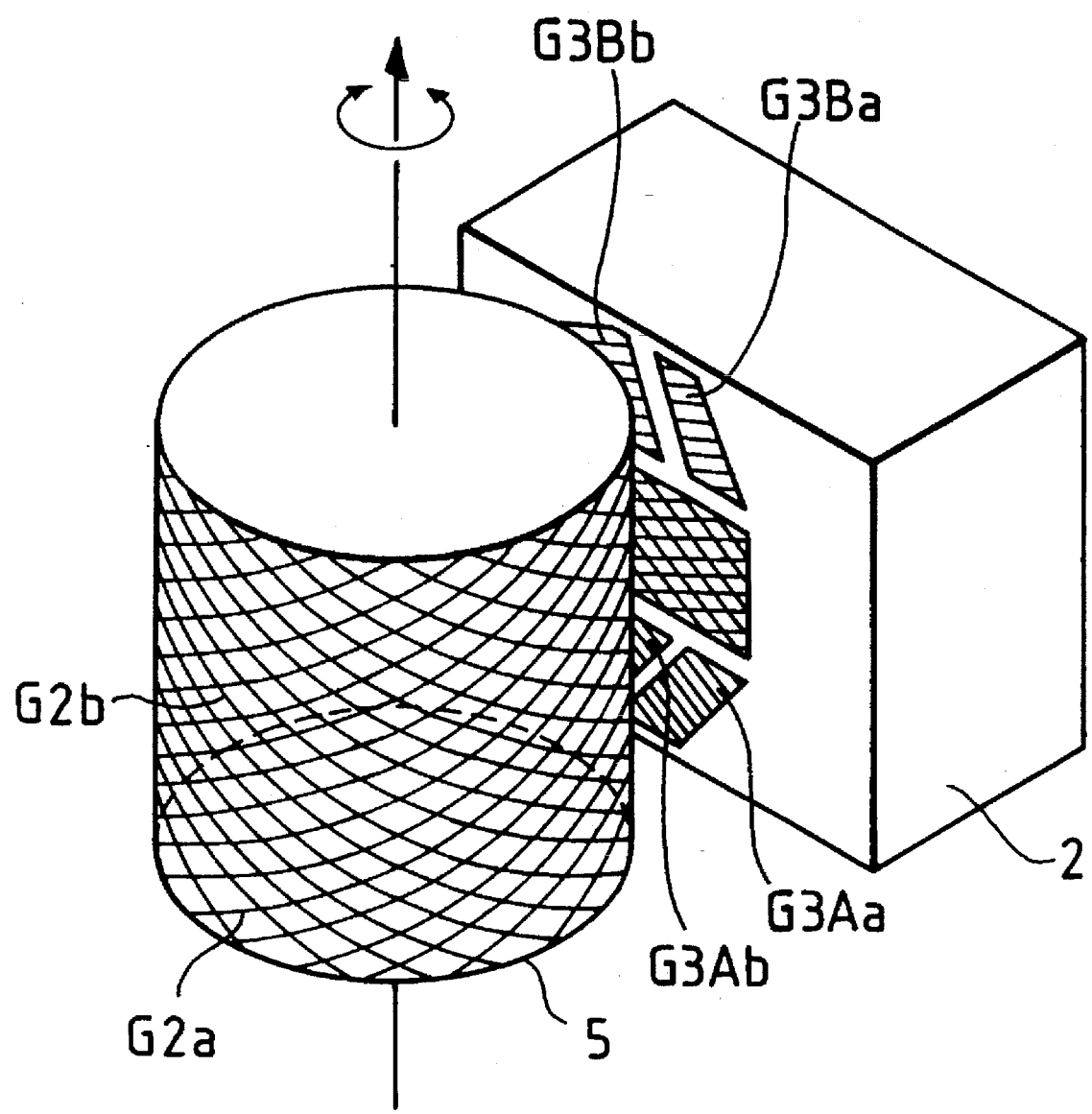
FIG. 43 is a perspective view to show the major part of an optical displacement measuring apparatus showing the tenth embodiment of the present invention.
Figure 44:
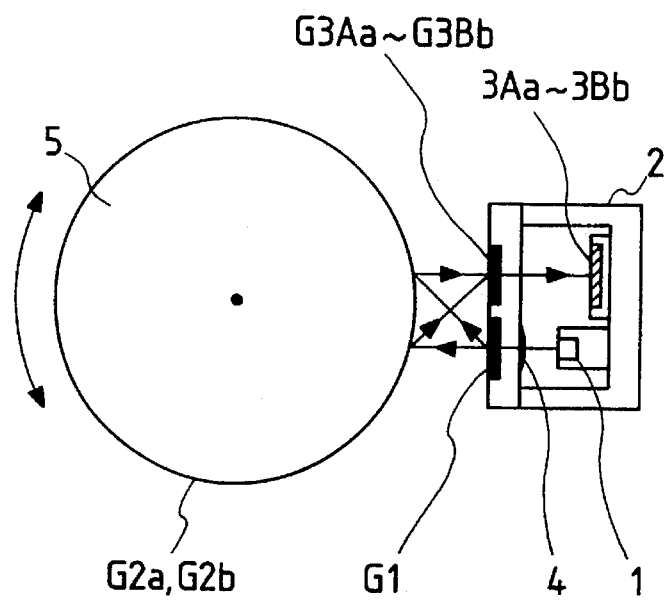
FIG. 44 is a top plan view with optical paths in the tenth embodiment.
Figure 45:
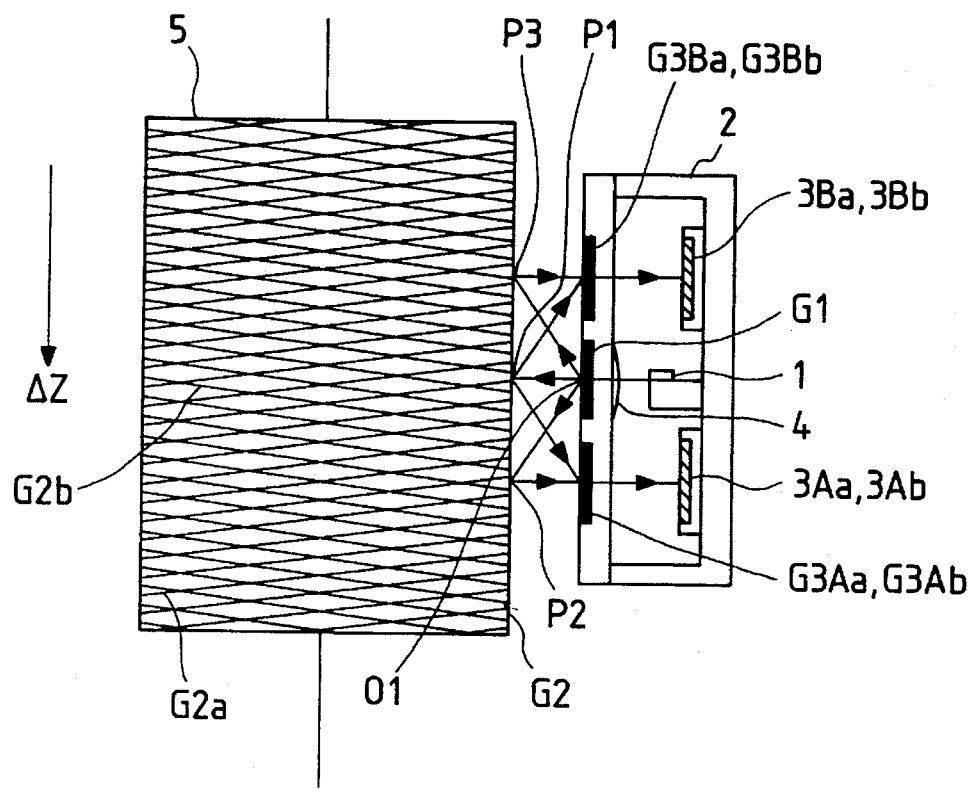
FIG. 45 is a side view of FIG. 44.
Figure 46:
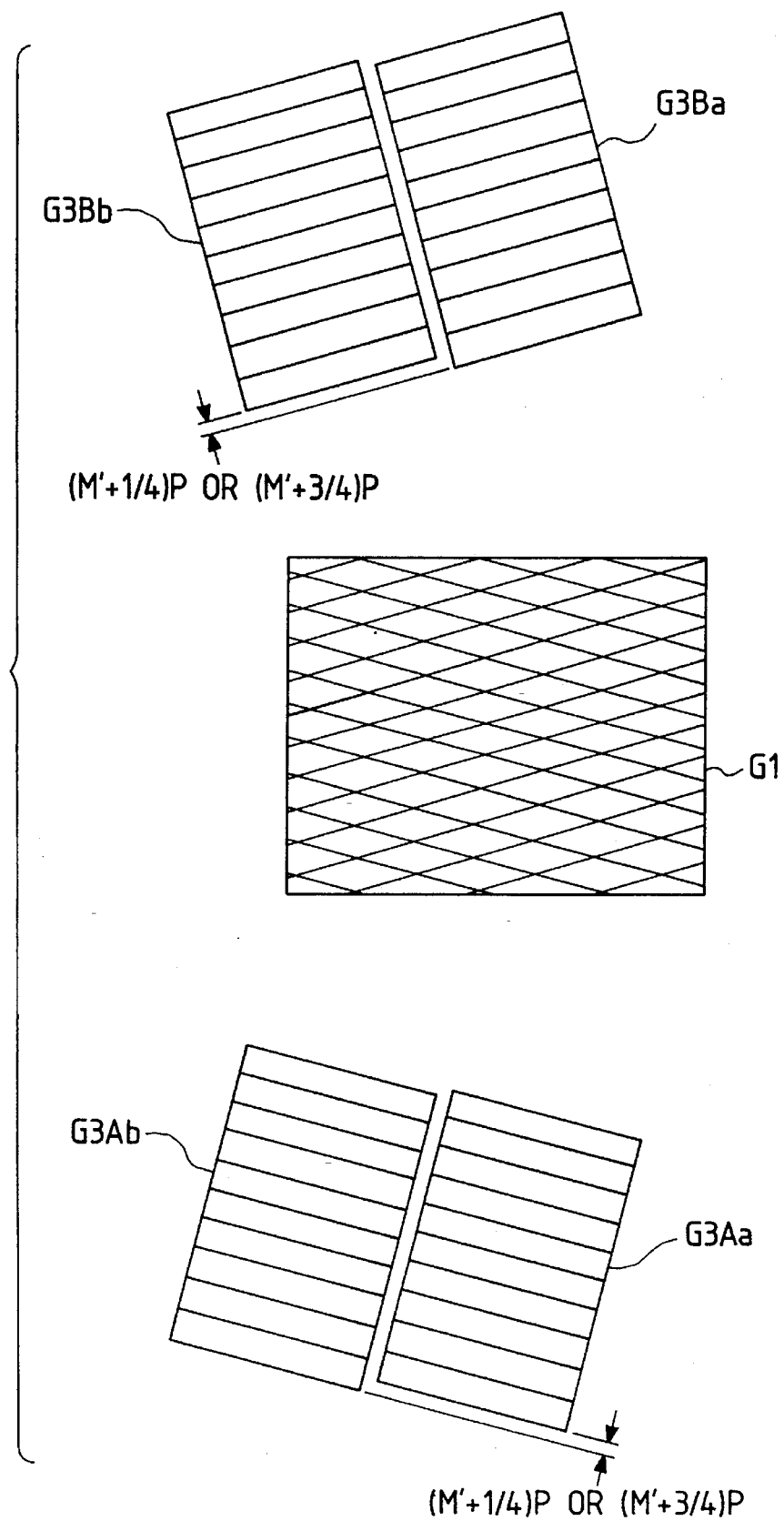
FIG. 46 is a layout of diffraction gratings in a head unit in the tenth embodiment.
Figure 47:
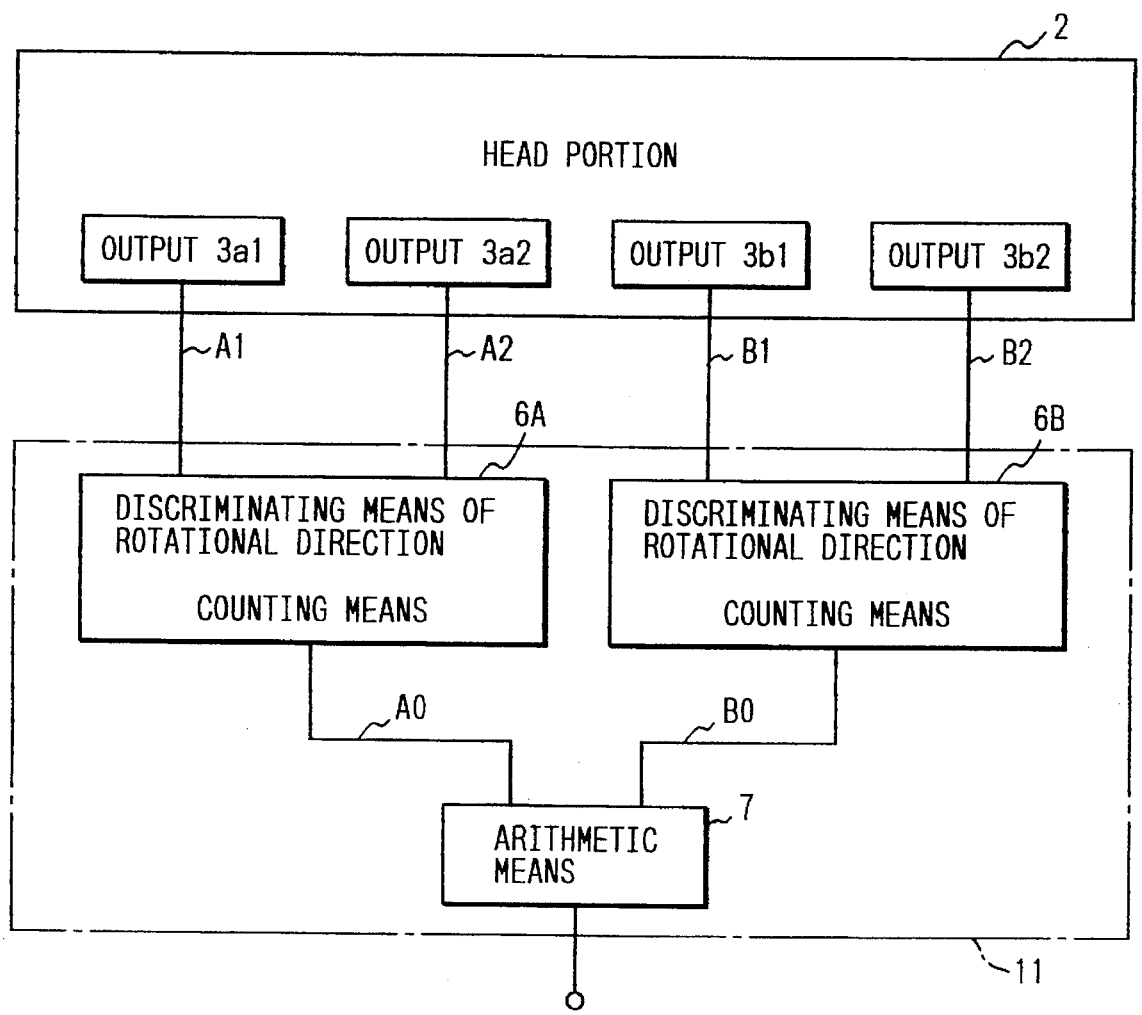
FIG. 47 is a circuit diagram to show a signal processing circuit in the tenth embodiment.

FIG. 43 is a perspective view to show the tenth embodiment of optical displacement measuring apparatus according to the present invention, FIG. 44 a top plan view to show optical paths thereof, FIG. 45 a side view thereof, FIG. 46 a drawing to show a layout of gratings in a head unit 2, and 47 a circuit diagram to show a signal processing circuit for output signals. In the drawings, same elements are denoted by same reference numerals as those in the eighth embodiment shown in FIG. 33 to FIG. 37 and redundant description will be omitted. In FIG. 43 to FIG. 47, 3A$a$–3B$b$ are light-receiving elements, G2 a diffraction grating of multiple helices (hereinafter referred to as a cylindrical multi-helix grating) different in arrangement direction from each other as formed to cross each other on a cylindrical surface to phase-modulate split beams, and G3A$a$–G3B$b$ diffraction gratings for synthesizing beams.

The basic function of the cylindrical multi-helix grating G2 used in the tenth embodiment is the same as that of the eighth embodiment. When the cylindrical multi-helix grating G2 makes a rotation to cause a shift of $\Delta z$ in the direction of rotation axis, two-phase light and dark signals A1, A2 of 2n+2$\Delta z$/P' period are produced with phases shifted $\pi/2$, as described in the eighth embodiment.

When the two light and dark signals A1, A2 are supplied to displacement direction discriminating units and a counting unit 6A such as a counter, an output A0 of 2n+2$\Delta z$/P' pulses is obtained with a rotation of the cylindrical multi-helix gratings G2$a$, G2$b$ resulting in a shift of $\Delta z$ in the direction of rotation axis, while the direction of displacement is discriminated.

The beams $R_{-1+10}$ and $R_{0-1+1}$, optical paths of which are superimposed on each other in the diffraction grating G3B$a$, enter the light-receiving element 3B$a$ in the form of interference light. The interference phase at this moment is as follows:

$$\{n\Theta-2\pi\Delta z/P'\}-\{-n\Theta+2\pi\Delta z/P'\}=2n\Theta-4\pi\Delta z/P'.$$

Also, the beams $R_{+1-10}$ and $R_{0+1-1}$, optical paths of which are superimposed on each other in the diffraction grating G3B$b$, enter the light-receiving element 3B$b$ in the form of interference light. The interference phase at this moment is as follows:

$$\{n\Theta-2\pi\Delta z/P'\}-\{-n\Theta+2\pi\Delta z/P'+\pi/2\}=2n\pi-4\pi\Delta z/P'+\pi/2,$$

so that a beam is obtained with interference phase shifted by a phase of $\pi/2$ relative to the beam of optical paths superimposed through the diffraction grating G3B$a$. Accordingly, when the cylindrical multi-helix gratings G2$a$, G2$b$ make a rotation to cause a thrust shift of $\Delta z$ therein, light and dark signals B1, B2 of 2n+2$\Delta z$/P' period are produced by the light-receiving elements, and the rotational direction can be discriminated based on the two-phase light and dark signals shifted by the phase of $\pi/2$.

When the two light and dark signals B1, B2 are supplied to displacement direction discriminating units and a counting unit 6B such as a counter, an output B0 of 2n−2$\Delta z$/P' pulses is obtained with a rotation of the cylindrical multi-helix grating G2 resulting in a shift of $\Delta z$ in the direction of rotation axis, while the direction of displacement is determined. Taking a sum of output A0 and output B0, $$(A0)-(B0)=4n.$$

Thus, independent of a deviation in the direction of rotation axis, a signal of 4n pulses is obtained with a rotation of the cylindrical multi-helix gratings G2$a$, G2$b$, with discrimination of rotational direction. Also, obtaining a deviation between the two outputs (with the two outputs of A0 and B0, deviation S is defined as S=(A0−B0)/2), $$S=2\Delta z/P'.$$

Thus, an output of 2$\Delta z$/P' pulses can be obtained only for the thrust deviation $\Delta z$ with discrimination of deviation direction. It means that simultaneous measurement is possible for a rotational displacement amount and a rotational displacement direction of cylinder and for a linear displacement amount and a linear displacement direction of cylinder.

The tenth embodiment can realize a very compact displacement measuring apparatus which is very simple in structure of an interference optical system and which can simultaneously measure displacements of angle and distance. Also, since the present embodiment is so arranged that the diffraction gratings of multiple helices are formed on the surface of a cylinder, n gratings appear to cross the front surface of head unit 2 with a rotation of cylinder 5 relative to the head unit 2. Since the two separate diffraction gratings are arranged with a shift of P/4 from each other in the head unit 2, the direction of displacement can be discriminated utilizing the two-phase signals. Taking a sum and a difference of the outputs from the light-receiving elements, the apparatus can separately obtain an output for rotational direction and rotational amount free of influence of deviation in the direction of rotation axis of the multi-helix diffraction gratings G2$a$, G2$b$ and an output for thrust deviation amount and thrust deviation direction free of influence of rotation.

Figure 48:
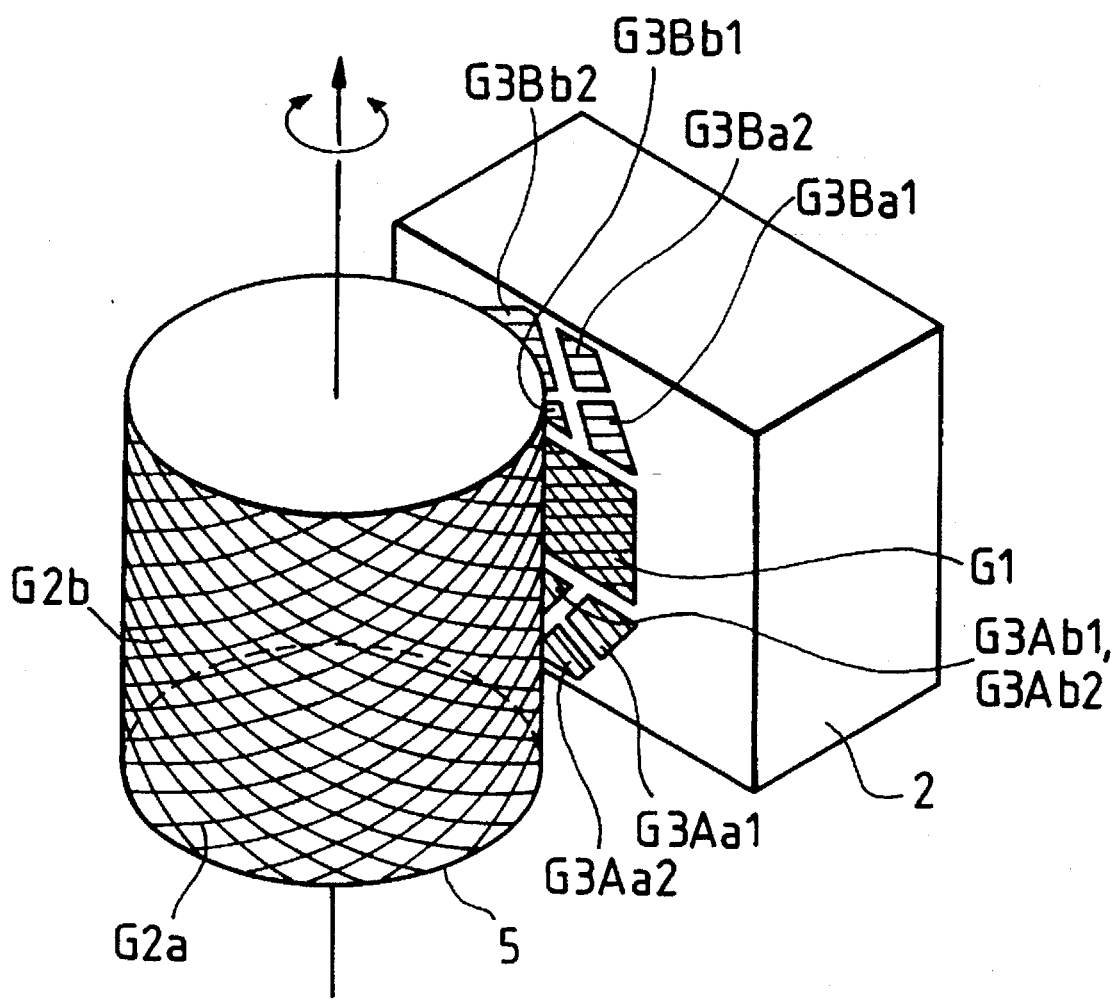
FIG. 48 is a perspective view to show the major part of an optical displacement measuring apparatus showing the eleventh embodiment of the present invention.
Figure 49:
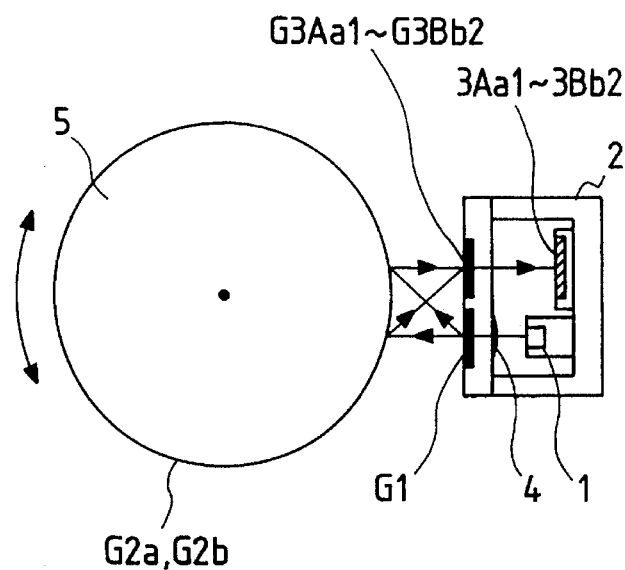
FIG. 49 is a top plan view with optical paths in the eleventh embodiment.
Figure 50:
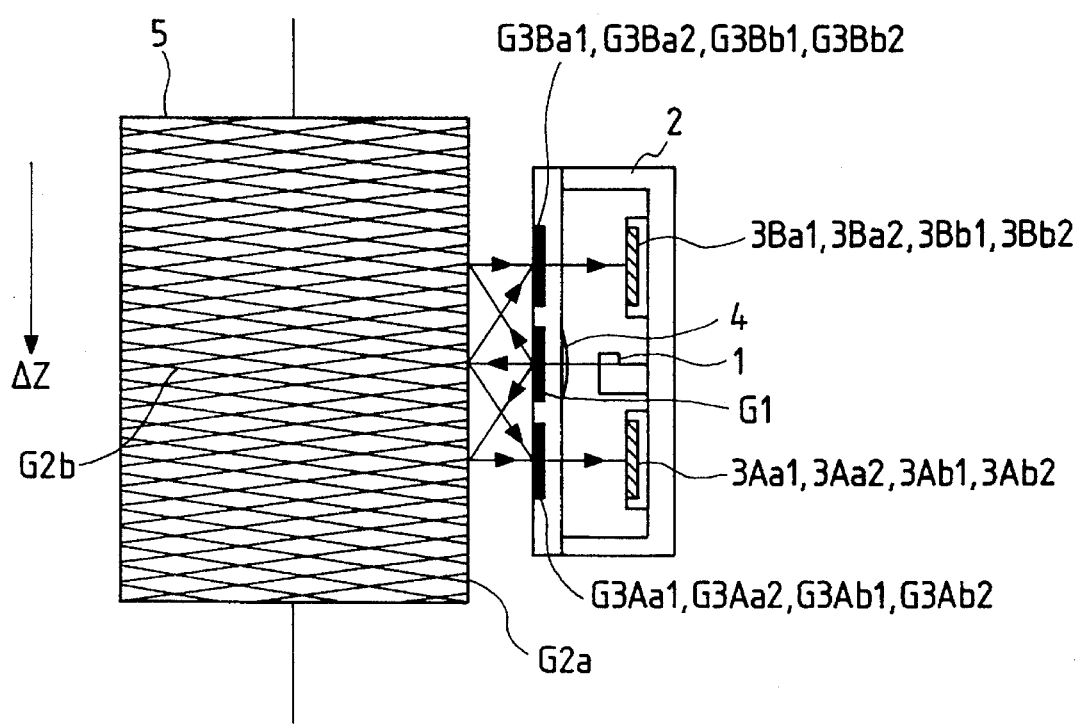
FIG. 50 is a side view of FIG. 49.

FIG. 48 is a perspective view to show the eleventh embodiment of an optical displacement measuring apparatus according to the present invention, FIG. 49 a top plan view to show optical paths thereof, FIG. 50 a side view thereof, and FIG. 51 a drawing to show a layout of gratings in a head unit. In the drawings, same elements are denoted by same reference numerals as those in the tenth embodiment shown in FIG. 43 to FIG. 47 and redundant description is omitted. In FIG. 48 to FIG. 51, 3A$a$1, 3A$a$2, 3A$b$1, 3A$b$2, 3B$b$1, 3B$b$2, 3B$a$1, 3B$a$2 are light-receiving elements and G3A$a$1, G3B$a$2, G3A$b$1, G3A$b$2, G3B$b$1, G3B$b$2, G3B$a$1, G3B$a$2 diffraction gratings for synthesizing beams.

The basic structure of the optical system is the same as that of the tenth embodiment, but diffraction gratings G3A$a$1–G3A$b$2 and G3B$a$1–G3B$b$2 for synthesizing beams split by the diffraction grating G1 are arranged as separated an arbitrary distance away from each other in the direction of grating arrangement. Further, the light-receiving elements 3A$a$1–3B$b$2 are arranged corresponding to the diffraction gratings thus separated. This arrangement produces two sets of four-phase outputs shifted $\pi/2$ between phases in the two sets of light-receiving elements 3A$a$1–3A$b$2 and 3B$a$1–3B$b$2.

With the layout of gratings in the head unit as shown in FIG. 51, output signals can be processed by an output processing circuit with the same structure as that of the output processing circuit in the ninth embodiment as shown in FIG. 42, whereby when the cylindrical multi-helix grating G2 makes a rotation to cause a shift of $\Delta z$ in the direction of rotation axis, a signal of 4n pulses is obtained as an output for rotational amount and a signal of $2\Delta z/P'$ pulses for a deviation amount in the direction of rotational axis. Therefore, a stable output possible to be highly divided can be obtained free of influence of external light other than the signal light, discriminating the rotational direction and deviation direction.

According to the above seventh to eleventh embodiments, diffraction gratings of multiple helices are provided on a rotating body and, a plurality of separate diffraction gratings for synthesizing beams phase-modulated by the diffraction gratings on the rotating body are arranged separate at an arbitrary distance in the direction of grating arrangement in the head unit opposed to the rotating body, so that a rotational angle and a rotational direction can be detected. Thus, the apparatus can be constructed of a small number of components, can be assembled easily, and can be designed in a very small size.

Also, the seventh to ninth embodiments are so arranged that a plurality of multi-helix diffraction gratings different in arrangement direction from each other are separately and independently arranged on a rotating body, and a plurality of separate diffraction gratings for synthesizing beams phase-modulated by the diffraction gratings on the rotating body are arranged an arbitrary distance away from each other in the direction of grating arrangement, which can reduce influence of axial deviation of rotating body so as to stabilize the output.

Also, since the apparatus are so arranged that beams from the diffraction gratings are made incident into a plurality of light-receiving elements and outputs from the light-receiving elements are subjected to arithmetic processing, plural types of displacement signals can be stably output.

Especially in case of the tenth and eleventh embodiments, a plurality of multi-helix diffraction gratings different in arrangement direction from each other are provided on a rotating body as crossing each other, which is very effective to miniaturize the entire apparatus as enjoying the above effects.

What is claimed is:

1. A rotation detecting apparatus comprising:

a grating portion provided on a first of two objects for which relative rotation is to be detected, said grating portion comprising at least one multi-helix diffraction grating;

a light-emitting portion provided on a second of the two objects;

a light-receiving portion provided on the second object, said light-receiving portion receiving a diffraction beam from said multi-helix diffraction grating illuminated with a beam emitted from said light-emitting portion; and means for detecting information of relative rotation of the first and second objects on the basis of light received by said light-receiving portion.

2. An apparatus according to claim 1, wherein said light-emitting portion has a light-emitting element and a first diffraction grating for splitting a beam from said light-receiving element into a plurality of beams and wherein said light-receiving portion has a third diffraction grating for synthesizing diffraction light from said multi-helix diffraction grating of said plurality of beams and a light-receiving element for receiving a beam of the light synthesized to interfere with each other through said third diffraction grating.

3. An apparatus according to claim 2, wherein said first and third diffraction gratings are so arranged that gratings are formed in parallel with said multi-helix diffraction grating when opposed to said grating portion.

4. An apparatus according to claim 1, wherein said grating portion is so arranged that said multi-helix diffraction grating is formed on a surface of or inside a substrate of a circular cylinder or circular tube.

5. An apparatus according to claim 1, wherein said grating portion is so arranged that said multi-helix diffraction grating is formed on or inside a disk substrate.

6. An apparatus according to claim 1, wherein said light-emitting portion has a light-emitting element and a first diffraction grating for splitting a beam from said light-emitting element into at least three beams, and wherein said light-receiving portion has two third diffraction gratings each for synthesizing two out of four diffraction light beams produced by said multi-helix diffraction grating from said three beams and two light-receiving elements each for receiving two beams synthesized to interfere with each other by said two third diffraction gratings.

7. An apparatus according to claim 6, wherein said grating portion has two multi-helix diffraction gratings corresponding to said two third diffraction gratings, said two multi-helix gratings being different from each other in direction of grating arrangement.

8. An apparatus according to claim 7, wherein said two multi-helix gratings are formed as superimposed on each other at a same position.

9. An apparatus according to claim 7, wherein said two multi-helix diffraction gratings are formed at mutually different positions.

10. An apparatus according to claim 7, wherein said means for detecting includes counting means for performing amplitude counting of output signals from said two light-receiving elements, and means for performing addition of counting results.

11. An apparatus according to claim 10, further comprising means for performing subtraction of said counting results.

12. An apparatus according to claim 1, wherein said light-emitting portion has a light-emitting element and a first diffraction grating for splitting a beam from said light-emitting element into at least three beams and wherein said light-receiving portion has two third diffraction gratings each for synthesizing two diffraction light beams produced by said multi-helix grating diffraction from said three beams, and two light-receiving elements each for receiving two beams synthesized to interfere with each other by said two third diffraction gratings, said two third diffraction gratings being formed with grating arrays shifted by a predetermined phase.

13. An apparatus according to claim 1, wherein said light-emitting portion has a light-emitting element and a first diffraction grating for splitting a beam from said light-emitting element into at least three beams and wherein said light-receiving portion has two third diffraction grating regions, each comprising two diffraction gratings formed with grating arrays shifted by a predetermined phase and each synthesizing two out of four diffraction light beams produced by said multi-helix diffraction grating from said three beams, and four light-receiving elements each for receiving four beams synthesized to interfere with each other by said four diffraction gratings in said two third diffraction grating regions.

14. An apparatus according to claim 1, wherein said light-emitting portion has a light-emitting element and a first diffraction grating for splitting a beam from said light-emitting element into at least three beams and wherein said light-receiving portion has two third diffraction grating regions, each comprising four diffraction gratings formed with grating arrays shifted by a predetermined phase and each synthesizing two out of four diffraction light beams produced by said multi-helix diffraction grating from said three beams, and eight light-receiving elements each for receiving eight beams synthesized to interfere with each other by said eight diffraction gratings in said two third diffraction grating regions.

15. A scale member used in a rotation detecting apparatus which detects information of relative rotation of first and second objects by using a light-emitting portion and a light-receiving portion provided on the first object for which relative rotation is to be detected, optically detecting a displacement of a grating provided on the second object, comprising:

a substrate provided on the second object; and a grating portion provided on said substrate, said grating portion comprising at least one multi-helix diffraction grating.

16. A member according to claim 15, wherein said substrate is of a circular cylinder or circular tube shape and said multi-helix diffraction grating is formed on a surface of or inside said substrate.

17. A member according to claim 15, wherein said substrate is a disk and said multi-helix diffraction grating is formed on or inside said substrate.

18. A drive system comprising:

a driving portion for rotation-driving a shaft;

a grating portion provided on said shaft, said grating portion comprising at least one multi-helix diffraction grating;

a light-emitting portion provided at a fixed position;

a light-receiving portion provided at a fixed position, said light-receiving portion receiving a diffraction beam from said multi-helix diffraction grating illuminated with a beam emitted from said light-emitting portion; and a control portion for controlling said driving portion based on rotation information of said shaft obtained through light reception of said light-receiving portion.

* * * * *

UNITED STATES PATENT AND TRADEMARK OFFICE
CERTIFICATE OF CORRECTION

PATENT NO. : 5,537,210                Page 1 of 2
DATED      : July 16, 1996
INVENTOR(S): Kaneda et al.

It is certified that error appears in the above-indentified patent and that said Letters Patent is hereby corrected as shown below:

TITLE PAGE:
[56] REFERENCES CITED:

FOREIGN PATENT DOCUMENTS, "2285214  11/1990  Japan
                          5157583   6/1993  Japan" should
read --2-285214  11/1990  Japan
      5-157583   6/1993  Japan--.

U.S. PATENT DOCUMENTS, "5,118,932  6/1992  Browning et al."
should read --5,118,932  6/1992  Brownrigg et al.--.

COLUMN 1:

Line 36, "10" should be deleted.

COLUMN 11:

Line 52, "$R_{10}$" should read --$R_{+10}$--.

COLUMN 12:

Line 17, "$\{-n\theta+2n\pi\Delta/P'\}$" should read --$\{-n\theta+2\pi\Delta z/P'\}$--.
Line 44, "10" should be deleted.

COLUMN 15:

Line 6, "$R_{-1\ 10}$" should read --$R_{-1+10}$--.

UNITED STATES PATENT AND TRADEMARK OFFICE
CERTIFICATE OF CORRECTION

PATENT NO. : 5,537,210
DATED : July 16, 1996
INVENTOR(S) : Kaneda et al.

It is certified that error appears in the above-indentified patent and that said Letters Patent is hereby corrected as shown below:

COLUMN 17:

Line 16, "$-n\theta+2\pi\Delta/P'+\pi/2.$" should read -- $-n\theta+2\pi\Delta z/P'+\pi/2.$ --.
Line 45, "$R_{30\ 1\text{-}10}$" should read --$R_{+1\text{-}10}$--.

COLUMN 20:

Line 10, "$2n\pi-4\pi\Delta z/P'+\pi/2,$" should read --$2n\theta-4\pi\Delta z/P'+\pi/2,$--.

COLUMN 22:

Line 52, gratings" should read --diffraction gratings-- and "formed as" should be deleted.

COLUMN 23:

Line 4, "grating diffraction" should read --diffraction grating--.

Signed and Sealed this

Eighteenth Day of February, 1997

Attest:

BRUCE LEHMAN

Attesting Officer  Commissioner of Patents and Trademarks